United States Patent
Tellado et al.

(10) Patent No.: US 6,314,146 B1
(45) Date of Patent: Nov. 6, 2001

(54) PEAK TO AVERAGE POWER RATIO REDUCTION

(75) Inventors: Jose Tellado, Stanford; John M. Cioffi, Cupertino, both of CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/092,327

(22) Filed: Jun. 5, 1998

(51) Int. Cl.[7] ............... H03D 1/04; H03D 1/06; H03K 5/01; H03K 6/04; H04B 1/10
(52) U.S. Cl. ............... 375/346; 375/285; 455/296
(58) Field of Search ............... 375/296, 260, 375/262, 285, 224, 227, 228, 341, 346, 348, 259; 455/296, 63, 67.3

(56) References Cited

U.S. PATENT DOCUMENTS

| | | |
|---|---|---|
| 5,268,938 | 12/1993 | Feig et al. . |
| 5,282,222 | 1/1994 | Fattouche et al. . |
| 5,285,474 | 2/1994 | Chow et al. . |
| 5,302,914 | 4/1994 | Arntz et al. . |
| 5,369,670 * | 11/1994 | Zagloul et al. . |
| 5,598,436 | 1/1997 | Brajal et al. . |
| 5,621,762 | 4/1997 | Miller et al. . |
| 5,651,028 * | 7/1997 | Harris et al. ............... 375/286 |
| 5,799,047 * | 8/1998 | Dobrica ............... 375/354 |
| 5,838,732 | 11/1998 | Carney . |
| 5,867,532 * | 2/1999 | Ito et al. ............... 375/265 |
| 5,973,642 * | 10/1999 | Li et al. ............... 342/378 |
| 6,012,161 * | 1/2000 | Ariyavisitakul et al. ............... 714/795 |
| 6,038,261 * | 3/2000 | Mestdagh ............... 375/285 |
| 6,064,701 * | 5/2000 | Tresser et al. ............... 375/285 |

FOREIGN PATENT DOCUMENTS

WO 95/17049   6/1995   (WO) .
WO 98/10567   3/1998   (WO) .

OTHER PUBLICATIONS

Mathias Friese, "OFDM Signals with Low Crest–Factor", Nov. 1997, Globecom, pp. 290–294.

Stefan Miller, et al., "A Comparison of Peak Power Reduction Schemes for OFDM", Nov. 1997, Globecom, pp. 1–5.

Alan Gatherer et al., "Controlling Clipping Probability in DMT Transmission", Nov. 1997, Askomar, pp. 578–584.

Jacky S. Chow et al., "Mitigating Clipping Noise in Multi–Carrier Systems", Jun. 1997, ICC, pp. 715–719.

S.H. Müller et al., "OFDM with Reduced Peak–to–Average Power Ratio by Optimum Combination of Partial Transmit Sequences", Feb. 27, 1997, Electronics Letters, vol. 33, No. 5, pp. 368–369.

(List continued on next page.)

*Primary Examiner*—Chi Pham
*Assistant Examiner*—Jean B. Corrielus
(74) *Attorney, Agent, or Firm*—Beyer Weaver & Thomas, LLP

(57) ABSTRACT

The present inventions provide methods and systems for reducing the peak to average power ratio of a multi-carrier signal. Reducing the peak to average power ratio of a signal ensures that amplifiers and transmitters are not saturated, causing loss of data. Further, reducing peak to average power ratios reduces the consumption of power during transmission. Peak to average power ratios is reduced by clipping an original signal at transmission. A receiver receives the clipped signal and makes an estimate of the clipped portions of the signal. Using iterative estimations an approximation is made of the clipped portions of the signal. The approximation of the clipped portions of the signal is used to estimate the original signal. The clipped signal reduces the peak to average power ratio of the transmitted signal, and estimation avoids the need for sending side information in order to decode the clipped signal.

19 Claims, 27 Drawing Sheets

OTHER PUBLICATIONS

M. Friese, "Multicarrier Modulation with Low Peak–to–Average Power Ratio", Apr. 11, 1996, Electronics Letters, vol. 32, No. 8, pp. 713–714.

Denis J.G. Mestdagh, "A Method to Reduce the Probability of Clipping in DMT–Based Transceivers", Oct. 1996, IEEE Transactions on Communications, vol. 44, No. 10, pp. 1234–1238.

D. Wulich, "Reduction of Peak to Mean Ratio of Multicarrier Modulation Using Cyclic Coding", Feb. 29, 1996, Electronics Letters, vol. 32, No. 5, pp. 432–433.

A.E. Jones et al., "Blockcoding Scheme for Reduction of Peak to Mean Envelope Power Ratio of Multicarrier Transmission Schemes", Dec. 8, 1994, vol. 30, No. 25, pp. 2098–2099.

* cited by examiner

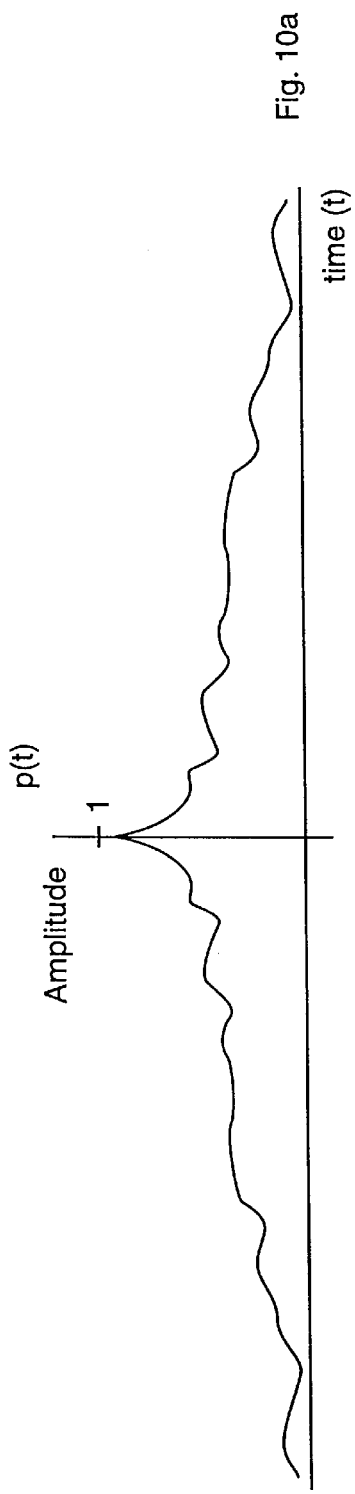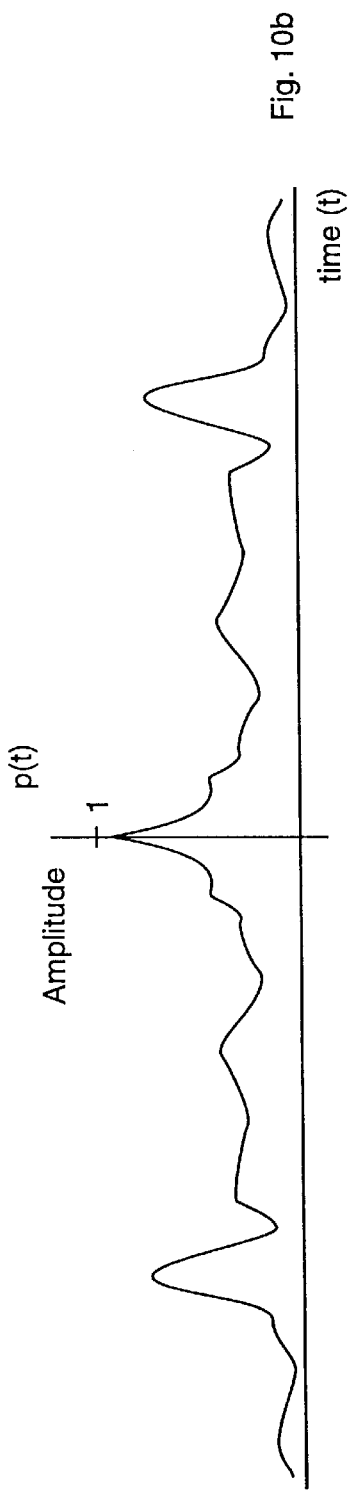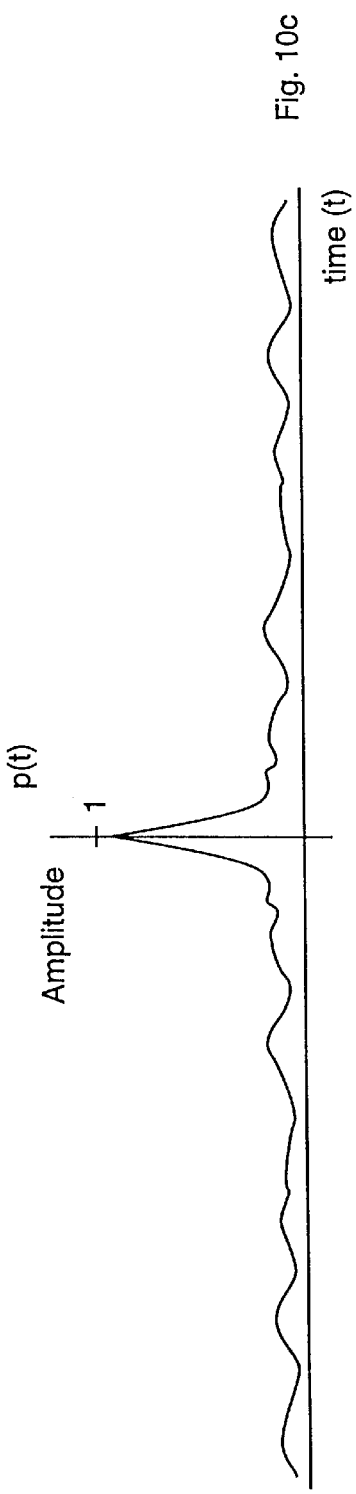

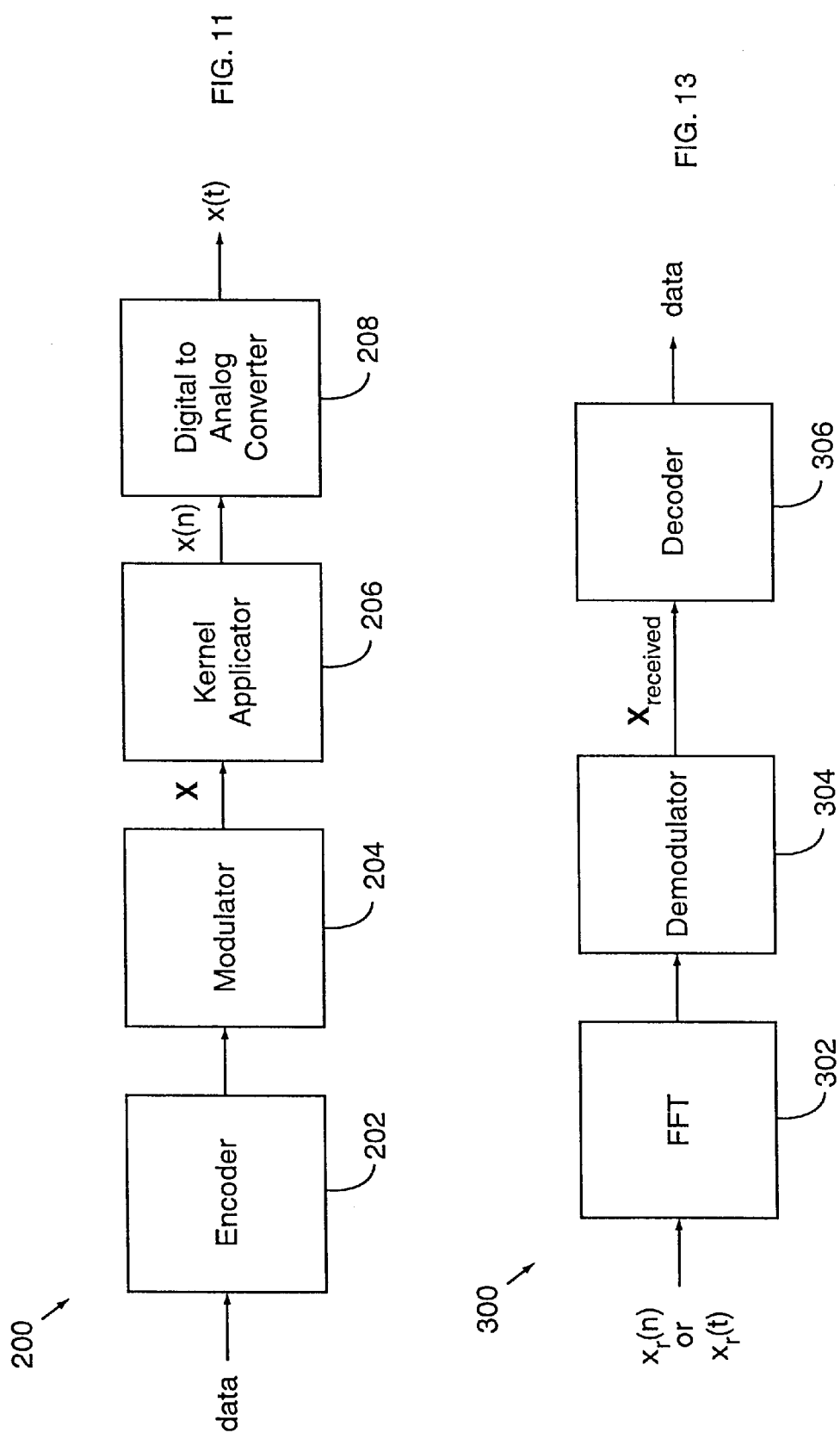

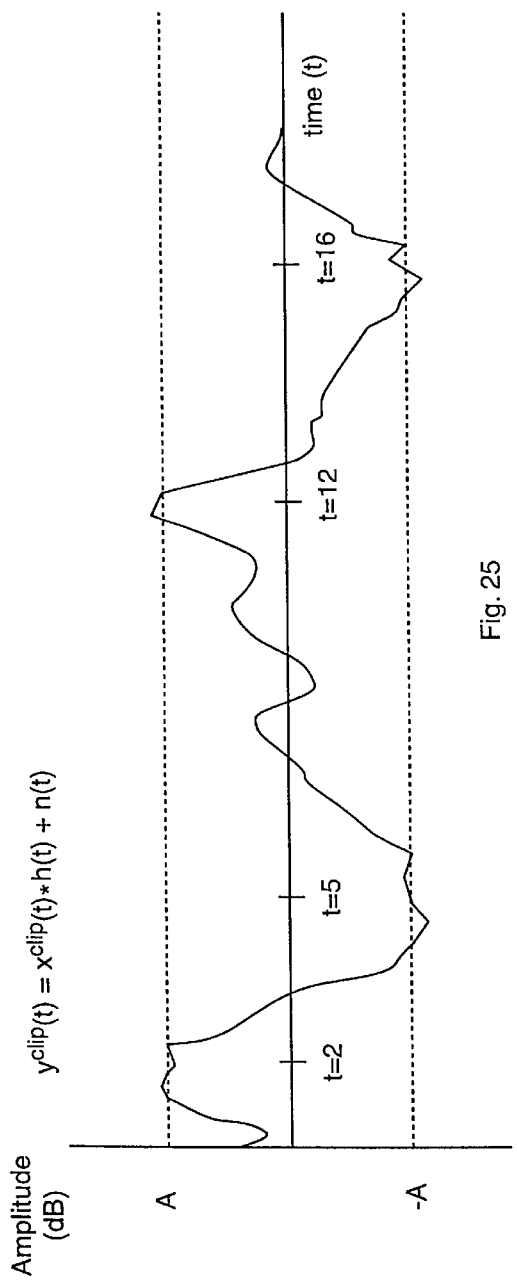
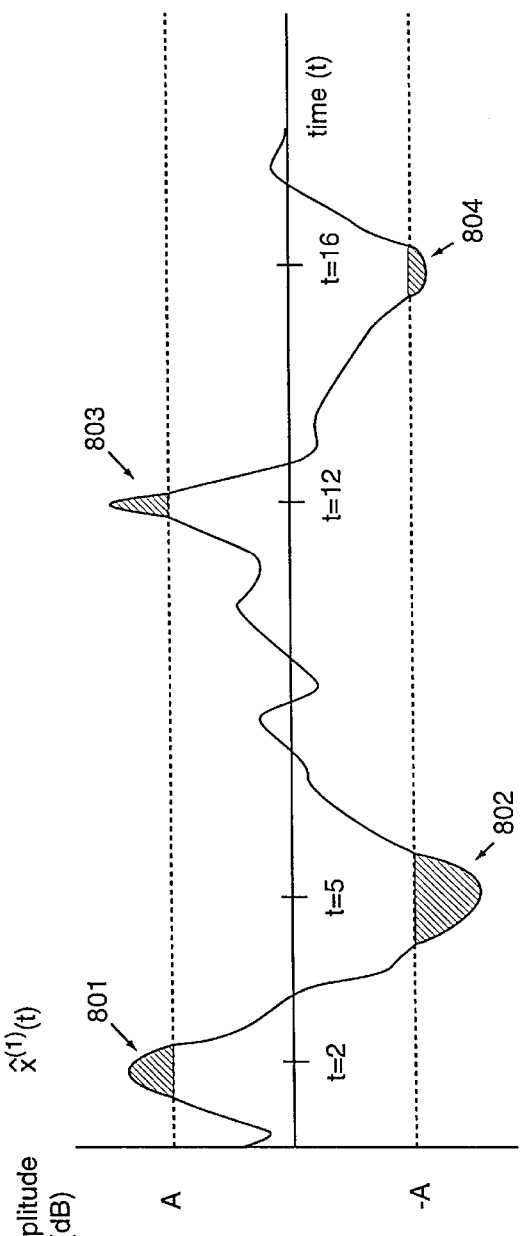

US 6,314,146 B1

PEAK TO AVERAGE POWER RATIO REDUCTION

CROSS-REFERENCE TO RELATED APPLICATIONS

The present inventions relates to U.S. patent application Ser. No. 09/062,867, entitled "Peak to Average Power Ratio Reduction", by Jose Tellado and John M. Cioffi, filed Apr. 20, 1998, which is incorporated herein by reference in its entirety; and relates to U.S. patent application Ser. No. 09/081,493, entitled "Peak to Average Power Ratio Reduction", by Jose Tellado and John M. Cioffi, filed May 19, 1998, which is incorporated herein by reference in its entirety.

BACKGROUND OF THE INVENTION

This invention relates generally to communication systems. The present invention relates more specifically to reducing peak to average power ratios in single carrier and multi-carrier communication systems.

In recent years multi-carrier communication systems have received more attention. Multi-carrier communication systems offer the promise of increased bandwidth combined with two-way communications.

However, several problems still remain to be solved to ensure the widespread use of multi-carrier communication systems. One concern is how to reduce the peak to average power ratio of a multi-carrier transmission.

Referring to FIG. 1, a multi-carrier transmission is composed of a number of independent signals. FIG. 1 is a frequency domain plot of several signals $10(1)$–$10(n)$. Each signal $10(1)$–$(n)$ is centered a different frequency $f(1)$–$f(n)$. Often times the frequencies are equally spaced apart. The frequencies are commonly referred to as carrier frequencies.

In most multi-carrier communication systems the signals $10(1)$–$(n)$ are combined together as a vector. An inverse fast fourier transform (IFFT) is usually performed on the vector to produce a discrete time domain signal which is converted to a continuous time domain signal and transmitted. FIG. 2 illustrates a continuous time domain representation of a typical output signal 30 of a multi-carrier transmitter.

Signal 30 contains a number of peaks 31–34. A problem with the output signal is that the peaks 31–34 often times exceeds the output capabilities of the transmitter. If the transmitter is only capable of transmitting at amplitudes of up to +/−10 dB, the peaks saturate the transmitter and the peaks are cutoff in the transmitted signal. Saturation causes the transmitted signal to lose a significant amount of information, which may or may not be corrected for by the receiver. Thus, it is important to reduce the peaks in order to maintain the integrity of the transmitted signal.

Reducing the peak to average power ratio of a signal requires that the number and magnitude of the peaks are reduced. There have been several attempts to reduce peak to average power ratios, although they are only successful to a certain extent.

The placement of the different signals $10(1)$–$(n)$ at different carrier frequencies $f(1)$–$f(n)$ affects the shape of the output signal 30. One method randomly shuffles the phase of the signals $10(1)$–$10(n)$ at each carrier frequency $f(1)$–$f(n)$. Random shuffling does not completely eliminate the problem, although randomizing has been shown to somewhat reduce the peak to average power ratio to an extent. Random shuffling also requires performing an additional IFFT. In addition to not completely reducing the peak to average power ratio to a practical point, that particular method also requires that additional information, side information, be sent along with the transmitted signal. In order for the receiver to be able to decode the transmitted signal the receiver must also know how the signals $10(1)$–$10(n)$ were randomized. Thus, the randomization scheme requires extra bandwidth to transmit the side information and does not effectively reduce the peak to average power ratio.

Another method has been applied to multi-carrier communication systems that use a small number of carrier frequencies. In that method all the different possible outputs of each signal $10(1)$–$10(n)$ are simulated. For example, if each signal $10(1)$–$(n)$ is a 4-ary quadrature amplitude modulated signal, each signal would be one of four different waveforms. If there are ten carrier frequencies, then over a million combinations are simulated. Those combinations of the outputs of signals $10(1)$–$(n)$ that exhibit peak to power ratios that exceed a specified limit are not used in actual transmissions. Typically, a channel must be simulated periodically because of changes in the channel's characteristics.

The elimination of some of the possible combinations of the outputs of the signals, however, reduces the bandwidth of the communication scheme. Further, the method can only be applied to communication systems that use a few carriers since the number of simulations required increases exponentially with an increase in the number of carriers. That is, if M-ary QAM and N frequencies are used, $N^M$ combinations must be simulated. M can be as high as 1024 and N even larger. Thus, this method becomes impractical when even a moderate number of carriers are used.

A third method involves performing inverse fast fourier transforms on subsets of the signals $10(1)$–$(n)$. For example, an IFFT may be performed on the first one fourth signals, another IFFT for the second one fourth, and etc. The four output signals may then be linearly combined to provide one output signal. Reducing the number of carriers within a single IFFT output reduces the peak to average power ratio for that output signal since there are fewer signal components. The linear combinations are compared to determine which combination has the best PAR.

As the number of signals and carriers increase the number of IFFTs that must be performed on the subsets of the signals increase, according to the number of signals incorporated within a single IFFT. The complexity of the transmitter thereby increases by the number of IFFTs that must be performed, compared to a single IFFT. Further, information about the linear combination of the transmitted signal must also be passed along to the receiver. This information is even more vital, and usually requires additional bandwidth to ensure proper reception and decoding of the information.

In yet another method of reducing peak to average power ratio, the output signal of an IFFT of all the signal components is scaled to bring the peaks below the maximum level. A problem with this solution is that the signal to noise ratio is reduced proportionally with the scaled factor. Reducing the signal to noise creates a great number of other problems which makes this method unattractive. For example, as the signal to noise ratio decreases more errors occur during transmission.

What is desired is a method of reducing the peak to average power ratio of a transmission within a multi-carrier communication system. A method without a significant decrease in the amount of usable bandwidth, and with low complexity such that reduction of the peak to average power ratio may be performed in real time, is also desirable.

SUMMARY OF THE INVENTION

The present inventions provide methods and systems for estimating the distortion of a received signal. Generally, any type of distortion may be estimated in order to better decode he received signal.

In one embodiment the distortion is intentionally introduced into the signal in order to reduce the peak to average power ratio of a single carrier or multi-carrier signal. Reducing the peak to average power ratio of a signal ensures that amplifiers and transmitters are not saturated, causing loss of data. Further, reducing peak to average power ratios reduces the consumption of power during transmission.

In another embodiment of the present inventions the distorted signal is transmitted without further attempts to embed information about the distortion back into the signals. Rather, a receiver receives the distorted signal and estimates the missing information about the signal. The receiver reconstructs the original signal based upon the estimates of the distortion of the signal.

In one particular embodiment, the signal is clipped as the form of distortion. The receiver estimates the clipped portions of the signal in order to estimate and reconstruct the original signal. In alternate embodiments some information about the clipping of the signal is sent, such as the number of clips, magnitude of the clipping or information about the largest clip. In alternate embodiments, side information is also provided to the receiver about the distortion.

These and other advantages of the present invention will become apparent to those skilled in the art upon a reading of the following descriptions of the invention and a study of the several figures of the drawing.

BRIEF DESCRIPTION OF THE DRAWINGS

FIGS. 10A–C illustrate several approximate impulse functions p(t) in accordance with an embodiment of the present inventions.

FIG. 11. illustrates a multi-carrier transmitter in accordance with an embodiment of the present inventions.

FIG. 13 illustrates a receiver in accordance with an embodiment of the present inventions.

FIG. 25 illustrates a received signal $y^{clip}(t)$ in accordance with an embodiment of the present inventions.

FIG. 26 illustrates a reconstructed signal $\hat{x}^{(1)}(t)$ that is the first estimate of x(t) in accordance with an embodiment of the present inventions.

DETAILED DESCRIPTION OF THE PRESENT INVENTIONS

The present inventions provide apparatuses and methods of reducing peak to average power ratios in single carrier and multi-carrier communication systems without significantly reducing the amount of bandwidth. The present inventions may also be implemented with a low amount of complexity such that they may be implemented in real time. Additionally, no significant amount of side information is required, which would reduce bandwidth, nor is there a reduction in the signal to noise ratio or quality of service.

The present inventions apply to any type of communication systems utilizing multiple carriers. By way of example, the present inventions apply to Discrete Multi-Tone (DMT), Orthogonal Frequency Division Multiplexing (OFDM), Discrete Wavelet Multi-Tone (DWMT) communication systems, Vector Coding Modulation. Alternate embodiments of the present inventions apply to single carrier communication systems, such as Carrier-less Amplitude Phase (CAPs), vestigial side band, amplitude modulation and the like.

Figure 1:
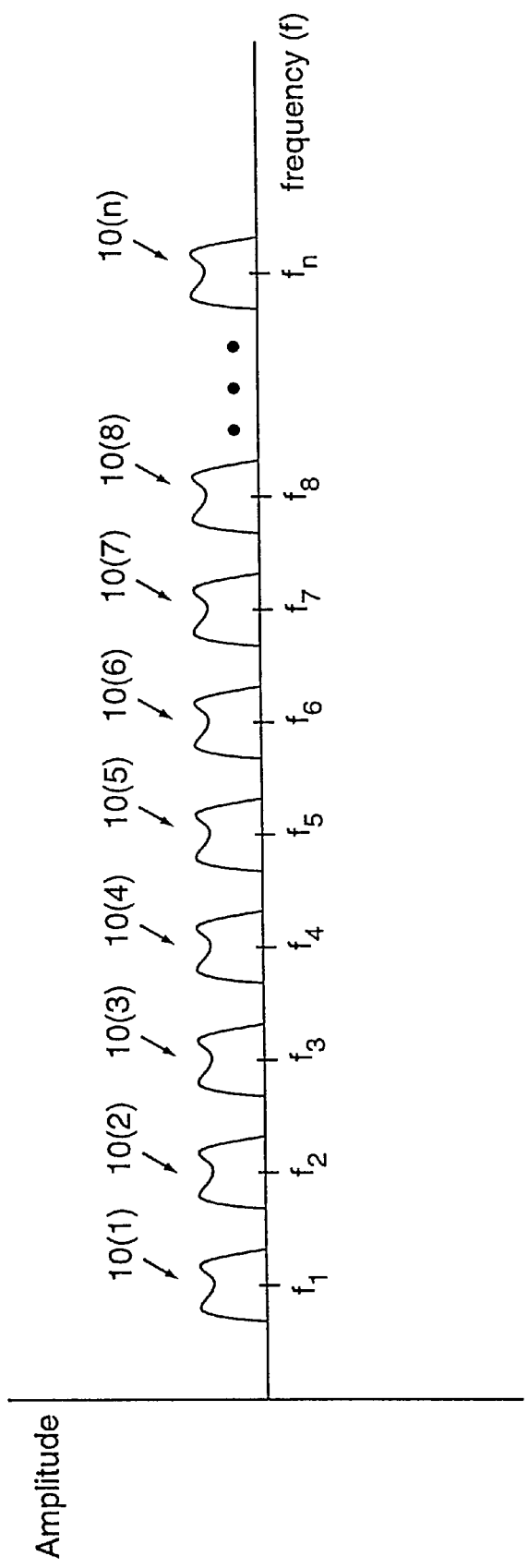
FIG. 1 illustrates a frequency domain plot of several signals of a multi-carrier communication system.
Figure 2:
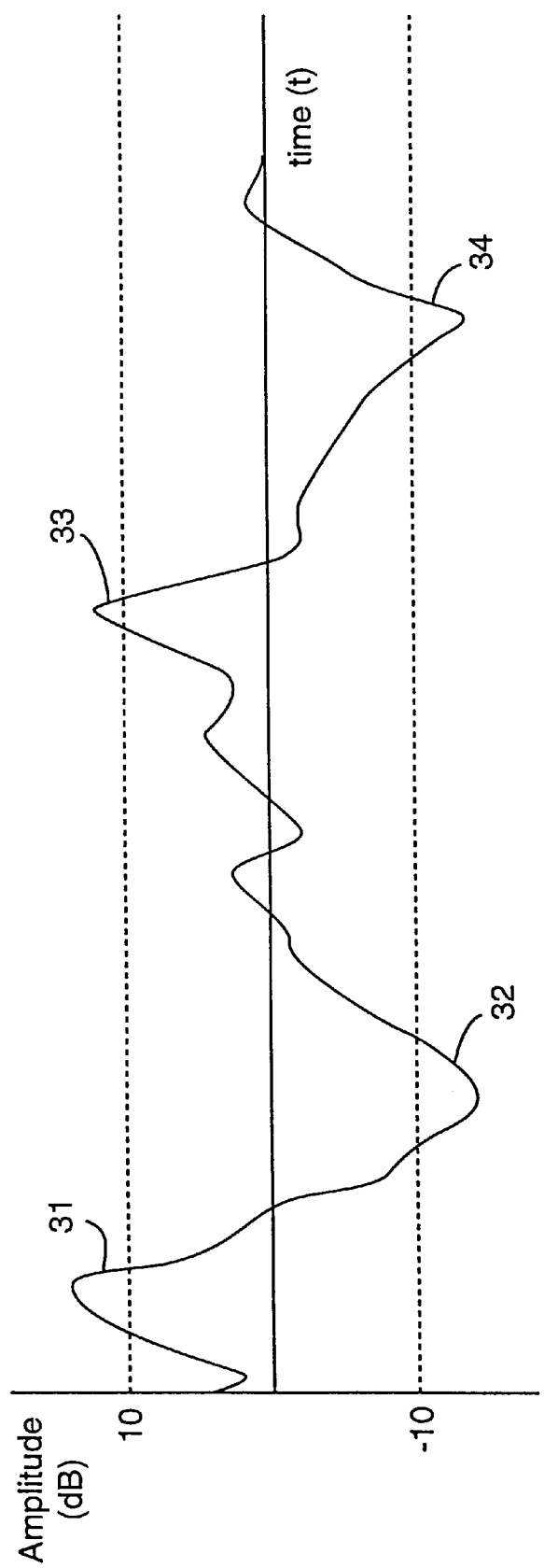
FIG. 2 illustrates a continuous time domain representation of a typical output signal of a multi-carrier transmitter.
Figure 3:
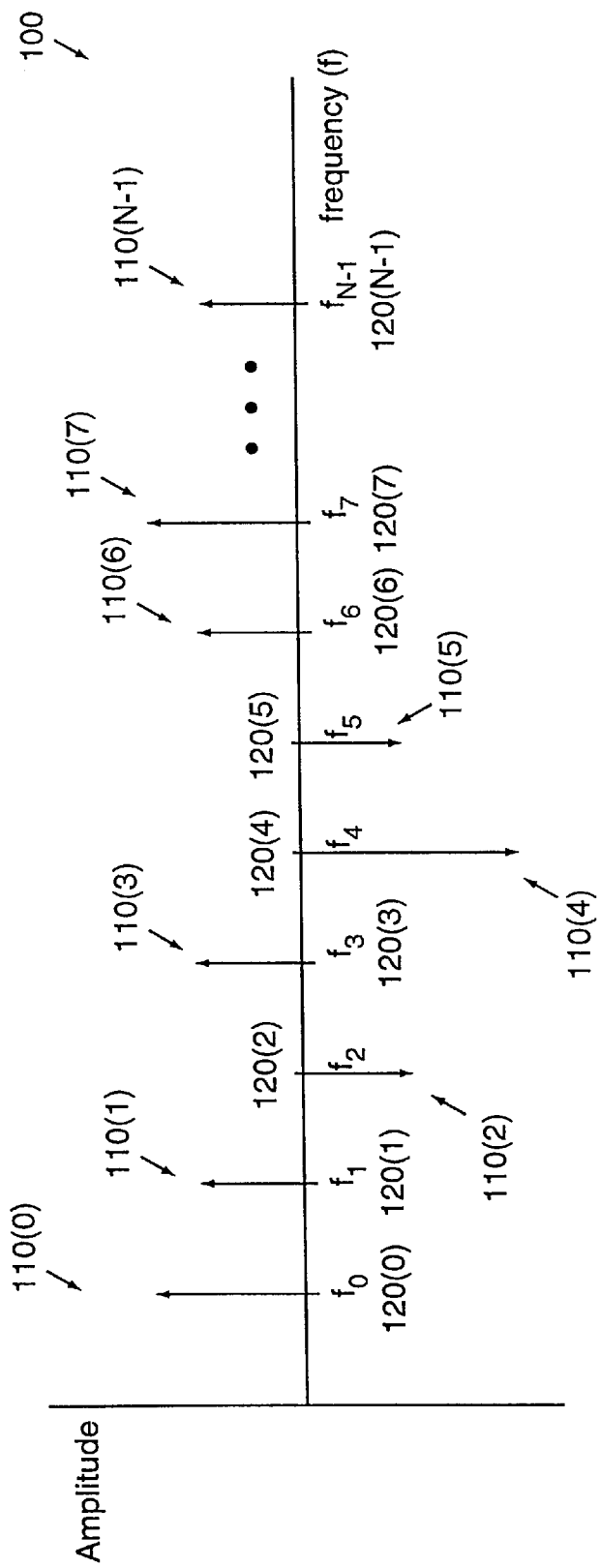
FIG. 3 illustrates a frequency domain plot of a DMT symbol prior to applying an inverse fast fourier transform.

Referring to FIG. 3, a multi-carrier communication system takes advantage of a channel by sending several signals over a wide band of frequencies. FIG. 3 is a frequency domain plot of a DMT symbol 100 prior to applying an inverse fast fourier transform. The DMT symbol is a function of a number of signals 110(0)–110(N−1), each centered at a different frequency 120(0)–(N−1). While details of the present inventions are discussed in terms of a DMT communication system, the advantages of the present inventions apply readily to other types of multi-carrier communication systems, and the present inventions are not restricted to only DMT systems.

Each signal 110(0)–(N−1) may carry any number of bits of information in a digital system. By way of example, each signal may be modulated by M-ary quadrature amplitude modulation, M-ary phase shift key, frequency modulation, amplitude modulation, continuous phase modulation or any other type of suitable modulation scheme. The illustrated signals are M-ary quadrature amplitude modulated. Thus, each signal 110(0)–(N−1) has a magnitude and a phase in addition to its frequency.

Figure 4:
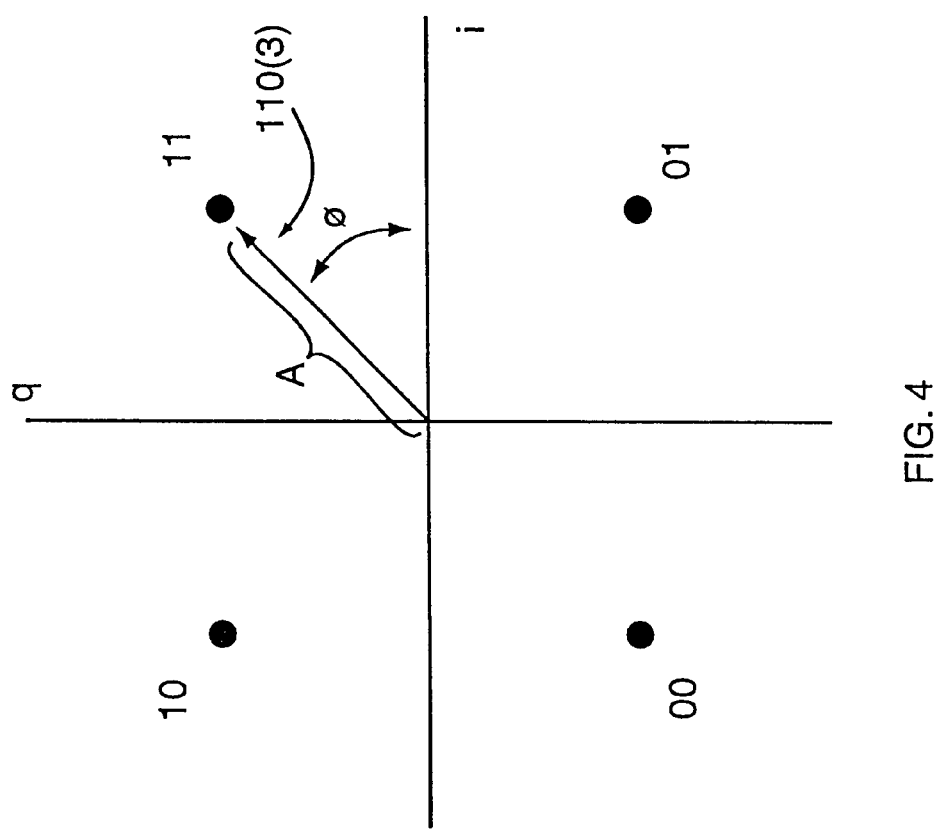
FIG. 4 illustrates a signal constellation of a signal that is 4-ary quadrature amplitude modulated.

FIG. 4 is a signal constellation of signal 110(3) that is 4-ary quadrature amplitude modulated. Signal 110(3) has an amplitude, A, and a phase, ø. Depending upon the amplitude and phase, signal 110(3) may represent one of four binary values, 00, 01, 10 and 11, as illustrated.

Each signal 110(0)–(N−1) are all quadrature amplitude modulated, but may have different constellations. The number of constellation points that a signal represents depends upon the characteristic of the channel for that particular frequency. That is, if frequency 120(4) is less noisy than frequency 120(3), then signal 110(4) may have an 8-ary QAM constellation or greater. Thus, by looking at the characteristics of the channel less noisy frequencies may carry signals that represent a greater number of bits.

In one embodiment of the present inventions, those frequencies that have a lot of noise and are capable of only carrying low bit rate signals are used as peak reduction frequencies. The peak reduction frequencies may carry no signal at all. It has been found that having peak reduction frequencies that carry no signal may sometimes marginally help to reduce the peak to average power ratio of a transmission.

In another embodiment, the peak reduction frequencies carry peak reduction signals. Peak reduction signals, like regular signals, have an amplitude and a phase. However, in one embodiment, the peak reduction signals generally do not carry any data. Rather, the peak reduction signals are scaled and shifted such that the peaks of the output signal are dramatically reduced.

In alternate embodiments of the present inventions, the peak reduction frequencies may be chosen by any suitable method. Frequencies that are noisy are utilized as peak reduction frequencies since the decrease in data rate of the output symbol is minimized. However, a different selection of peak reduction frequencies may provide better peak to average power ratio reduction with fewer peak reduction frequencies. It has been found that randomly selected peak reduction frequencies provides good peak to average power ratio attenuation. Selection of peak reduction frequencies is discussed further below.

Because of the properties of an inverse fourier transform changing the attributes of one or more of the components of a signal before it is inverse fourier transformed effects the transformed signal. In the case of DMT a discrete time signal x is generated from a number complex valued QAM modulated signals 110(0)–(N−1), or X. Where $$x = [x_0 \ldots x_n \ldots x_{N-1}];$$

and $$X = [X_0 \ldots X_n \ldots X_{N-1}];$$

The elements of X are complex values that represent the amplitude and phase of the signals $X_0$–$X_{N-1}$, where the frequencies $f_0$–$f_{N-1}$, are of equal bandwidth and separated by 1/T, where T is the time duration of a DMT symbol. Each element of x is a symbol derived from X defined by:

$$x_n = \frac{1}{\sqrt{N}} \sum_{k=0}^{N-1} X_k e^{j2\pi kn/N}, k = 0, \ldots, N-1$$

which can be written as x=QX, where Q is the IFFT matrix and the elements of Q are $$q_{n,k} = \frac{1}{\sqrt{N}} e^{j2\pi kn/N}.$$

The peak to average power ratio (PAR) of x is then:

$$PAR = \frac{\|x\|_\infty^2}{\varepsilon[\|x\|_2^2]/N}$$

where $\|v\|_\infty$ is the ∞-norm of the vector v, or the maximum absolute value, $\|v\|_2$ is the 2-norm of the vector v, or the root mean square, and $\varepsilon[f(v)]$ is the expected value of the function f(v).

The peak reduction frequencies, once chosen, can be assigned arbitrary amplitudes and phases. In one embodiment, the peak reduction frequencies may be initialized with zero amplitude and zero phase. The values for the peak reduction signals are represented as the vector c in the time domain, and C in the frequency domain, where.

$$x+c=Q(X+C)$$

The possible values for c are chosen such that $$PAR(c^*) = \frac{\min_c \|x+c\|_\infty^2}{\varepsilon[\|x\|_2^2]/N} << \frac{\|x\|_\infty^2}{\varepsilon[\|x\|_2^2]/N}$$

where c* is the optimal solution for c. The value of the right side of the inequality is the PAR of the signal generated from the vector x, and the left side of the inequality is the PAR of the peak reduced signal generated from the vector x+c.

The values for C at the peak reduction frequencies may be any suitable value that helps to reduce the peaks in the transmitted multi-carrier symbol. However, the values for C at the non-peak reduction frequencies are always zero, such that the values of C do not interfere with X. Thus, $$C_k = \begin{cases} C_k, k \in \{i_1, \ldots, i_L\} \\ 0, k \neq \{i_1, \ldots, i_L\} \end{cases}$$

Initially, $C_k$ may be set to zero, and the values for $C_k$ changed later to reduce the PAR. L is the number of peak reduction frequencies that are utilized to reduce the PAR of x. If N frequencies are available, then the ratio of peak reduction frequencies to the overall number of frequencies is L/N. However, the actual bandwidth loss is the number of bits that the peak reduction frequencies were capable of carrying over the total number of bits that all N frequencies are capable of carrying. By selecting peak reduction frequencies that are capable of carrying few, or zero, bits per symbol, bandwidth loss is minimized. The non-zero values, $C_k$ for $k \in \{i_1, \ldots, i_L\}$ or ĉ, are called the peak reduction signals, or peak reduction tones in the case of DMT, or more generally dummy signals.

Figure 5:
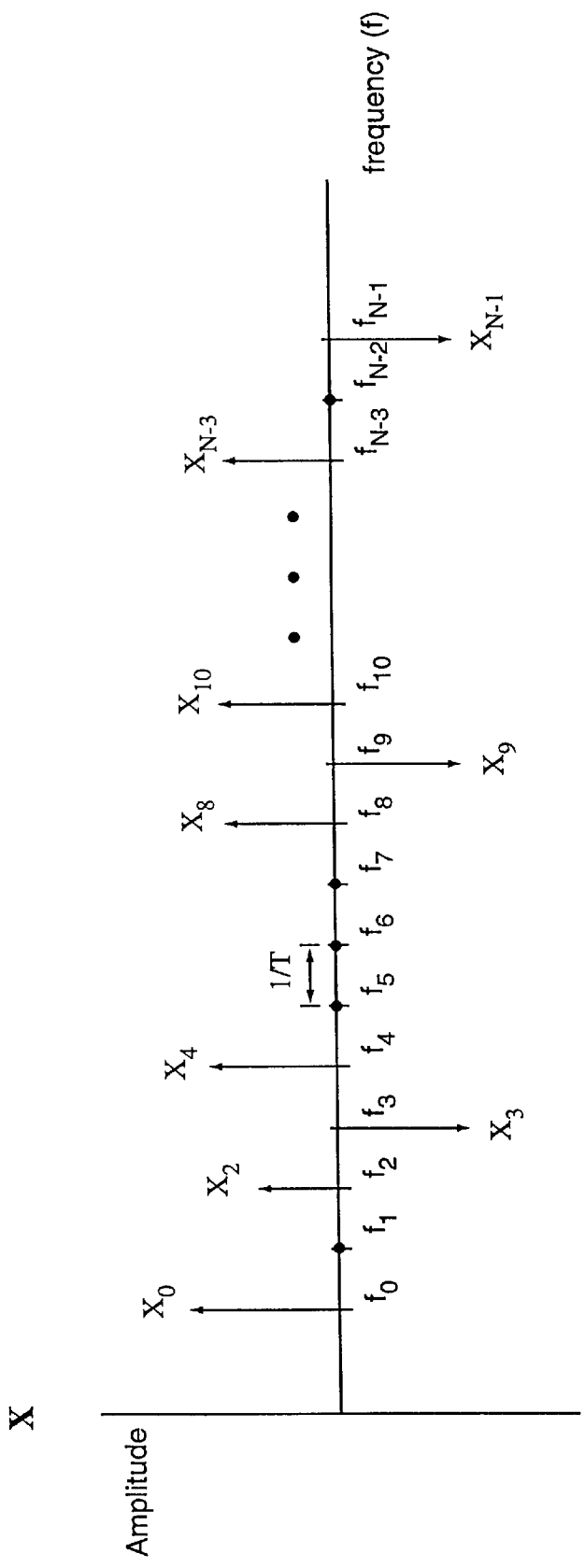
FIG. 5 illustrates a frequency domain representation of X in accordance with an embodiment of the present inventions.
Figure 6:
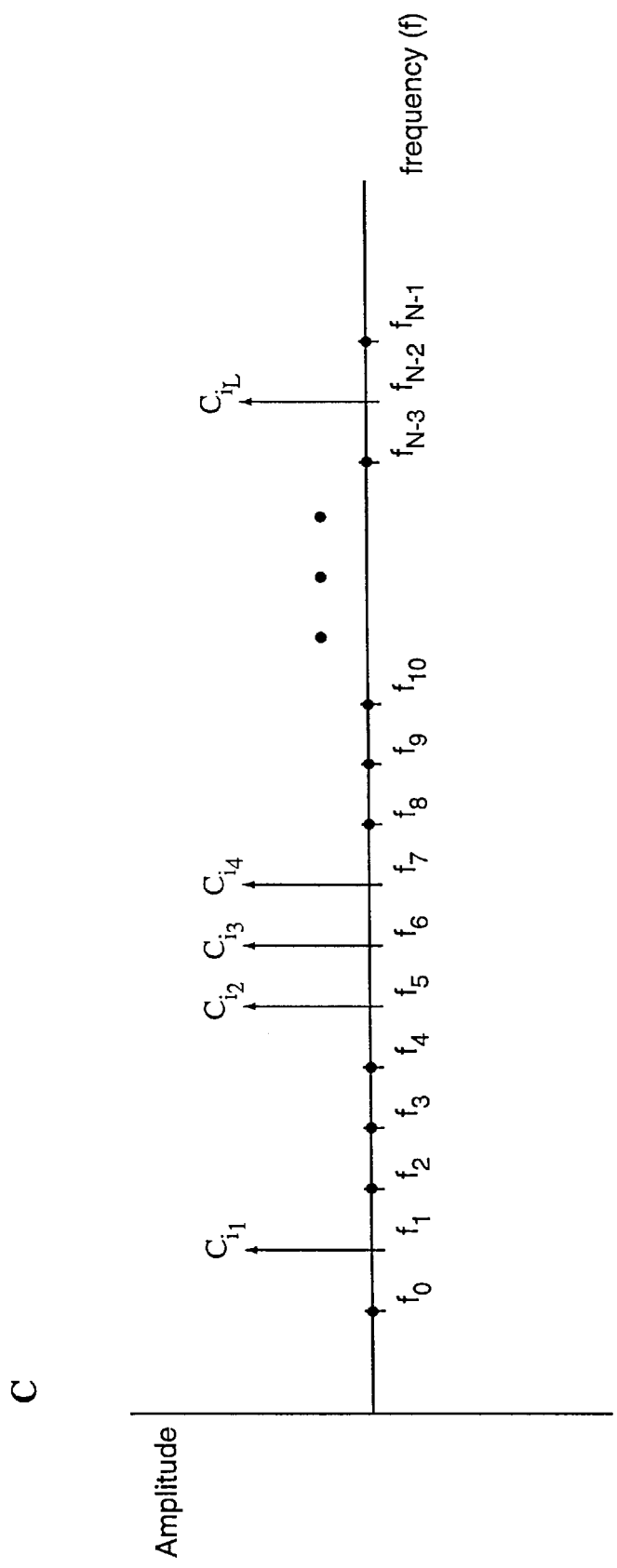
FIG. 6 illustrates the frequency domain representation of C in accordance with an embodiment of the present inventions.

The values for X are zeroed at the peak reduction frequencies. FIGS. 5 and 6 show the frequency domain representations of X and C, respectively, according to one embodiment of the present inventions. The frequencies $f_1$, $f_5$, $f_6$, $f_7$ and $f_{N-2}$ are chosen as peak reduction frequencies. Accordingly, the values for $X_1$, $X_5$, $X_6$, $X_7$ and $X_{N-2}$ are zero. The other values for X correspond to the amplitude and phase of those signals.

In alternate embodiments, only one component of the values of X may be zeroed out and used for peak reduction purposes. By way of example, the real part of the values of $X_1$, $X_5$, $X_6$, $X_7$ and $X_{N-2}$ may be zeroed out and the imaginary part of the components used to carry information. Analogously, one of the phase or amplitude components of the values of X may be zeroed out and used for peak reduction while the other is used to carry information.

The values for C correspond to the peak reduction frequencies. The index i conforms to the peak reduction frequencies, e.g., $i_1$ is the index for the first peak reduction frequency $f_1$ $i_2$ is the index for the second peak reduction frequency $f_5$, and etc.

Figure 7:
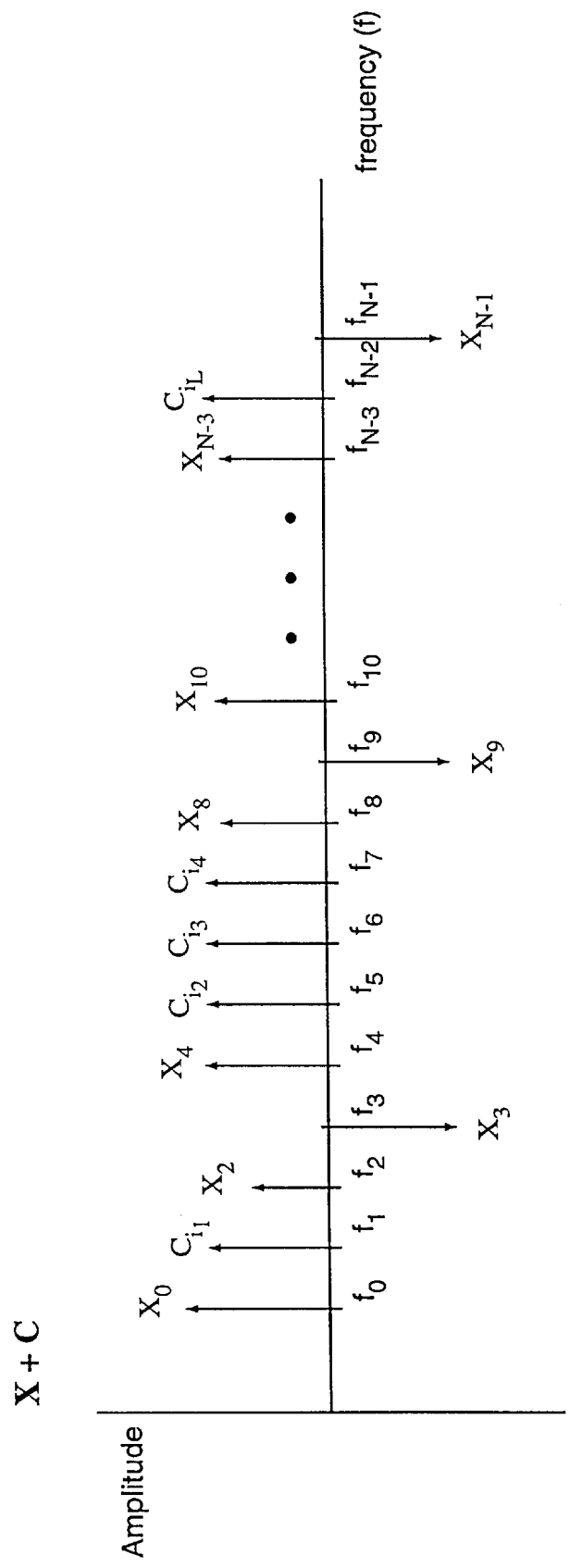
FIG. 7 illustrates the frequency domain representation of X+C in accordance with one embodiment of the present inventions.

FIG. 7 illustrates the frequency domain representation of X+C, in accordance with one embodiment of the present inventions. In the combined signal all the frequencies contain a signal. The non-zero values of peak reduction signals C are located at the peak reduction frequencies, while the actual signals X are located at the non-peak reduction frequencies. Initially, the peak reduction signals C may have any arbitrary values. However, it is useful to initialize the values of C at zero.

Figure 8:
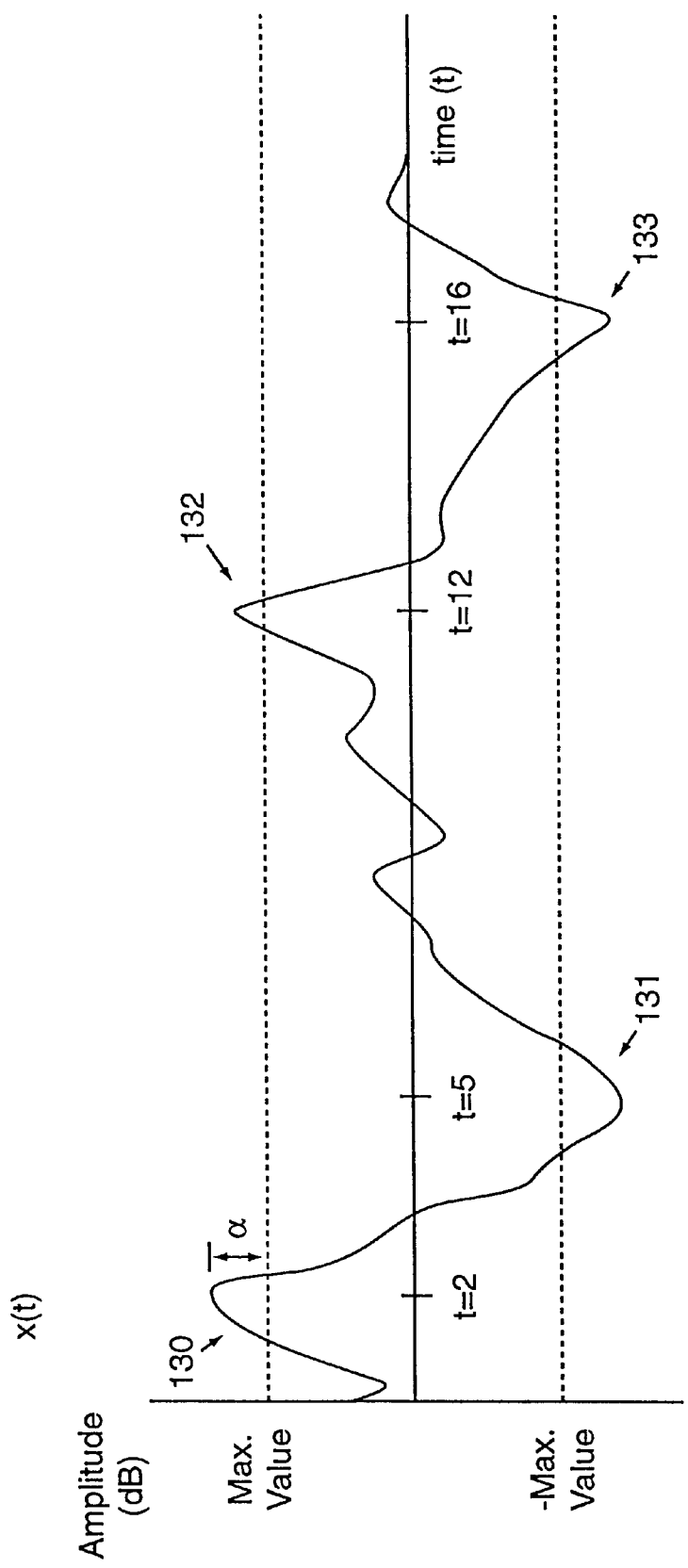
FIG. 8 illustrates the continuous time domain representation of a symbol signal x(t) of a multi-carrier communication system in accordance with an embodiment of the present inventions.
Figure 9:
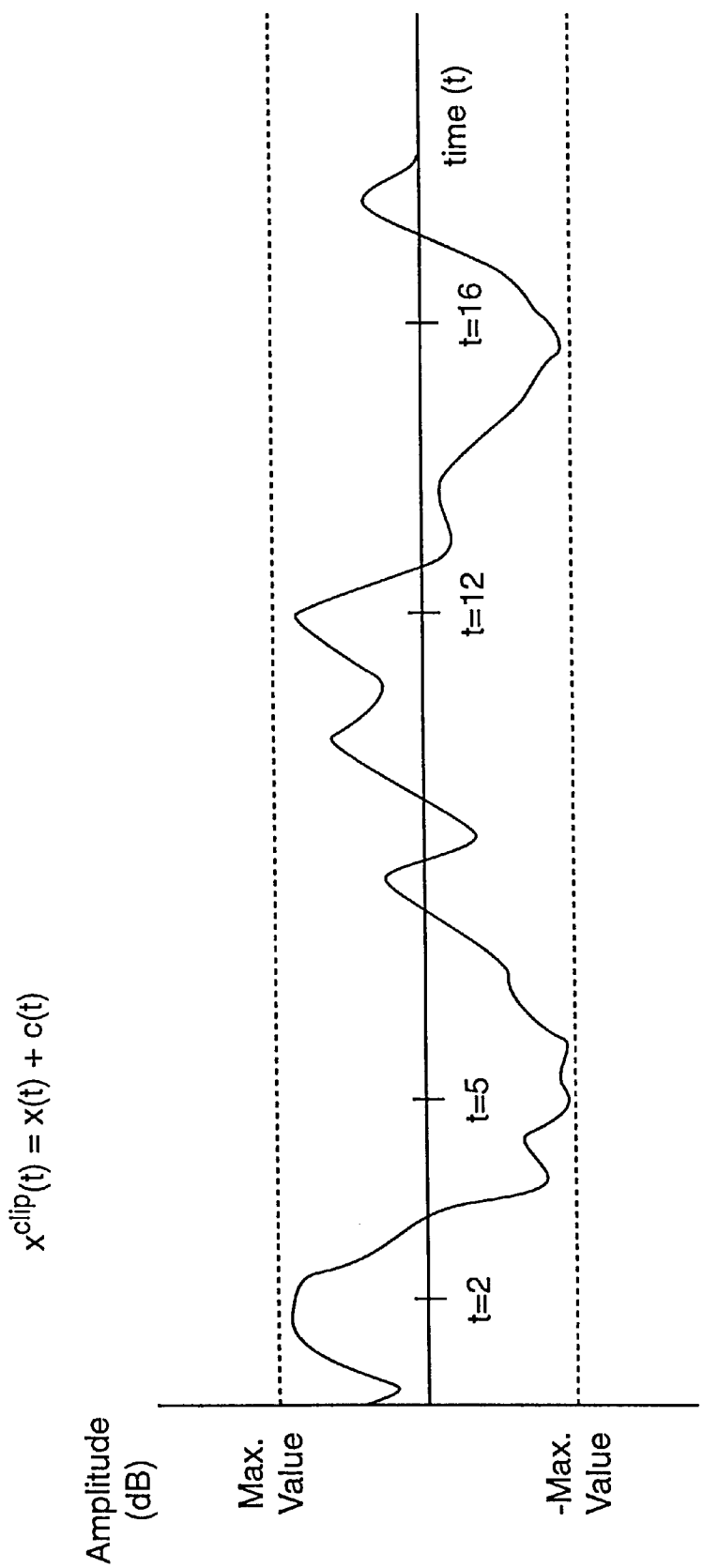
FIG. 9 illustrates a time domain representation of a desired symbol signal $X^{clip}(t)=x(t)+c(t)$ in accordance with an embodiment of the present inventions.

The first set of values of C may then be represented as the initial values C(0). If C(0) are zeroes, then X+C(0)=X, and x+c(0)=x. The time domain representation of x+c(0) is equivalent to the unmodified signal x(t), as illustrated in FIG. 8. However, the values for C should be chosen to provide a signal (x+c) that does not have peaks that exceed a predetermined magnitude. FIG. 9 is a time domain representation of a desired signal $x^{clip}(t)=x(t)+c(t)$ generated by the vector x+c.

The continuous time domain waveforms depicted in FIGS. 8, 9 and other figures are representative of analogous discrete time domain waveforms. A majority of the algorithms used in the present inventions are predominantly performed in discrete time due to practical considerations. The continuous time domain waveforms are used for purposes of illustration. However, the scope of the present inventions includes analogous algorithms performed in continuous time and frequency domains.

The values for C* and c*, the optimal solution that would provide an $x^{clip}(t)$ with the smallest PAR, may be obtained by solving the following equation:

$$\min_c \|x+c\|_\infty = \min_{\hat{c}} \|x + \hat{Q}\hat{c}\|_\infty$$

$\hat{Q}$ is the sub-matrix of Q constructed from the columns $i_1, \ldots, i_L$ and ĉ represents the non-zero values of C. c* can actually be solved through linear programming. Solutions may also be found separately for the real and the imaginary parts of x or X.

The above equation may be rewritten in the following form:

$$\min_{\hat{c}} t$$

subject to $x + \hat{Q}\hat{c} \leq_N t1_N$, $$x + \hat{Q}\hat{c} \geq_N -t1_N$$

Moving all the unknowns to the left hand side, the equations may be rewritten as:

$$\min_{\hat{c}} t$$

subject to $\hat{Q}\hat{c} - t1_N \leq_N -x$, $$\hat{Q}\hat{c} + t1_N \geq_N -x$$

or $$\min_{\hat{c}} t$$

subject to $\begin{pmatrix} \hat{Q} & -1_N \\ -\hat{Q} & -1_N \end{pmatrix} \begin{pmatrix} \hat{c} \\ t \end{pmatrix} \leq_{2N} \begin{pmatrix} -x \\ x \end{pmatrix}$ The linear program has 2L+1 unknowns {Real(Ĉ), Imag(Ĉ), t} and 2N inequalities written in the standard linear program form:

$$\min c^T x$$

subject to $Ax \leq_N b$

Linear programming algorithms exist to solve for c*. The linear programming solutions provide the ideal solution c*. Currently, the exact solution approach is most practical in communication systems operating at data rates of approximately 500 kbps or lower because of the amount of computations required to compute the exact solution for c*. However, good approximations of c* may be obtained such that the PAR of x can be satisfactorily reduced in real time for higher data rate systems. However, as processing power becomes more readily available in the future the linear programming solution may be utilized in multi-carrier communication systems operating at higher speeds in accordance with the present inventions.

Approximating c, C

As seen in FIG. 8, the time domain signal x(t) has several peaks 130–133. The peaks 130–133 can be reduced by adding or subtracting an appropriately scaled impulse function δ(t) at those peak time values. The impulse function, however, must be constructed from the peak reduction frequencies, $\{i_1, i_2, \ldots, i_L\}$. Since a true impulse function cannot be created by less than all the frequency components, i.e., when L<N, an approximate impulse must be used, p.

FIGS. 10a–c illustrate several approximate impulse functions p(t), generated from different values of p, in accordance with one embodiment of the present inventions. Since only the L peak reduction frequencies can be used to create the approximate impulse function p(t), or kernel, p(t) is not ideal. One useful constraint that may be placed upon p(t) is that the value for p(0) is equal to one. This allows p(t) to be scaled more readily.

FIG. 10a may be a first approximation of an impulse. The lobes around the impulse should however be reduced in magnitude. The side lobes should be reduced to ensure that when the impulse is applied to x(t) to clip a particular peak no other portion of x(t) exceed the maximum value. Another approximation of an impulse may look like the approximation in FIG. 10b. Obviously, the secondary peaks of FIG. 10b poses a problem when applied to x(t). Ideally, p(t) should resemble the waveform depicted in FIG. 10c.

Solving for the mean square error between $p=\hat{Q}\hat{P}$ and an ideal discrete time impulse $e_0=[10 \ldots 0]^T$ provides the solution for an approximation of p that is the mean square error. The mean square error minimizes the sum of all the peaks of the kernel, or power, other than the peak at p(0).

$$\hat{P}_2^b = \underset{\hat{P}}{\arg\min} \|\hat{Q}\hat{P} - e_0\|_2^2,$$

$$p_2^b = \hat{Q}\hat{P}_2^b$$

The solution becomes:

$$\hat{P}_2^b = (\hat{Q}^T\hat{Q})^{-1}\hat{Q}^T e_0 = \hat{Q}^T e_0 = \frac{1}{\sqrt{N}}[1 \ldots 1]^Y = \frac{1}{\sqrt{N}}1_L$$

$$p_2^b = \frac{1}{\sqrt{N}}\hat{Q}1_L$$

Since the value for $p_0$ should be equal to one we can scale the result to obtain the mean square error optimal solution for p,p*.

$$\hat{P}_2^* = \frac{\sqrt{N}}{L}1_L$$

$$p_2^* = \frac{\sqrt{N}}{L}\hat{Q}1_L$$

Since P has non-zero values only at the peak reduction frequencies, C may be represented as any suitable linear combination of P. The linear combinations of P correspond to the scaled and shifted versions of the kernel, p, such that the scaled and shifted versions of p negate the peaks of x. For example, if p(t) of FIG. 10c were to be applied to x(t) of FIG. 8, p(t) would be inverted and shifted to t–2 in order to cancel out the first peak 130. Also, if the first peak 130 exceeded the maximum value by some factor α, p(t–2) would be scaled by a value greater than α, such as (1.2α). When x(t) and (1.2α)p(t–2) are added the value at t=2 would be the maximum value +α–1.2α, which gives us a value less than the maximum value (maximum value –0.2α). The scaling and time shifting of p merely scales and phase shifts the values of P, and therefore $\hat{C}$. $\hat{C}$, which is a linear combination of P, will have zero values at the non-peak reduction frequencies.

Any number of peaks may be clipped in this fashion in one iteration. However, reducing one or more peaks may cause the resulting waveform to exceed the maximum value at other positions. Therefore, the process may be repeated with the resulting $X^{clip}+c$ to achieve a new $x^{clip}$ with a PAR that is satisfactory.

In order to minimize the second highest peak of p(t), thereby reducing all the peaks other than the peak at p(0), a linear program may be used to solve for the infinite norm equation.

$$\hat{P}_\infty^* = \arg\underset{\hat{P}}{\min}\|[p_1 \; p_2 \; \ldots \; p_{N-1}]\|_\infty^2, \text{ subj. to } p_0 = 1$$

$$p_\infty^* = \hat{Q}\hat{P}_\infty^*$$

$p^*_\infty$ provides the optimal solution, producing a p(t) that resembles the waveform illustrated in FIG. 10c.

The solution of p regardless of its order may be computed in advance, or off-line, since only the peak reduction frequencies need to be known. Thus, p may be predetermined once the peak reduction frequencies have been chosen. Once p is known, p may be linearly combined in any fashion to produce the necessary values for c and C. The resulting c is a good approximation of c* depending upon the number of iterations performed.

In one embodiment, the choice of the peak reduction frequencies may be based upon obtaining a good kernel, p. Once the number of peak reduction frequencies, L, has been determined, the location of the peak reduction frequencies may be determined based upon deriving a good, or the best, kernel, p. Certain quality factors may be imposed before accepting a p as a valid kernel. By way of example, a p with secondary peaks greater than a predetermined magnitude may be rejected. That set of peak reduction frequencies may then be rejected and a new set of peak reduction frequencies selected to provide a better p.

It has been found that randomly selected peak reduction frequencies will often times provide a good kernel. If a first set of peak reduction frequencies chosen randomly does not provide a good kernel, a new selection of peak reduction frequencies that swap a subset of the first randomly chosen peak reduction frequencies sometimes provides a better kernel. The combinations of peak reduction frequencies may be iteratively evaluated until a kernel with the appropriate characteristics is obtained.

In another embodiment, peak reduction frequencies may be chosen based upon the bit rates of the frequencies. In one instance, a pseudo-random selection of the peak reduction frequencies may be performed with weights applied to those frequencies that have low bit rates that make the selection of those frequencies more likely. If after several iterations a proper kernel, p, cannot be obtained the weights may be adjusted since the weighted frequencies may not be good candidates for constructing a proper kernel.

After the peak reduction frequencies have been chosen the optimal, or a good approximation of the optimal kernel is computed. Using the resulting kernel, p, the peak reduction vector c, containing the peak reduction signals, or peak reduction signals, may be constructed. Initially, the vector x+c(0), where the values of c(0) is all zeroes, is computed by taking the IFFT of the vector X, containing zero values in the peak reduction frequencies. If only one peak is negated during a single iteration of applying the kernel, p, is performed $x^{clip}(1) = x+c(1)$, where $c(1) = A_1 p[(n-\Delta_1)]_N$ in the discrete time domain, where is A a scaling factor and $\Delta$ is a time shift. If two peaks are canceled in one iteration $$x^{clip}(1) = x+c(1), \text{ where } c(1) = A_1 p(n-\Delta_1) + A_2 p(n-\Delta_2),$$

and so on.

Any number of peaks may be canceled in a single iteration. Obviously, canceling more peaks requires more computations per iteration without being able to readily determine if the multiple application of several scaled and/or shifted kernels have not introduced newly created peaks. Thus, in one embodiment, it may be advantageous to limit the number of peaks per iteration. Once an iteration is complete the kernels may be linearly combined to produce c(j), where j is the current iteration. After computing c(j) and adding it to x, the new $x^{clip}$, $x^{clip}(j)$, can be reevaluated to determine if further peaks require cancellation.

Further iterations may be performed by taking the previous $x^{clip}$ and adding another set of values for c, i.e., $x^{clip}(j) = x^{clip}(j) + c(j)$. Since the values of x remain the same because p and P are only functions of the peak reduction frequencies this sum expands to $$x^{clip}(j) = x + c(0) + c(1) + \ldots + c(j-1) + c(j),$$

or $$x^{clip}(j) = x + \sum_{m=0}^{j} c(m)$$

$$c^* = \sum_{m=0}^{j} c(m) \text{ as } j \to \infty$$

The sum of c's is equal to a number of scaled and/or shifted kernels, p. If only one peak is corrected (only one peak is canceled) per iteration then the equation becomes:

$$x^{clip}(j) = x + A_1 p[(n-\Delta_1)]_N + A_2 p[(n-\Delta_2)]_N + \ldots + A_{j-1} p[(n-\Delta_{j-1})]_N + A_j p[(n-\Delta_j)]_N,$$

or $$x^{clip}(j) = x + \sum_{m=0}^{j} A_m p[(n-\Delta_m)]_N$$

Thus, c is computed simply by performing multiplies and adds, and does not require any additional transforms, which are significantly more computationally intensive. Thus, the present inventions require significantly fewer computational resources than other methods that have been used to reduce the PAR of a multi-carrier signal.

The process may be repeated indefinitely until the summation of c approaches the optimal peak reduction signal vector c*. But a good approximation of c* may be obtained in as little as one or two iterations. The quality of c depends upon the quality of the kernel p, which depends upon the number and location of the peak reduction frequencies. Thus, as L, the number of peak reduction frequencies increases towards N, the total number of frequencies, better approximations of c* are obtained in fewer iterations.

By way of example, four iterations at one kernel application per iteration when the ratio of L/N is 5% has produced good results. Application of the present inventions with higher L/N ratios produce better results with fewer iterations.

In alternative embodiments, discussed further below, it be helpful to know the values of C once c has been computed. In those cases a fourier transform of c provides the values for C. Since c does not contain any frequency components in the non-peak reduction frequencies the fourier transform of the entire signal x+c need not be computed. Further, if operations are performed on C in order to provide better performance or added functionality the inverse fourier transform of C may be taken to obtain a new c. The new c can be added to x to provide the new $x^{clip}$. Again, the inverse transform of X is not needed. Thus, even when additional transforms are utilized the transformation operations are simpler than transforming the entire signal.

Once $x^{clip}$ is determined it is transmitted to a receiver. The receiver, or demodulator, decodes $x^{clip}$. A fourier transform is performed on the decoded signal. The values of the peak reduction signals at the peak reduction frequencies are discarded since they typically do not carry any information. The values of $X_{received}$ are then further decoded to extract the information carried by those multiple carriers.

In alternate embodiments, the peak reduction signals may include some type of additional information. In those embodiments the peak reduction signals, $C_{received}$ are also decoded.

FIG. 11 illustrates a multi-carrier transmitter in accordance with an embodiment of the present inventions. Transmitter 200 includes an encoder 202, modulator 204, kernel applicator 206 and a digital to analog converter 208. Encoder 202 receives a stream of digital data and encodes the data such that it can be transmitted over several different carriers. The encoder 202 provides the segmented data to modulator 204. Modulator 204 modulates the segmented data using an appropriate modulation scheme, such as QAM. The individually modulated signals are combined together as a vector to produce a single frequency domain signal, X. Certain predetermined frequencies, peak reduction frequencies, are not used.

Modulator 204 provides the frequency domain signal, X, to kernel applicator 206. Kernel applicator 206 performs an inverse fourier transform to X to obtain x, which also modulates the signals to the frequencies $f_0$–$f_{N-1}$. Kernel applicator 206 adds peak reduction signals, c, to x in order to reduce the PAR of x. Initially, the peak reduction frequencies and a kernel are predetermined, as discussed above. The choice of peak reduction frequencies, in one embodiment, may be based upon the characteristics of the channel. In alternate embodiments, the frequencies are chosen purely randomly, randomly with weights applied to frequencies with low bit rates, according to channels that are not utilized by the particular communication system, or any other suitable method.

Once kernel applicator 206 has finished reducing the peak to average power ratio of the signal x, it provides x as another symbol of the discrete time sequence, $x^{clip}(n)$ to digital to analog converter (DAC) 208. DAC 208 converts the discrete time signal to a continuous time domain signal $x^{clip}(t)$. The DAC may also include filters or other signal processing components.

The waveform of $x^{clip}(t)$ has peaks that predominantly does not exceed a predetermined maximum magnitude. Currently, it is desirable to limit the peaks of $x^{clip}(t)$ to below 8–12 dB. However, the present inventions may provide better PAR reduction depending upon the number of peak reduction frequencies and iterations. By way of example, with a L/N ratio of 20% the PAR of a signal may be reduced to about 6 dB or lower within a finite number of iterations. With proper peak to average power ratio reduction $x^{clip}(t)$ resembles the waveform illustrated in FIG. 9 as opposed to the waveform illustrated in FIG. 8, which represents x(t) without the application of a kernel.

Figure 12:
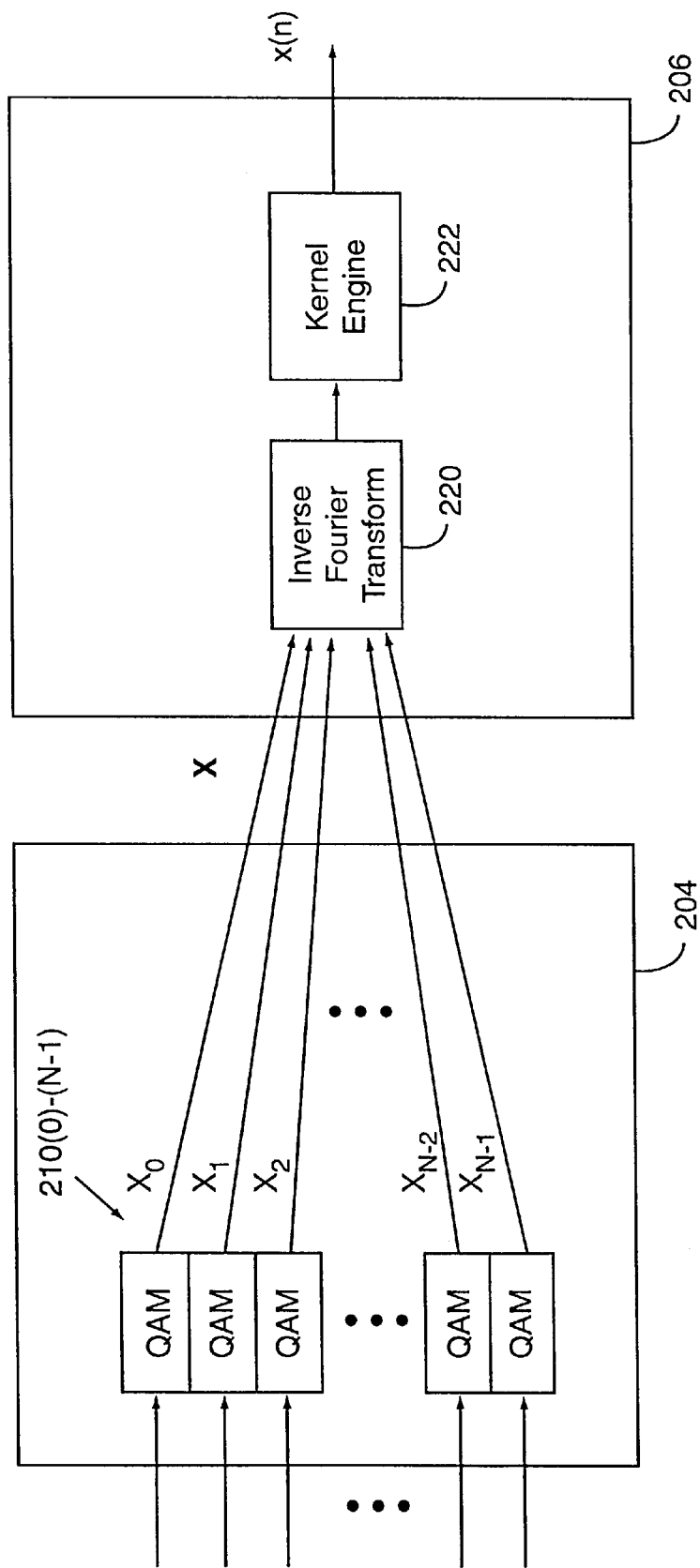
FIG. 12 illustrates block diagrams of the modulator and the kernel applicator of FIG. 11 in accordance with an embodiment of the present inventions.

FIG. 12 illustrates block diagrams of modulator 204 and kernel applicator 206 of FIG. 11 in accordance with an embodiment of the present inventions. Encoder 202 segments the data and provides the data to modulator 204. Modulator 204 includes a number of modulators 210(0)–(N–1). Modulator 204 modulates the separate data streams with modulators 210(0)–(N–1). Modulators 210(0)–(N–1) modulate the individual data streams by the appropriate modulation scheme.

In the illustrated embodiment the data streams are modulated by an M-ary QAM scheme. However, any suitable type of modulation scheme may be utilized in accordance with the present inventions. The output of modulators 210(0)–(N–1) provide the components of X, $X_0$–$X_{N-1}$.

In an alternate embodiment, modulator 204 may also modulate the data segments to the frequencies $f_0$–$f_{N-1}$ The modulated signals may be summed to produce x. This type of modulation does not require an inverse fourier transform to obtain x, and x is directly fed to the kernel applicator.

Selection of the peak reduction frequencies are made in advance. The modulators 210(0)–(N–1) corresponding to the peak reduction frequencies do not receive data from encoder 202. Rather, the peak reduction modulators are set to an initial value, such as zero amplitude and phase.

Inverse fast fourier transformer (IFFT) 220 transforms X to provide the discrete time equivalent x. IFFT 220 passes x to kernel engine 222, which applies a kernel to discrete time equivalent x. The particular kernel is also computed beforehand based upon the selection of the peak reduction frequencies. The kernel engine 222 analyzes x to determine how the kernel should be scaled and time delayed to remove the peaks in x. The scaled and delayed kernel is added to x resulting in $x^{clip}$=x+c. c is a linear combination of one or more kernels that have been scaled and time delayed to negate one or more peaks in x. Kernel engine 222 outputs $x^{clip}$ as part of the overall discrete time data stream x(n).

The value of c may result from one iteration of applying one or more kernels to x. Alternatively, c may be accumulated over several iterations of applying the kernel to x. Iteration is useful because the first iteration may negate the original peaks of x, but may also create other peaks due to the imperfection of the kernel.

In the illustrated embodiment, more than one iteration of applying a kernel to x is performed. Kernel engine 222 provides the values of c(j), the newest linear combination of the kernel. In one embodiment c(j) may be the accumulated linear combination including past iterations of applying the kernel. If no further iterations are necessary x+c is provided to DAC 208.

Once DAC 208 converts the discrete time signal into a continuous time signal, the continuous time signal may be transmitted to a receiver through a channel. Again, DAC 208 may perform additional filtering and signal processing.

FIG. 13 illustrates a receiver in accordance with an embodiment of the present inventions. Receiver 300 includes a FFT 302, a demodulator 304 and a decoder 306. Before FFT 302 receives the received signal $x_r(t)$, the received signal may have been passed through filtering and/or other signal processing. The received signal may also be converted from analog to digital, providing a discrete time domain received signal $x_r(n)$.

FFT 302 applies a fourier transform to the received signal to produce $X_r$, which is provided to demodulator 304, and $C_r$. $X_r$ provides the values of the data signals centered at the non-peak reduction frequencies of $f_0$–$f_{N-1}$. The elements of $X_r$ are further decoded to extract the data carried by those signals.

$C_r$ is typically discarded if the peak reduction signals do not carry any information and are not further decoded. However, in alternate embodiments where $C_r$ does carry some type of information those components of the received signal may be decoded as well.

In one embodiment, a number of band pass filters centered at frequencies $f_0$–$f_{N-1}$ are applied to $X_r$ to extract the different frequency components of $X_r$. Individual demodulators then demodulate the band passed signals to extract the separate data streams. The data streams are recombined to reproduce the original data stream.

Figure 14:
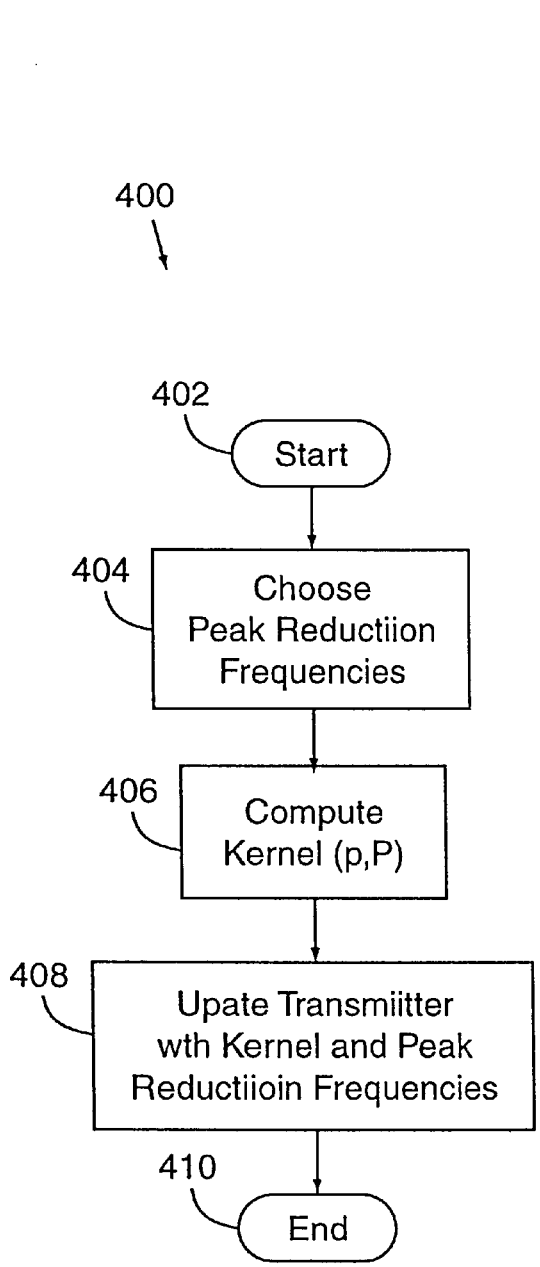
FIG. 14 illustrates the preliminary process of determining the peak reduction channels in accordance with an embodiment of the present inventions.
Figure 15:
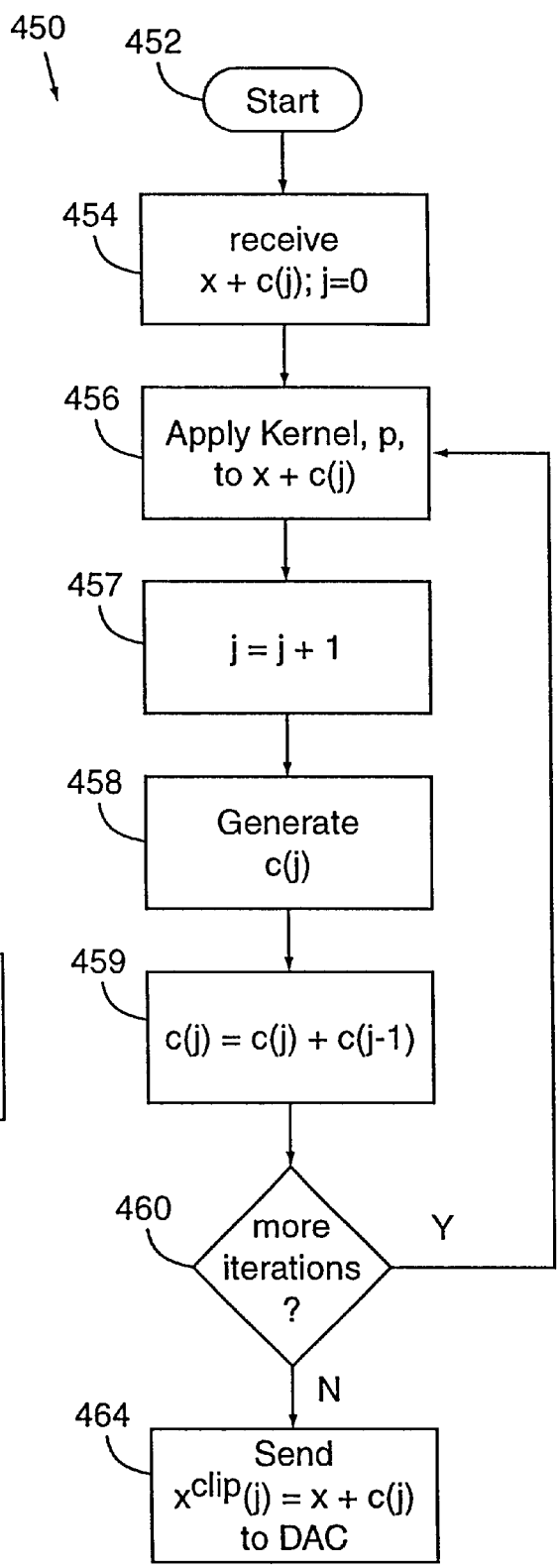
FIG. 15 illustrates a flow chart of the operation of the kernel engine of FIG. 12 in accordance with an embodiment of the present inventions.

FIGS. 14 and 15 illustrate flow charts describing the process applying a kernel. FIG. 14 illustrates the preliminary process of determining the peak reduction channels. Flowchart 400 begins at block 402 and proceeds to block 404. In block 404 the peak reduction frequencies are chosen. The peak reduction frequencies may be chosen based upon the characteristics of the channel. As described, frequencies that are capable of handling low bit rates, or no communication at all, may be chosen as peak reduction frequencies.

In an alternative embodiment, the peak reduction frequencies may be chosen randomly. Alternatively, the frequencies may be chosen pseudo-randomly with weights applied to the low bit rate frequencies to make their selection more likely. Higher frequencies tend to be noisier frequencies in many applications and the peak reduction channels may be chosen primarily in the higher frequencies. But, in many cases peak reduction frequencies that are sequentially grouped may provide less PAR reduction than randomly selected peak reduction frequencies. The choice of peak reduction frequencies should, however, be made in light of obtaining a sufficient kernel to perform adequate PAR reduction.

The number of peak reduction frequencies compared to the number of overall frequencies is also determined. A greater number of peak reduction frequencies provides better performance. However, as the number of peak reduction frequencies increases more bandwidth is lost to the peak reduction signals. Thus, a tradeoff must be made between performance and bandwidth. A ratio of peak reduction frequencies to overall frequencies of about 5% has been found to provide good performance while minimizing the loss of bandwidth. However, any suitable ratio may be used depending upon the needs of the system.

Proceeding to block 406 a kernel is computed from the chosen peak reduction frequencies. The above described algorithm may be used to compute a best approximation of an impulse. The computation of the kernel may also be performed by linear programming. In block 408 the chosen peak reduction frequencies and the computed kernel are applied to the relevant parts of the transmitter. By way of example, the encoder and modulator are configured to modulate data at the non-peak reduction frequencies. The kernel information is supplied to the kernel engine. The flow chart ends in block 410.

FIG. 15 illustrates a flow chart 450 of the operation of kernel engine 222 of FIG. 12. The flow chart 450 begins in block 452 and proceeds to block 454. In block 454 x is received from IFFT 220. Initially, IFFT 220 provides a peak reduction component, c(0), that is zeroed out.

In block 456 the kernel engine analyzes x+c(j) and applies one or more kernels to x+c(j) to reduce any peaks. In the first pass $x^{clip}(j)=x+c(j)$; j=0. The kernel engine may negate one, two, or as many peaks as desired in one iteration. However, the more peaks that are canceled in a single iteration the more computation that is required. A tradeoff may be made based upon the available computational resources and the need for better performance.

In block 457 the index j is incremented. Proceeding to block 458 the kernel engine translates the scaling and shifting of the kernel into values for c(j). In block 459 the new peak reduction components are accumulated by adding the previous peak reduction components; c(j)=c(j)+c(j−1).

The kernel engine determines whether more iterations are required in block 460. If no other iterations are required the current $x^{clip}(j)=x+c(j)$, is passed on to DAC 208 in block 464, where c(j) is the accumulated sum of all the iterations of applying the kernel. When further iterations are required, flow proceeds to back to block 456.

The operations of flow chart 400 of FIG. 14 may be performed before any transmissions occur. The operations may also be performed periodically during transmission as well. Whenever the characteristics of the channel changes new peak reduction frequencies may be chosen, and a new kernel calculated. The transmitter may be updated on the fly, without significantly interrupting communications.

Of course, the receiver must know which frequencies are peak reduction frequencies. That information is transmitted to the receiver before communications with a new set of peak reduction frequencies begin. The information about the identity of the peak reduction frequencies is small and does not significantly affect the bandwidth of communications. The peak reduction frequencies information is also intermittent, occurring rarely. By way of example, peak reduction frequencies may be chosen in increments of minutes, hours, days, weeks, months or years, depending upon the stability of the channel. Even if re-selection of the peak reduction frequencies occurs every few minutes, the data would not prohibitively burden the bandwidth of the communication system. In many applications the selection of peak reduction frequencies and a corresponding kernel need only be computed once, during initialization of a communication system.

The operations of the transmitter may be performed by discrete components or more general purpose devices. By way of example, a digital signal processor may perform any or all of the functions of the encoder, modulator, and the kernel applicator. However, more specialized devices may provide better performance.

In certain situations the average distribution of energy may be higher in the peak reduction frequencies than the non-peak reduction frequencies. To alleviate this potential concern a repeating pattern of peak reduction frequencies and kernels may be used for success symbols transmitted. A first symbol would use one set of peak reduction frequencies, a second symbol would use another set of peak reduction frequencies, and repeating after the last set of peak reduction frequencies has been used. The receiver would also be informed in advance of the different sets of peak reduction frequencies and synchronized. In this alternate embodiment average energy is more evenly distributed over all the frequencies. Switching between different sets of peak reduction frequencies may also be performed for other reasons besides energy distribution.

The PAR is a time-varying quality and fluctuates per symbol that is transmitted, which depends upon various factors. At times when the PAR of a particular symbol is low the PAR reduction may be turned off for that symbol. This frees up the peak reduction frequencies to carry data. For example, when the PAR is below 10 dB PAR reduction is turned off for that symbol. When the PAR becomes a problem the peak reduction frequencies may then be used for peak reduction. In addition, the number of peak reduction frequencies may be varied depending upon the conditions. Informing the receiver requires very little additional information and does not take up a significant amount of the overall bandwidth of the system.

In a further embodiment, different sets of peak reduction frequencies, and corresponding kernels, are precalculated. During the analysis of a symbol a selection of one of the sets of peak reduction frequencies may be made based upon which set provides the best PAR reduction. In one embodiment, the selection of one of the sets must be transmitted to the symbol, however the bandwidth required for sending the information is low in comparison to other PAR reduction schemes. In other embodiments, the receiver may be able to detect from the transmitted symbol which peak reduction frequencies are being used.

Combined Information and PAR Reduction Signals

As mentioned the peak reduction signals may be used in alternate ways. By way of example, the peak reduction signals may be used for peak reduction and to carry information. In embodiments where the peak reduction and data signals include more than one component, e.g., an amplitude and a phase value, or a real and an imaginary value, one of the two values may be used specifically for peak reduction while the other may be used to carry information. In such embodiments a set of kernels may be computed for increment of delay, rather than one kernel that is shifted. This removes one dimension of variability in the peak reduction signals such that a single component of the peak reduction frequencies may be used for peak reduction and the other component used for other purposes.

In one embodiment of the present inventions, all the frequencies carry information signals. However, a subset of the information signals are augmented to act also as peak reduction signals.

The information signals are modified by adding a basis function of the communication scheme to the information signal. The addition of the basis function maps the original information signal constellation to one or more duplicate constellations. The addition of the basis function also reduces the contribution of the original information signal to the peak to average power ratio of the transmitted symbol. One or more basis functions may be added to the original information signal in order to reduce the peak to average power ratio. The use of basis functions also facilitates decoding of the original information signal by the receiver. The receiver may simply perform a modulo operation on the received modified signal to obtain the original information signal.

For different types of communication systems different basis functions are used. By way of example, Discrete Wavelet Multi-Tone communication systems use a wavelet as the basis function. The present inventions may be applied to any suitable type of communication system that utilize a basis function for encoding information into a signal.

Figure 16:
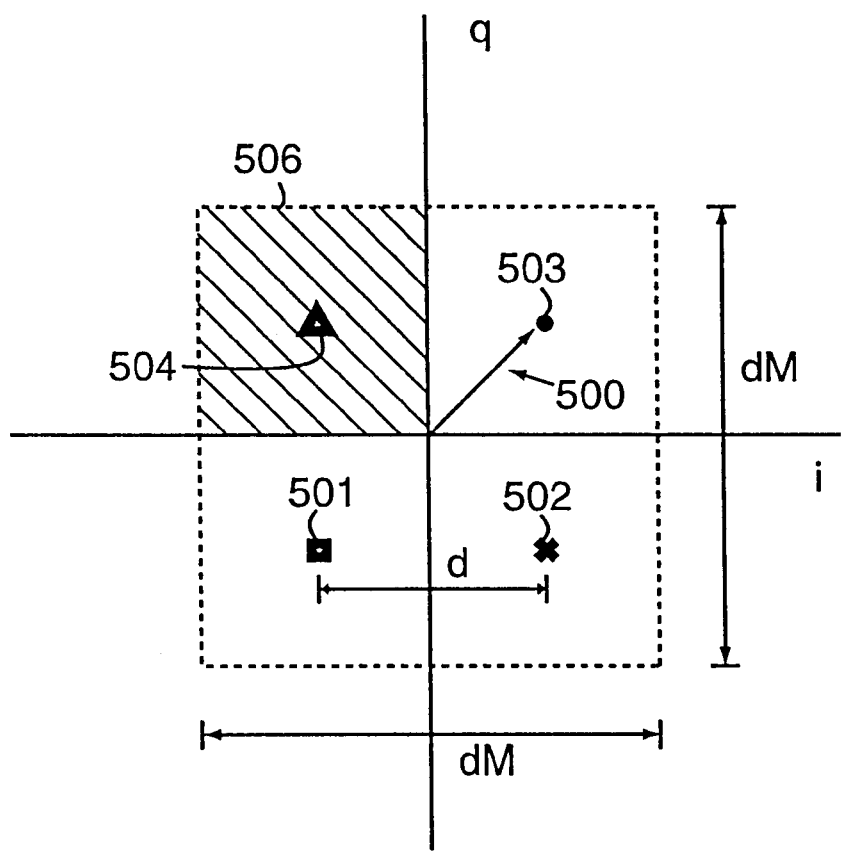
FIG. 16 illustrates a constellation of an information signal in accordance with an embodiment of the present inventions.

FIG. 16 illustrates a constellation of an information signal 500 in accordance with an embodiment of the present inventions. The illustrated constellation is a 4 QAM constellation, including four constellation points 501–504. The signal 500 carries 2 b bits of information, where b is the number of bits per dimension. In the illustrated constellation b=1. Thus, the number of potential values is equal to $2^{2b}$, which is equal to four in the illustrated constellation.

Generally, the constellation points are separated by a distance, d, from its nearest neighbor. The dimensions of the constellation is dM by dM, where $M=2^b$ and is the number of levels per dimension. In the illustrated example, d=2 and M=2.

Signal 500 is composed of a real part and an imaginary part, designated by the in-phase (i) axis and the quadrature axis (q), respectively. Signal 500, or $X_k$, may be written as $X_k=R_k+jI_k$. The values for $R_k$ and $I_k$ can take the values $\{+/-d/2, +/-3d/2 \ldots +/-(M-1)d/2\}$. The real and the imaginary components determine the amplitude and phase of the signal. Where $A=\text{sqrt}(R_k^2+I_k^2)$ and $\emptyset=\tan^{-1}(I_k/R_k)$.

When a receiver receives signal 500 some noise may be included with the signal. The constellation for an uncoded signal is segmented according to the possible constellation points for purposes of decoding. For example, the shaded region 506 is a constellation region corresponding to the constellation point 504. If the receiver receives any signal falling within region 506 the receiver decodes the signal as carrying the value of constellation point 504.

The illustrated constellation is arranged in a square constellation. However, other forms of constellation packing may be used in accordance with the present inventions. By way of example, hexagonally packed constellations, rectangular constellations, circular constellations, cross-constellations or any other suitable constellation configuration may be used. The following discussion of one embodiment of the present inventions focuses on a square packed constellation, but any of the aforementioned constellation types may be utilized with slight modifications. The dimensions of alternate configurations of constellations may have different dimensions than the illustrated square packed embodiment. For example, a rectangular constellation would have two values of M, $M_i$ and $M_q$.

Figure 17A:
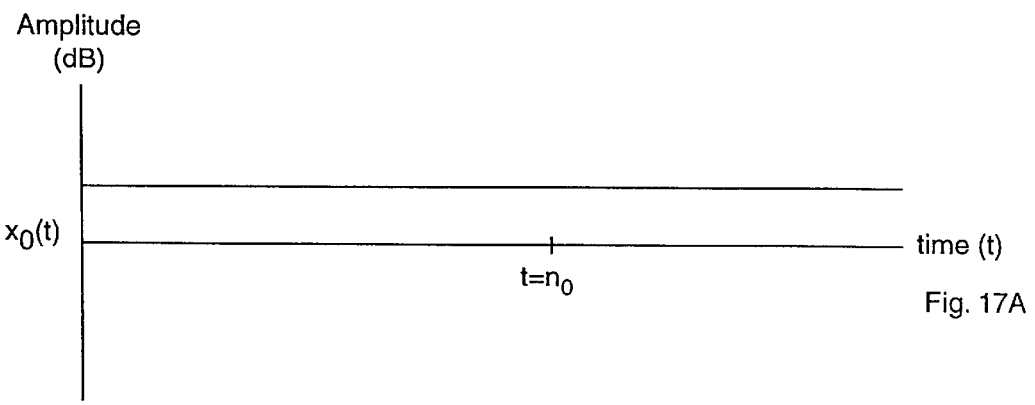
FIG. 17A illustrates a continuous time signal $x_0(t)$ in accordance with an embodiment of the present inventions.
Figure 17B:
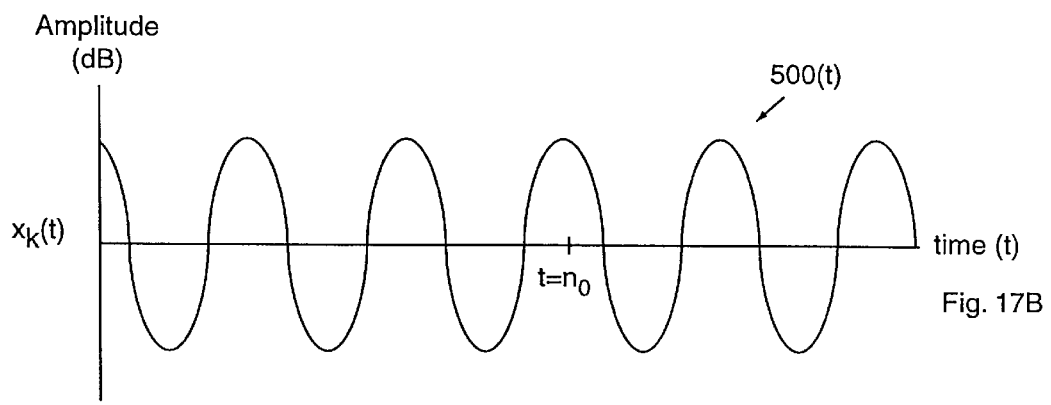
FIG. 17B illustrates a continuous time signal $x_k(t)$ 500(t), which corresponds to signal $X_k$ 500, in accordance with an embodiment of the present inventions.
Figure 17C:
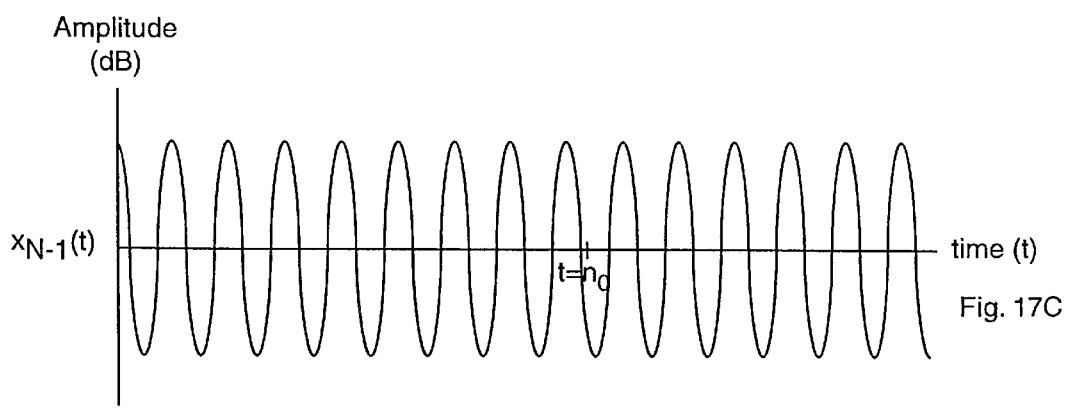
FIG. 17C illustrates a continuous time signal $x_{N-1}(t)$ in accordance with an embodiment of the present inventions.
Figure 17D:
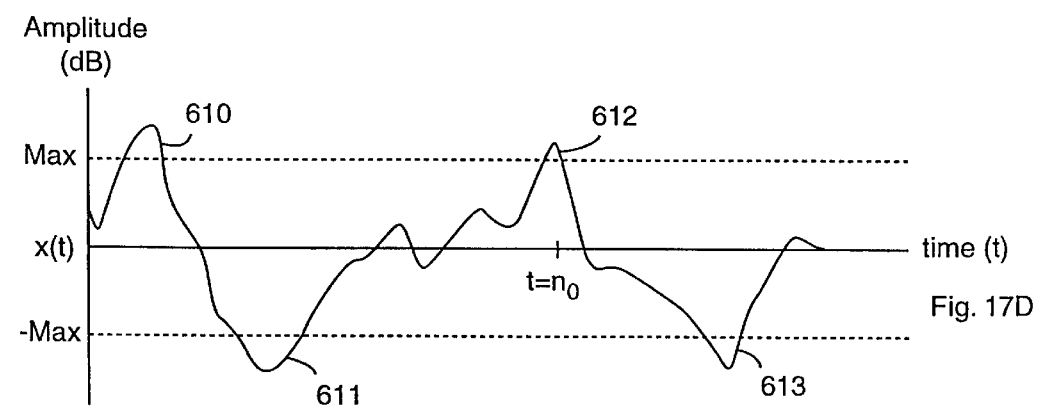
FIG. 17D illustrates a combined continuous time signal x(t) in accordance with an embodiment of the present inventions.

A vector X is composed of QAM constellation values, $X=[X_0 \ldots X_{N-1}]$. The corresponding time sequence x=IFFT $(X)=[x_0 \ldots x_{N-1}]$. Referring now to FIGS. 17A–17D, the continuous time function x(t) is the sum of all the continuous time functions $x_0(t)$ through $X_{N-1}(t)$. FIG. 17A illustrates a continuous time signal $x_0(t)$, which corresponds to signal $X_0$; FIG. 17B illustrates continuous time signal $x_k(t)$ 500(t), which corresponds to signal $X_k$500; and FIG. 17C illustrates continuous time signal $x_{N-1}(t)$, which corresponds to signal $X_{N-1}$. FIG. 17D illustrates the combined continuous time signal x(t). Again, the signals are represented in the continuous time domain for ease of illustration. The same principles of the present inventions apply to operations in the discrete time domain.

The signal x(t) is the sum of the component time signals $x_0(t)$ through $x_{N-1}(t)$. x(t) includes a number of peaks 610–613 that exceed the maximum values allowed. By observing the component time signals $x_0(t)$ through $x_{N-1}(t)$ it can be determined which of the component time signals contribute to the peaks. After determining which of the component time signals contributes to the peak, those component time signals can be modified appropriately.

In the illustrated embodiment the component time signal that contributes most to the peak is corrected. In an alternate embodiment it may be easier to modify several time component signals that individually do not contribute as much, but as a whole significantly contributes to a peak. Those time component signals may be modified rather than the largest contributing component time signal. For example, a time component signal may contribute to more than one peak. If the separation of the peaks of the time component signal are aligned a single sinusoid added to that time component signal may be able to cancel more than one of the peaks of the time component signal, thereby reducing more than one peak of the entire symbol. Other algorithms and methods for reducing one or more peaks by modifying the component information signals of the symbol may be applied in accordance with the present inventions.

In some of the embodiments of the present inventions discussed above, peak reduction signals were added to peak reduction frequencies. The peak reduction frequencies are generally reserved for carrying peak reduction signals. In the illustrated embodiment, a peak reduction signal is added to the component information. Thus, there is no reduction in the bandwidth of the communication system.

While the illustrated embodiment depicts a basis function being added to a component time information signal, it will be appreciated that the frequency domain equivalent of the basis function may be added to the component frequency information signal. The present inventions may be implemented in any suitable domain of the communication scheme.

In one embodiment the peak reduction signal is a sinusoid, which is the basis function of the exemplary communication system. A sinusoid is applied to the component time signal that contributes most to a particular peak in order to cancel the effects of that component time signal and produce a modified information signal. The addition of a sinusoidal peak reduction signal is easily mapped on an expanded constellation. The receiver can also easily decode the modified information signal by accounting for the addition of the sinusoid, as discussed further below.

For example, referring back to FIGS. 17A–17D, it may be desired to reduce peak 612 of time signal x(t) of FIG. 17D. Reviewing the signals $x_0(t)$ through $x_{N-1}(t)$, it may be determined that component time signal $x_k(t)$ (500(t)) contributes most to peak 612 at time $n_0$. A peak reduction signal is then applied to component time signal $x_k(t)$ in order to reduce its contribution to peak 612.

The peak reduction signal applied to component time signal $x_k(t)$ is desirably designed to be easily added to the information signal and easily decoded by the receiver. This may be achieved by duplicating the original constellation. The duplicated constellations are spaced around the original constellation at certain intervals.

Figure 18:
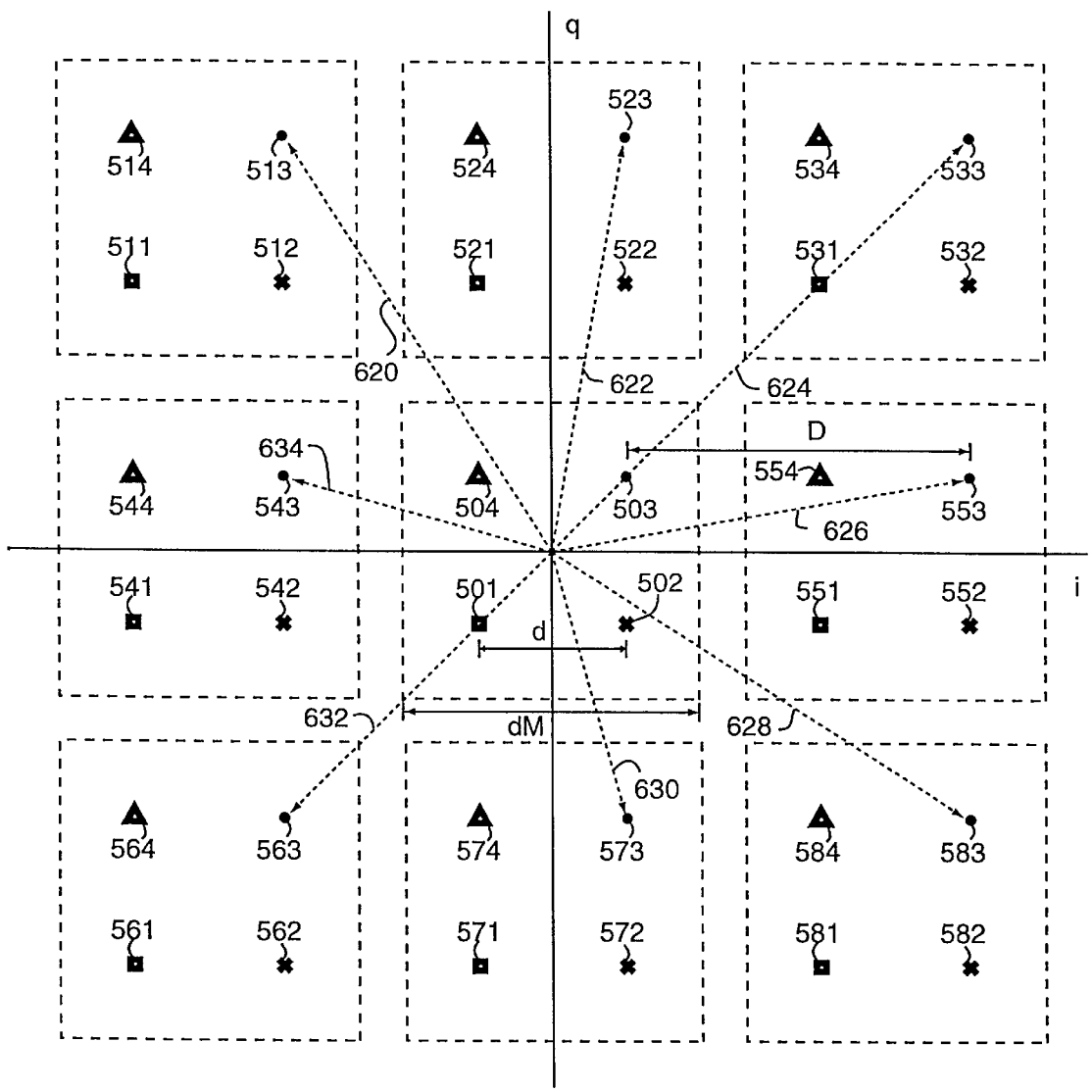
FIG. 18 illustrates an original constellation with duplicate constellations in accordance with an embodiment of the present inventions.

FIG. 18 illustrates an original constellation with duplicate constellations in accordance with an embodiment of the present inventions. The constellation points 501–504 of the original signal 500, or $X_k$, remain in their original position. In addition, constellation points 511–514, 521–524, 531–534, 541–544, 551–554, 561–564, 571–574 and 581–584 are added around the original constellation. The additional constellation points map directly to the original constellation points. For example, constellations points 511, 521, 531, 541, 551, 561, 571 and 581 map to the original constellation point 501, and represent the same piece of information.

The duplicate constellation points are spaced at multiples of a distance D from the original constellation point along the real or imaginary axes. For example, the distance between original constellation point 503 and duplicate constellation point 553 is D along the real axis (i). The distance between original constellation point 503 and duplicate constellation point 533 is the magnitude of the vector (D+jD), which is equal to sqrt(2)·D.

Thus, if the original signal $X_k$ 500, pointed to original constellation point 503, a modified signal, $\hat{X}_k$ is created by adding a vector composed of orthogonal vectors of magnitude D along the axes. That is, $\hat{X}_k = X_k + (p_k D + j q_k D)$. $p_k$ and $q_k$ are integers which determine which of the duplicate constellations is being used. In the illustrated embodiment $p_k$ and $q_k$ can take the values of 0 or +/−1. If further ring,s of duplicate constellations are used the range of $p_k$ and $q_k$ would be accordingly larger. The values of $p_k$ and $q_k$ determine a number of potential modified signals, $\hat{X}_k$, 620, 622, 624, 626, 628, 630, 632 and 634.

When different constellations are used the values for D may be different for each dimension (e.g., a rectangular constellation would have dimensions $D_i$ and $D_q$). Additionally, D varies with each component information signal since the constellations of each component information signal may be different.

Referring back to FIG. 16, signal $X_k$ 500 carried information indicating that the constellation point 503 is selected. The corresponding component time signal $x_k(t)$ (500(t)) of FIG. 17B) also showed that $X_k$ contributed most to peak 612 of FIG. 17D at time=$n_0$. In order to reduce peak 612 $x_k(t)$ is modified by modifying $X_k$.

The values of p and q are chosen to define a sinusoid that is added to the original signal $X_k$ 500 that reduces the magnitude of $x_k(t)$ at $n_0$. In one embodiment, all the potential modified signals are compared to the original signal to determine which of the modified signals, $\hat{X}_k$ 620, 622, 624, 626, 628, 630, 632 and 634 provides the best modification of the original signal $X_k$. This approach is convenient in embodiments where the number of duplicate constellations is low.

Figure 19A:
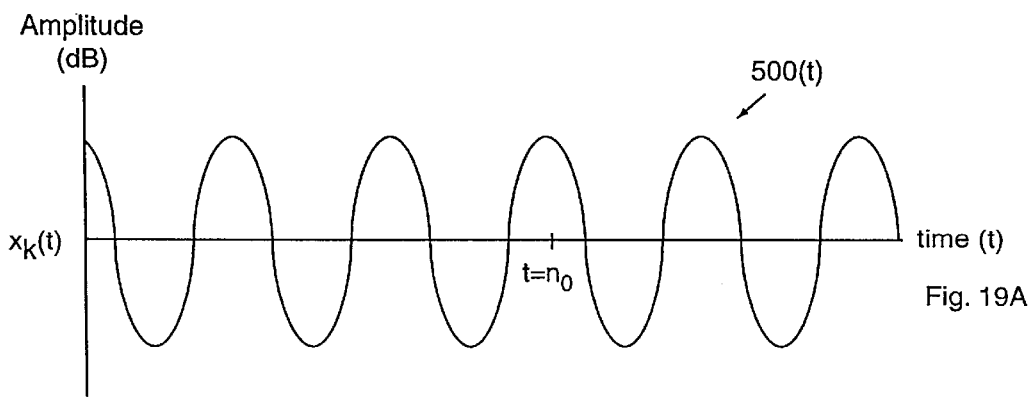
FIG. 19A illustrates an original continuous component time signal $x_k(t)$ 500(t) in accordance with an embodiment of the present inventions.
Figure 19B:
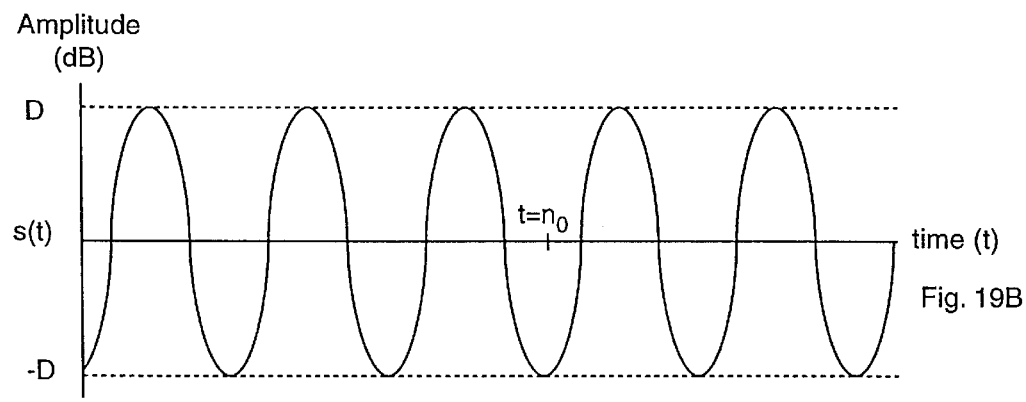
FIG. 19B illustrates a sinusoid s(t) which would reduce the peak of $x_k(t)$ at $t=n_0$ in accordance with an embodiment of the present inventions.

Referring to FIGS. 18 and 19A through 19D, one iteration of modifying a signal is depicted according to one embodiment. FIG. 19A illustrates the original continuous component time signal $x_k(t)$ 500(t). $x_k(t)$ 500(t) peaks at time t=$n_0$. FIG. 19B illustrates a sinusoid s(t) which would reduce the peak of $x_k(t)$ at t=$n_0$.

In the illustrated example, sinusoid s(t) of FIG. 19B corresponds to modifying $X_k$ in the frequency domain by a distance D in the real domain. Referring back to FIG. 18, modified signal $\hat{X}_k$ is chosen at duplicate constellation point 553. Thus, $\hat{X}_k = X_k + (1)D + j(0)D$, or $P_k=1$ and $q_k=0$. If the original values for the real and imaginary components is such that $X_k = R_k + jI_k = 1+j$, then $\hat{X}_k = (1+j) + D + j(0) = (1+D) + j$.

Figure 19C:
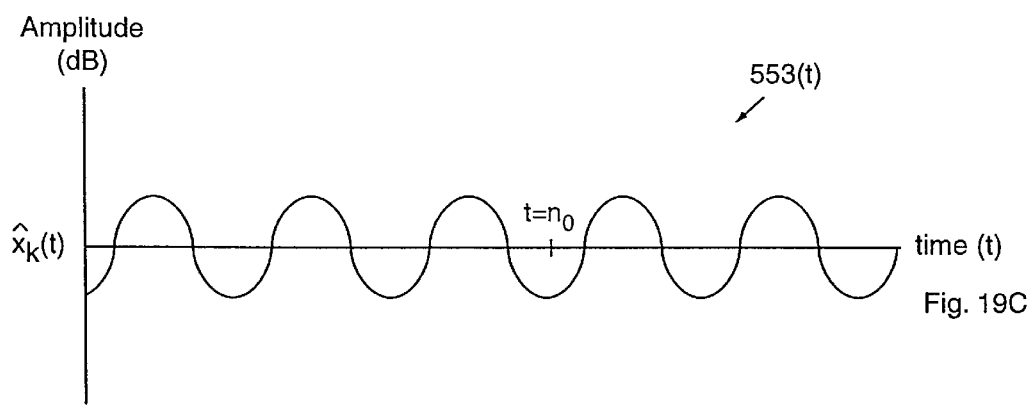
FIG. 19C illustrates a modified continuous time signal $\hat{x}_k(t)$, which corresponds to modified signal $\hat{X}_k$, in accordance with an embodiment of the present inventions.

FIG. 19C illustrates a modified continuous time signal $\hat{x}_k(t)$, which corresponds to modified signal $\hat{X}_k$. The addition of sinusoid s(t) to $x_k(t)$ to reduce the peak of $x_k(t)$ produces modified time signal $\hat{x}_k(t)$. The value of $x_k(t)$ is reduced at time $n_0$, however, other peaks may appear in $\hat{x}_k(t)$. These additional peaks may or may not affect the peaks of the overall modified time signal.

Figure 19D:
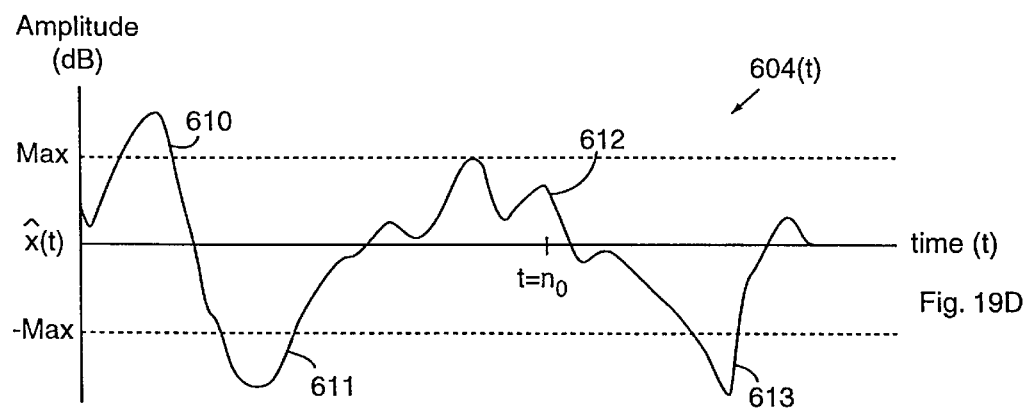
FIG. 19D illustrates the modified time signal $\hat{x}(t)$, which is the sum of all the component time signals $x_O(t)$ through $X_{n-1}(t)$, including modified time signal $\hat{x}_k(t)$ in accordance with an embodiment of the present inventions.

FIG. 19D illustrates the modified time signal $\hat{x}(t)$, which is the sum of all the component time signals $x_0(t)$ through $x_{n-1}(t)$, including modified time signal $\hat{x}_k(t)$. Peak 612 of $\hat{x}(t)$ is decreased due to the modification of $x_k(t)$ to $\hat{x}_k(t)$. However, the other peaks 610, 611 and 613 may be inadvertently increased. The process of modifying a component time signal is repeated in the illustrated embodiment. In the next iteration a new component may be selected that contributes to another peak that is to be reduced.

In another embodiment, where the number of duplicate constellations is great, the best value for $\hat{X}_k$ may be computed. The computation of the appropriate sinusoid to be added to a component signal also applies to the aforementioned embodiment.

The discrete time signal representation of a real baseband discrete multi-tone symbol may be represented as:

$$x[n] = \frac{2}{\sqrt{N}} \sum_{k=1}^{N/2-1} g_k [R_k \cos(2\pi kn/N) - I_k \sin(2\pi kn/N)] + g_0 \frac{R_0 + I_0 \cos(n\pi)}{\sqrt{N}}, n = 0, \ldots, N-1$$

where $X_k = R_k + I_k$ and $g_k$ is the scaling factor for frequency k.

Scanning the values of the symbol x[n] determines at which values of n peaks exist. For example, a peak may be found at n=$n_0$. The value for $x[n_o]$ is:

$$x[n_0] = \frac{2}{\sqrt{N}} \sum_{k=1}^{N/2-1} g_k [R_k \cos(2\pi kn_0/N) - I_k \sin(2\pi kn_0/N)] + g_0 \frac{R_0 + I_0 \cos(n_0\pi)}{\sqrt{N}}$$

Assuming that the peak at $n_o$ is a positive peak, the components of $x[n_0]$ may be scanned to determine which of the components contributes the most to the peak. A positive contributor may be found at frequency $k_0$. If all the components, $X_k$, are 16 QAM, and the values for $X_{k0}=3+j$, or $R_{k0}=3$ and $I_{k0}=1$, and the value for $\cos(2\pi kn_0/N)$ is positive then the real part of the component $X_{k0}$ may be reduced by D. The new peak $\hat{x}[n_0]$ is:

$$\hat{x}[n_0] \leq x[n_0] - g_{k_0} \frac{2lD}{\sqrt{N}} \leq x[n_0] - g_{k_0} \frac{4lM}{\sqrt{N}}$$

where $\iota$ is a threshold factor, $0 \leq \iota \leq 1$. The term $\iota$ limits the use of sinusoids that are too small at the peak location to be effective in canceling out a peak of component information time signal. Values of l ranging from about 0.6 to about 0.8 have been found to provide good results. The middle term of the inequality corresponds to the general case where $D \geq dM$. The right most term is the specific case where D=dM.

The new transmit symbol $\hat{x}[n]$ can be computed without repeating the IFFT since the new transmit symbol contains only one modified tone.

$$\hat{x}[n] = x[n] - \frac{2}{\sqrt{N}}(g_{k_0}D_{k_0})\cos(2\pi k_0 n/N), n = 0, \ldots, N-1$$

Thus, the real portion of $X_{k0}$ is reduced. Should the imaginary portion of $X_{k0}$ also contribute to the peak a similar algorithm may be performed on the sin( ) portion of that component. Similarly, $X_k$ may be modified at other points in time to correct the same or other peaks. Further, other component information signals of X, may be similarly modified.

More generically, the modified symbol with one tone modified may be written as:

$$\hat{x}[n] = x[n] + \frac{2}{\sqrt{N}}\sum_{k_0}(g_{k_0}p_{k_0}D_{k_0})\cos(2\pi k_0 n/N) -$$

$$\frac{2}{\sqrt{N}}\sum_{k_0}(g_{k_0}q_{k_0}D_{k_0})\sin(2\pi k_0 n/N), n = 0, \ldots, N-1$$

$p_{k_0}$ and $q_{k_0}$ are chosen to provide the best peak reduction. The equation is expanded as more peaks are reduced by modifying different information signals at different frequencies. The range of p and q varies with the number of duplicate constellations that are used. Varying the values of $p_{k_0}$ and $q_{k_0}$ aligns the phase of the sinusoid such that the sinusoid effectively cancels out one or more peaks at the given points in time. Again, in an alternate embodiment, if two peaks are appropriately spaced a single sinusoid (or basis function) may cancel more than one peak at a single time.

Independent of which method of determining the values for p and q the method for decoding the modified symbols is of low complexity. The receiver performs a modulo operation based upon the values of M and D. The bit rates and modulation scheme (and, therefore, the constellation size) of each frequency is typically transmitted to the receiver during initialization. Information about duplicate constellations may also be transmitted to the receiver at the same time.

Once the receiver knows the values of D and M for each frequency, the receiver may readily decode the duplicate constellation points and map them to the original constellation points. In the case where $D \geq dM$, the mapping algorithm is:

$$X_k = \text{mod}_{[-dM/2, dM/2], D}\{\hat{X}_k\}$$

When D=dM, the algorithm reduces to:

$$X_k = \text{mod}_D\{\hat{X}_k\}$$

Figure 20:
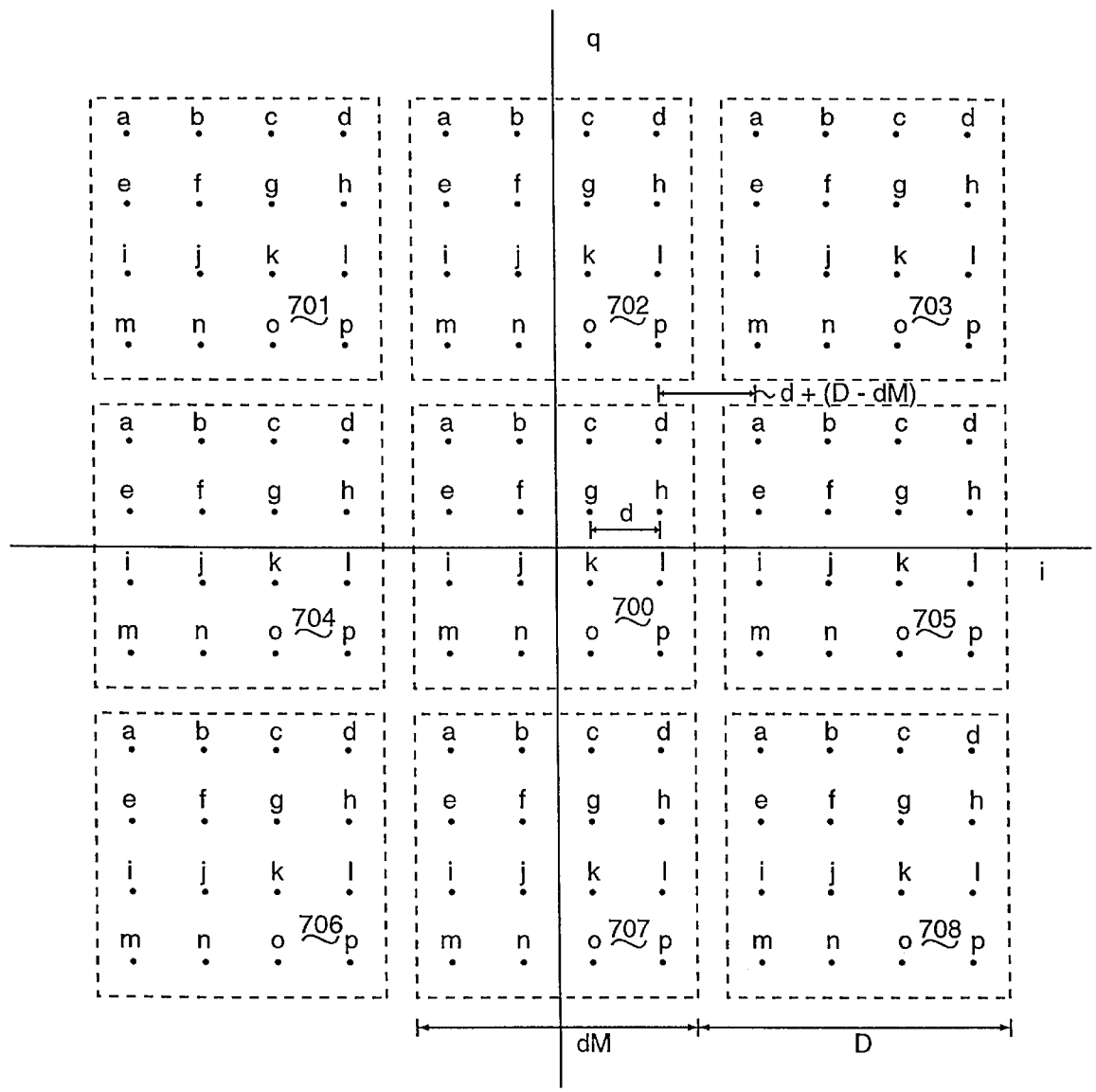
FIG. 20 is a constellation with duplicate constellations of a 16 QAM signal in accordance with one embodiment of the present inventions.

In some embodiments it may be preferred to have D>dM, referring now to FIG. 20. FIG. 20 is a constellation with duplicate constellations of a 16 QAM signal in accordance with one embodiment of the present inventions. The constellation map includes an original constellation 700 with constellation points 700a–700p, and duplicate constellation s 701–708 with duplicate constellation points a–p.

If D=dM then the duplicate constellations 701–708 directly border original constellation 700. As discussed, the nearest neighbors of each constellation point in the original constellation 700 are separated by a distance d. When D=dM, neighboring duplicate constellation points also become nearest neighbors to the outer ring of original constellation points.

For example, when D>dM the nearest neighbors for original constellation point 700h are neighboring original constellation points 700(d, g and l), separated by a distance d. The nearest duplicate constellation point to original constellation point 700h is 705e. The distance between points 700h and 705e is d+(D−dM). When D=dM, the distance between points 700h and 705e reduces to d, and 705e becomes a nearest neighbor.

Having duplicate constellation point 705e as a nearest neighbor presents even a greater problem than just having another nearest neighbor. Usually original constellation point 700h is only one bit different from original constellation points 700d, g and l. Typically, error correction coding may be implemented to correct the incorrect decoding of original constellation point 700h if one of constellation points 700d, g or l is received since there is only one bit of error. When duplicate constellation point 705e is received it is mapped to original constellation point 700e, which may be more than one bit different from original constellation point 700h. Error correcting codes may not be able to compensate for the difference in that case. The problem increases as the size of the constellation increases.

In an alternate embodiment, the problem may be alleviated by increasing the complexity of the receiver. If the receiver has knowledge of the duplicate constellations, i.e., through the initialization process, and the receiver performs error correction decoding before mapping the received signal to the original constellation, the problem is significantly avoided. However, this adds a bit more complexity to the receiver since it has to perform more than a simple modulo operation on the data. Depending upon the channel it may be desirable to have D=dM When duplicate constellation point 705e is separated from point 700h only by the distance d the probability of incorrectly decoding $\hat{X}_k$ increases unless the receiver is made more complex. The bit error rate, therefore, increases when D=dM. For large enough D>dM the bit error rate does not suffer with the addition of duplicate constellations, however, the power of the transmitted symbol may be increased.

Thus, a potential concern with the illustrated embodiment is that the overall power of the transmitted symbol may be inadvertently increased by adding peak reduction signals to information signals. Through various methods an increase in the overall power of the transmitted symbol may be minimized.

One method is to minimize the value of D, or the separation between the original constellation and the duplicate constellation. If power considerations are greater than bit error rate considerations then D may be minimized to dM. Otherwise, a value of D may be chosen to be greater than dM without significantly increasing the overall power of the transmitted discrete multi-tone symbol.

In such cases, other methods may be employed to minimize any increase in transmit power. One method is to choose those signals $X_k$ that have values that are outermost original constellation points in the constellation. Referring again to FIG. 20, $X_k$ is chosen for modification if it's value is 700(a, b, c, d, e, h, i, l, m, n, o or p). $X_k$ is not chosen if its value is 700(f, g, j or k). By choosing to add increments of D to the outer original constellation points the amount of added energy is less than the energy required to modify $X_k$ if it's value is one of the inner original constellation points.

In addition to choosing outer original constellation points, the method in which $X_k$ is modified may also be designed to minimize an increase in transmit power. If $X_k$ has a value of original constellation point 700d the value for $X_k$ is $R_k=3$ and $I_k=3$. Duplicate constellation points 701d–708d may be chosen to modify $X_k$. But, some of the duplicate constellation points increases the power of the component to a lesser extent than others. For example, duplicate constellation points 701d, 702d, 703d, 705d and 708d require significantly more power than original constellation point 700d. Duplicate constellation points 704d, 706d and 707d require only marginally more power than original constellation point 700d. Therefore, if power is a consideration, original constellation point 700d is limited to being mapped to duplicate constellation points 704d, 706d and 707d.

Generally, values for p and q may be limited to the following constraints to minimize the transmitter power.

$$\text{sign}(p) = -\text{sign}(R_k);$$

and $$\text{sign}(q) = -\text{sign}(I_k)$$

This relationship can be used for any of the original constellation points to minimize the increase in transmit power. Use of the algorithm on the original inner constellation points may only provide minimal savings in power. But, if applied to all the modified component signals the combined savings may be significant. Also, the savings increases with the increase in size of the original constellation.

Figure 21:
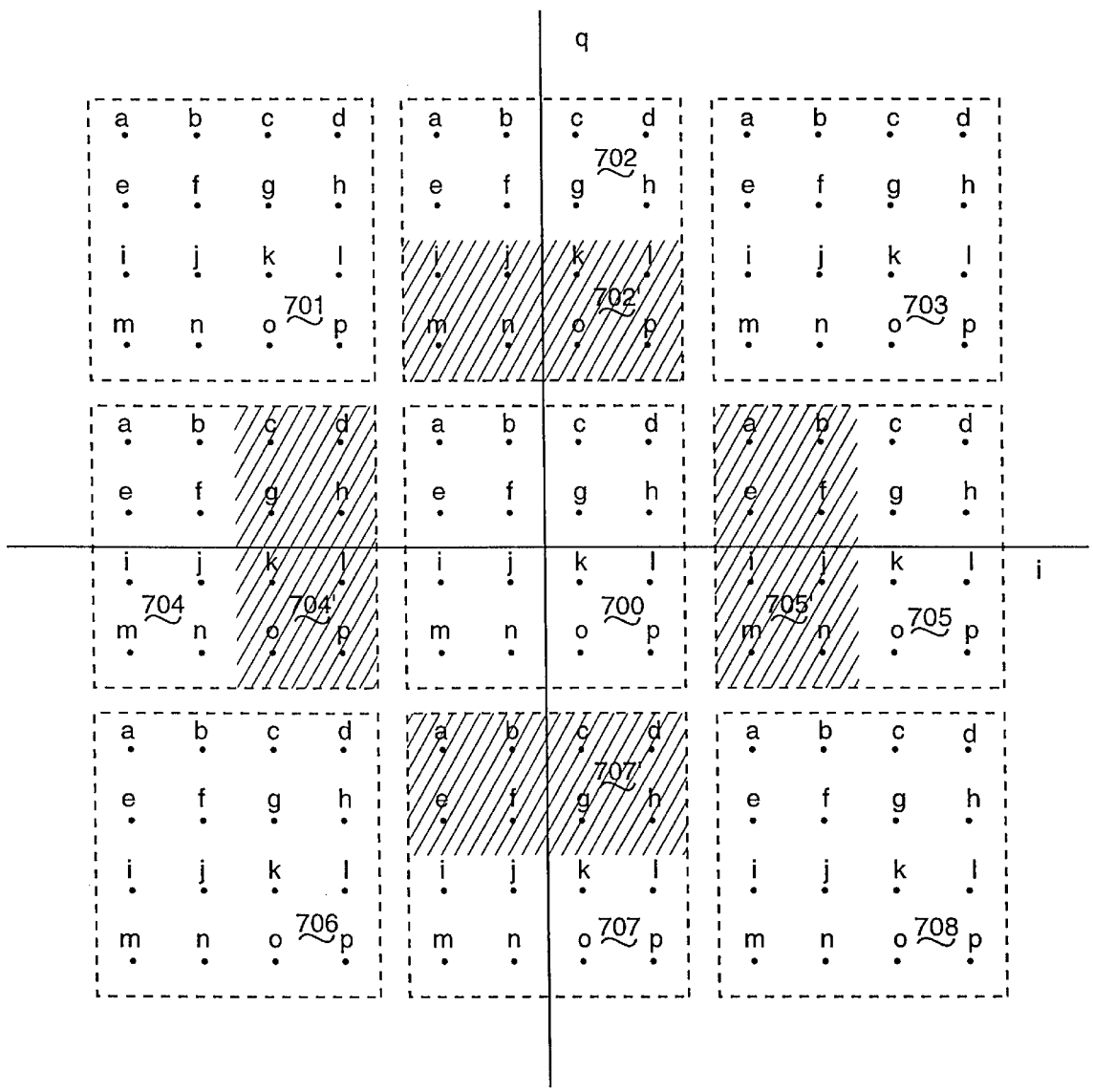
FIG. 21 illustrates a constellation map in accordance with an embodiment of the resent inventions.

In another method only partial duplicate constellations may be employed, referring now to FIG. 21. FIG. 21 illustrates a constellation map in accordance with an embodiment of the present inventions. The constellation map depicts original constellation 700 and duplicate constellations 701–708 of FIG. 20. However, duplicate constellations 702, 704, 705 and 707 include partial duplicate constellations 702', 704', 705' and 707'.

Partial duplicate constellations 702', 704', 705' and 707' represent alternative duplicate constellations. Rather than mapping the original constellation points to all of the duplicate constellation points, mapping may be confined to partial duplicate constellations 702', 704', 705' and 707'. The use of partial duplicate constellation points reduces the number of duplicate constellation points, and also reduces the maximum amount of power increased involved in the modification of $X_k$.

Alternately, partial duplicate constellations 702', 704', 705' and 707' may be weighted during the determination of the values of p and q. In that embodiment, all of the duplicate constellation points are used, but preference is given to the constellation points that lie within partial duplicate constellations 702', 704', 705' and 707'. Further, the partial duplicate constellations may take any shape neighboring the original constellation 700. By way of example, the constellation points 701(k, l, o and p) may form another partial duplicate constellation, or constellation points 701(l, o and p) may be used, along with corresponding constellation points in the other duplicate constellation.

It is appreciated that any type of constellation mapping may be utilized within the scope of the present inventions. For example, the duplicate constellation need not be configured identically to the original constellation. It may be preferred to locate duplicate constellation points near their original constellation point counterpart. In FIG. 21 constellation 704' may include the points 704(a, b, e, f, i, j, m and n) rather than the illustrated points. Thus, the duplicate constellation points are closer to their original constellation point counterparts in original constellation 700.

In another example, the inner points (e.g., 700f, g, j or k) of the original constellation are not modified. However, if the information signal is one of the outer points (e.g., 700a, b, c, d, e, h, i, l, m, n, o or p) the basis function may be of magnitude D/2 rather than D. This requires less energy to be added to the signal while still providing adequate mapping of the original constellation point. Thus, there are a myriad number of ways to map the original constellation. Any one method may be used depending upon the needs of the communication system.

The illustrated embodiments of FIGS. 11–13 may utilize modified signals as discussed above. The kernel applicator 206 of FIG. 11 would apply a basis kernel rather than a kernel based upon peak reduction frequencies that do not carry any information signals. Any suitable linear combinations of the basis kernel may be used to modify the information signal. The basis kernel is added to the information signal of frequencies that add to one or more peaks of a symbol. Similarly, kernel engine 222 of FIG. 12 applies a basis kernel (or linear combinations thereof), in this case a sinusoidal kernel, to a discrete time signal vector x provided by inverse fourier transformer 220. In addition to using a basis kernel or a kernel that is a linear combination of the basis function, appropriate kernels constructed from linear combinations of basis functions may be precomputed to be added to the signal for PAR reduction.

Decoder 306 of FIG. 13 decodes all the frequencies used in the multi-carrier communication system. Rather than decoding only frequencies that contain information signals and ignoring the peak reduction frequencies, all frequencies are utilized with the use of modified signals. Decoder 306 need only perform a modulo operation on those frequencies that carry a modified signal rather than an unmodified information signal.

Figure 22:
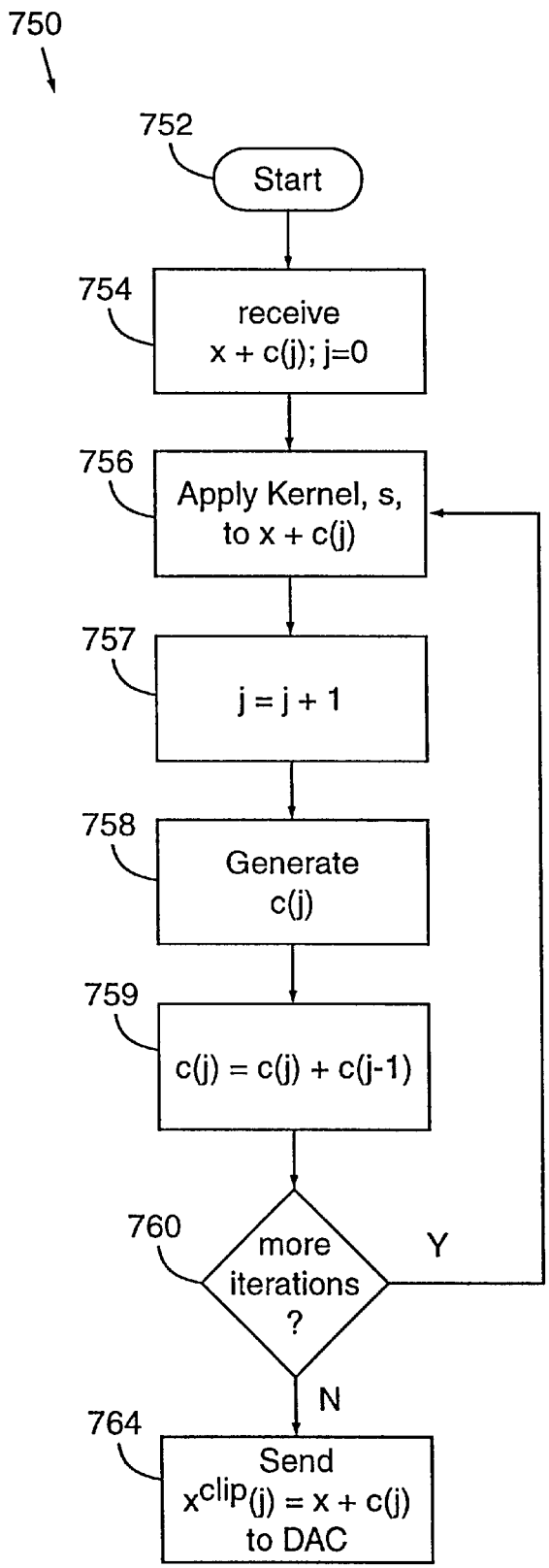
FIG. 22 illustrates a flow chart of the operation of the kernel engine of FIG. 12 in accordance with another embodiment of the present invention.

FIG. 22 illustrates a flow chart 750 of the operation of the kernel engine of FIG. 12 in accordance with another embodiment of the present invention. Initially, the bit rates of all the available frequencies are determined. The bit rates of the frequencies dictate the type of constellation used for each frequency. The number and location of duplicate constellations may be determined based upon power, bit error rate, peak values and locations, actual and desired peak to average power ratios or any other suitable considerations. The original constellations and the number of duplicate constellations may be sent to a receiver before transmission of actual signals. This initialization process requires little bandwidth and typically need not be performed more than periodically. The information may be as little as sending the values for D for each information signal to the receiver. Alternatively, D may be fixed to equal dM+c, where c is a constant that is known to the receiver. Thus, the receiver can derive D by knowing the dimensions of the original constellation.

In alternate embodiments, the values of D and constellations sizes and numbers may vary per tone, or even per symbol. In which case, further information may be sent to the receiver. While some bandwidth may be required, optimization of the usage of the channel and the reduction in the complexity of the receiver necessary to decode the symbol may make up for the difference.

Referring to FIG. 22 and FIG. 11, the flow chart 750 begins in block 752 and proceeds to block 754. In block 754 x is received from IFFT 220. Initially, IFFT 220 provides a peak reduction component, c(0), that is zeroed out.

In block 756 the kernel engine analyzes x+c(j) and applies one or more kernels to x+c(j) to reduce any peaks. In the instant embodiment the kernel is a sinusoid, or a sum of sinusoids. In the first pass $x^{clip}(j)=x+c(j)$; j=0. The kernel engine may negate one, two, or as many peaks as desired in one iteration by adding one or more sinusoidal kernels. The number of sinusoidal kernels that are applied to x may be a significantly large number per iteration since adding a sinusoid to x is a simple operation. The number of sinusoidal kernels that are applied may be limited in order to verify that no new peaks have been created.

In block 757 the index j is incremented. Proceeding to block 758 the kernel engine generates the sinusoidal kernel values for c(j). In block 759 the new peak reduction components are accumulated by adding the previous peak reduction components; c(j)=c((j)+c(j−1).

The kernel engine determines whether more iterations are required in block 760 based upon the number and size of peaks remaining in the signal x+c(j). If no other iterations are required the current $x^{clip}(j)=x+c(j)$, is passed on to DAC 208 in block 764, where c(j) is the accumulated sum of all the iterations of applying the kernel. When further iterations are required, flow proceeds to back to block 756.

A single frequency may, thereby, carry an information signal component and a peak reduction signal component. The information signal typically contributes to one or more peaks in the discrete multi-tone symbol. The modification of the information signal to incorporate the peak reduction signal may be as simple as adding a basis function, such as a sinusoid, to the information signal. The modified signal contributes less to the peak than the original information signal component. A basis function dummy signal may be added to the information signal component by mapping the original constellation of the information signal to one of a number of duplicate constellations. The use of duplicate constellations also provides for simple decoding of the modified signal by the receiver. The receiver need only perform a simple modulo operation to decode the modified signal.

Alternate embodiments of the present inventions may be applied to a single carrier communication system. Particularly, the discussion of different embodiments of the present inventions in reference to FIGS. 14–22 may also be applied to single carrier communication systems. The peak to average power ratio of each symbol in time is reduced in relation to the other symbols preceding and succeeding the symbol. That is the overall transmitted signal is comprised of a number of symbols transmitted at different time intervals (rather than a number of different signals comprising a single symbol in the previously discussed embodiments). The PAR of the overall signal may be reduced by individually modifying the symbols that make up the signal.

The embodiments discussed in reference to FIGS. 14–22 are readily applicable to reducing PAR on a per symbol basis and may be utilized to reduce the effect of a symbol on the PAR of that symbol and the overall signal. Buffering of preceding symbols may be required, but the operations necessary to reduce the PAR may still be performed in real time. In a single carrier embodiment, the basis function of the communication system becomes the filter impulse response.

In still another embodiment of the present inventions, the basis kernel may be precomputed to optimize its peak canceling effect. The computation of the basis kernel may be implemented in parallel to the discussion in reference to FIGS. 3–15.An optimized basis kernel may be implemented rather than an ordinary basis kernel.

In one embodiment, the optimized basis kernel may be optimized to cancel peaks at a particular instance of time. While the optimized basis kernel may not approach an impulse function in the way that the previously discussed embodiment does due to the constraint on the peak reduction signal that it should be a multiple of D along the real and imaginary axes, the optimized basis kernel may still be optimized to adequately reduce a single (or multiple) peaks.

The optimized basis kernel may be comprised of a linear combination of basis functions precomputed for reducing a peak at a given point in time. For example, a precomputed optimized basis kernel for a symbol that has ten frequency components may have the values [0, 0, D, 0, (D−jD), 0, 0, jD, −D, (D+j2D)]. The optimized basis kernel only has peak reduction signal components in the 3rd, 5th, 8th, 9th and 10th frequencies rather than in all the frequencies. This begins to look similar to the previously described embodiment which uses dedicated dummy frequencies. However, in this case no bandwidth is lost.

The components of the optimized basis kernel in the time domain are, thereby, modified to coincide in time with the peaks. The constraint on the optimized basis kernel allows the component basis functions to act as vectors in the frequency domain that may be used to map the original constellation points to duplicate constellation points depending on the position of the peaks in the time domain. In this manner PAR is reduced without sacrificing bandwidth.

Merging the difference between the use of dedicated peak reduction frequencies and peak reduction signal components, a hybrid embodiment may be utilized to maximize peak reduction with minimal loss of bandwidth. Optimized basis kernels may be generated by allowing peak reduction signal components in only selected frequencies. Those frequencies may be dedicated to peak reduction and not carry an information signal, as in the previously discussed embodiment. However, the peak reduction frequencies vary per symbol. In this manner the best peak reduction frequencies may be used for each symbol, rather than having to use the same peak reduction frequencies for each symbol. One constraint is that the peak reduction signal component be larger than the size of the constellation established for those frequencies when they do carry information, e.g., $|Re(C_k)|>D/2$ and $|Im(C_k)|>D/2$.

The advantage of the hybrid embodiment is that the receiver need not be informed of the selection of the peak reduction frequencies. The receiver will decode all the frequencies of each symbol. Those frequencies that carry signals that are larger than the constellation designated for those frequencies are determined to be peak reduction frequencies for that particular symbol. The peak reduction signals in those frequencies may be disregarded and the remaining information signals may be properly decoded for that symbol. In the next symbol the receiver detects a new set of peak reduction frequencies.

In a pure dedicated peak reduction embodiment the peak reduction frequencies could not be changed on a per symbol basis without having to send side information to the receiver. This caused the selection of peak reduction frequencies to be performed in view of reducing the PAR for a wide variety of symbols. Thus, in some embodiments, the number of dedicated peak reduction frequencies could be as high as 10% of the total number of frequencies to ensure proper PAR reduction. In the hybrid embodiment a fewer number of peak reduction frequencies are required for each symbol since the peak reduction frequencies are optimally selected for each symbol. Also, no side information is required since the receiver is capable of automatically detecting the peak reduction frequencies. Thus, the amount of bandwidth lost is minimized with the same, if not better, reduction of the PAR.

While the discussion has focused on reducing the peak to average power ratio as measured at the transmitter, the present inventions apply equally to reducing the PAR as measured at the receiver. Especially if the characteristics of the channel are known then the transmitted symbols may be modified in order to reduce the PAR as measured at the receiver. This is useful for channels with long impulse responses where the PAR of a symbol increases as the symbol is transmitted to the receiver. By anticipating this increase in PAR the transmitted symbol may be appropriately modified prior to transmission.

Of course, side information may also be used to facilitate the reduction of the peak to average power ratios in a communication system. Side information may be sent to the receiver concerning the clipping of the symbol, duplicate constellations or any suitable type of information. The more information provided to the receiver, the easier it is for the receiver to decode the transmitted symbol and the easier it is to reduce the PAR at the transmitter. The side information may be sent to on a per symbol basis, e.g., if the PAR reduction scheme is based on a per symbol algorithm, or less frequently depending upon the PAR reduction scheme. While a focus of some of the embodiments of the present inventions is to reduce PAR without a significant loss of bandwidth, there are cases where reducing the PAR of a signal is preferable over the loss of bandwidth. In those cases alternate embodiments of the present inventions that utilize side information may be employed.

The present inventions apply to any type of communication systems utilizing single or multiple carriers. By way of example, the present inventions apply to Discrete Multi-Tone (DMT), Orthogonal Frequency Division Multiplexing (OFDM), Discrete Wavelet Multi-Tone (DWMT) communication systems, Vector Coding Modulation. The basis functions for such systems may include sinusoids, complex exponentials, singular vectors of channel matrix, wavelet filters or any other suitable basis function for a multi-carrier communication system. Alternate embodiments of the present inventions apply to single carrier communication systems, such as Carrier-less Amplitude Phase (CAPs), vestigial side band, amplitude modulation and the like. The basis functions for single carrier (or no carrier systems) are generally the delayed versions of the transmit pulse or transmit filter.

Distortion Estimation

While the previously described embodiments have generally focused on using the transmitter to reduce the peak to average power ratio of a signal, methods and apparatuses for reducing the peak to average power ratio of a signal at the receiver may also be employed in accordance with the present inventions. As discussed, the transmitter may always send side information to the receiver and have the receiver perform a number of different functions to perform decoding and peak to average power ratio reduction on the received signal or symbol. The receiver, in another embodiment of the present inventions, may be configured to properly decode a PAR reduced transmitted signal or symbol without any side information.

In one embodiment, the transmitted signal or symbol is distorted at the transmitter. The transmitter simply distorts the signal without regard to retaining the integrity of the information contained in the signal. Instead, the distorted signal is received by the receiver and the receiver performs an algorithm to estimate the distorted portions of the signal. Iterative estimation and reconstruction of the distorted portions of the signal may be performed to obtain an approximation of the original signal. The operations may be performed on multi-carrier signals as well as single carrier signals.

In a particular embodiment, a transmitter introduces a distortion in the time domain representation of an original signal of a multi-carrier system. The time domain may be the discrete or continuous time domain. The distorted signal is sent to a receiver.

The receiver is informed of the type distortion that is applied to the original signal. The receiver transforms the received distorted signal to provide the individual frequency domain components of the distorted signal. The receiver decodes the individual frequency domain components of the received distorted signal to generate a first estimate of the original signal. Obviously, the first estimate of the original signal will contain errors due to the distortion. To correct the errors, the first estimate of the original signal is distorted in the same manner as the distortion of the original signal.

Distortion of the first estimate of the original signal provides a first estimate of the distortion of the original signal. The first estimate of the distortion is extracted and combined with the received signal. This combined signal is then decoded, which provides a next (and typically better) estimated of the original signal. The next estimate of the original signal may be further distorted to provide a next estimate of the distortion. The process may be repeated until an acceptable estimate of the original signal is obtained.

In this general manner a receiver is able to receive and decode a distorted signal so long as the type of distortion is known. Sending the type of distortion generally requires little bandwidth since the type of distortion changes infrequently. However, the receiver need only know the general distortion function and not the specific details of distortion of a particular signal. The receiver estimates the distortion, in effect estimating the original non-distorted signal. Thus, the transmitted signal may be distorted for any number of reasons, including for peak to average power ratio reduction. The signal may be distorted for other reasons, for example encryption. Regardless of the reason, the receiver is able to effectively decode a distorted signal without requiring side information.

Any type of distortion may be utilized in accordance with the present inventions. Clipping is one particular type of distortion that has been found to satisfactorily reduce the PAR of a signal. A signal may be clipped, which reduces the PAR of a signal, and the clipped portions of the signal discarded. The clipped portions may then be estimated by the receiver in an attempt to reconstruct the original signal.

The distortion may be intentionally introduced to a signal in order to reduce the PAR, which the receiver corrects through distortion estimation and reconstruction. However, the receiver may also estimate and rehabilitate a signal that is inadvertently distorted. For example, non-linear effects and aberrations that exist in analog components may be corrected by the receiver. Further, a channel may include intermediate amplifiers or repeaters (such as passing a signal through a satellite) which add further distortion to the signal. The receiver may be trained to correct the distortion introduced by these and other sources of distortion. However, it may be necessary in some cases to inform the receiver about the types and/or magnitudes of the distortion introduced by such intermediate devices.

Figure 23:
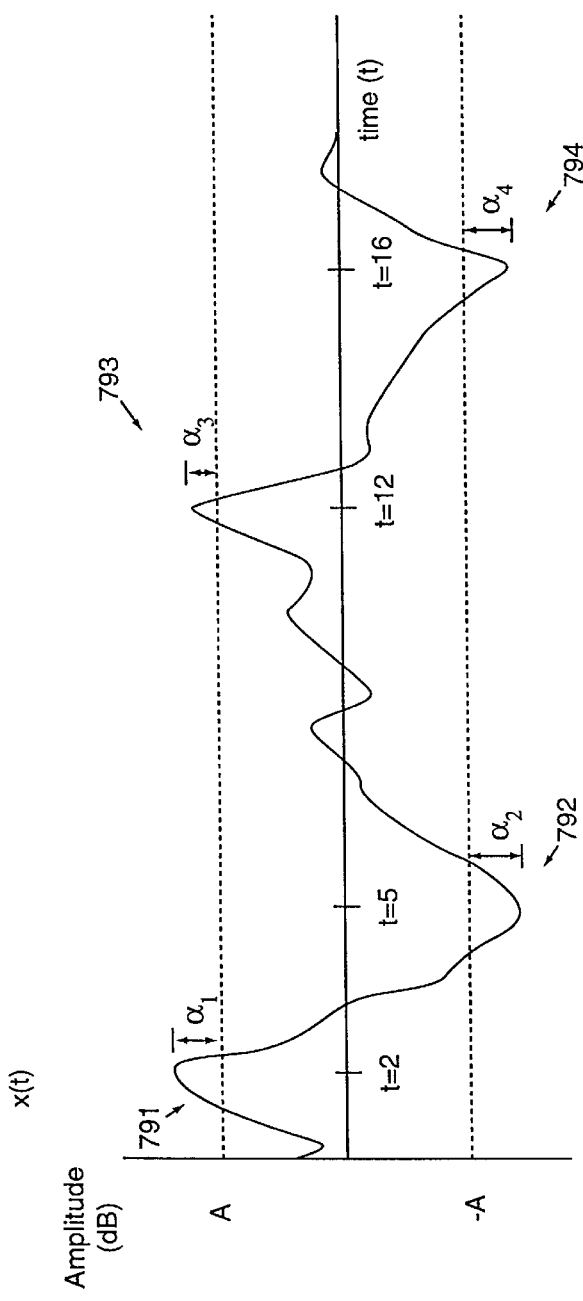
FIG. 23 illustrates a multi-carrier time domain signal, x(t).

FIG. 23 illustrates a multi-carrier time domain signal, x(t). The signal includes a number of peaks 791–794. In order to reduce the peak to average power ratio of x(t) the signal should be reduced to an amplitude A. Amplitude A may be equal to or less than the magnitude necessary for sufficiently reducing the peak to average power ratio of the signal. Generally, it may be preferred to set the value of A at less than the maximum necessary magnitude to allow for deviations due to noise and the linear or non-linear characteristics of analog components.

The peaks have differing magnitudes which requires that the peaks be clipped by different amounts. For example, peak 791 must be reduced by an amount $\alpha_1$, peak 792 by $\alpha_2$, peak 793 by $\alpha_3$, and peak 794 by $\alpha_4$. The transmitter clips peaks 791–794 by the appropriate amounts.

Figure 24:
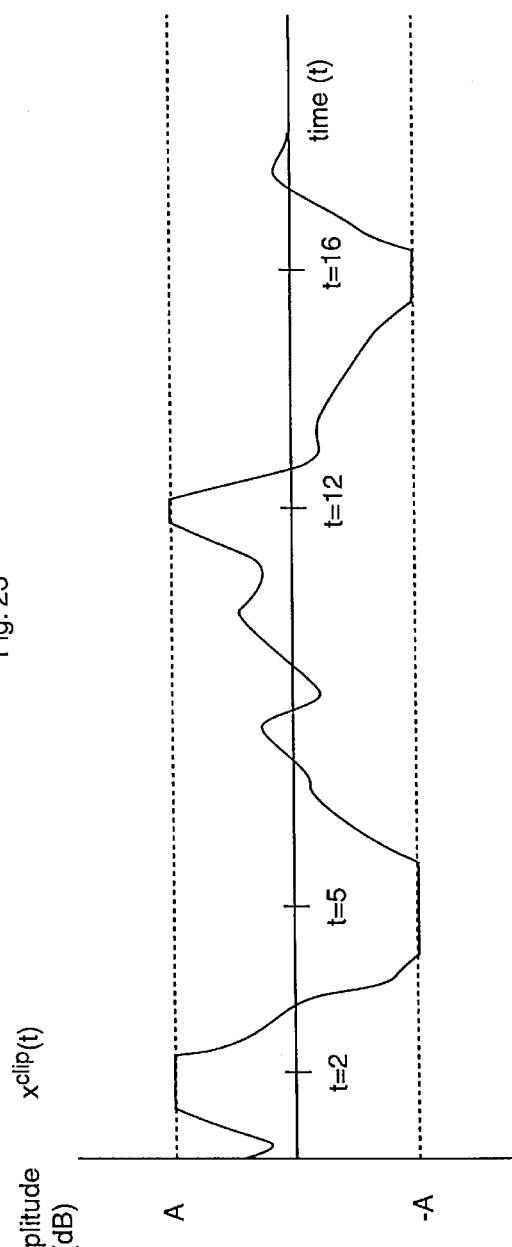
FIG. 24 illustrates a clipped signal, $x^{clip}(t)$, in accordance with an embodiment of the present inventions.

FIG. 24 illustrates a clipped signal, $x^{clip}(t)$, in accordance with an embodiment of the present inventions. The former peaks 791–794 have been reduced appropriately to bring the signal within the magnitudes A and −A.

Again, the illustrated examples are depicted in continuous time, but the operations may be performed in the discrete time or discrete frequency domain equivalents of the signal. Thus, in the discrete time domain the ideal limiter of the signal x(t) would be:

$$x_n^{clip} = \begin{cases} x_n, & |x_n| \le A \\ A \cdot \text{sign}(x_n), & |x_n| > A \end{cases}$$

The PAR for the clipped signal $x^{clip}(n)$ is:

$$PAR_{xclip} = 10\log_{10}\frac{A^2}{\varepsilon[\||x_n\||_2^2]}$$

where, $\varepsilon[\||x_n\||_2^2]$ is the average power of the transmitted signal. The limiting function outputs the following discrete time domain signal:

$$x_n^{clip} = x_n - c_n^{(X,A)}$$

where $c_n^{(X,A)}$ is the distortion at the transmitter, which is a function of the data vector X and the clipping level A. In the frequency domain the signal is represented as:

$$X_k^{clip} = FFT(x_n^{clip}) = X_k C_k^{(X,A)}$$

FIG. 25 illustrates the received signal $y^{clip}(t)$ in accordance with an embodiment of the present inventions. The received signal $y^{clip}(t)$ equals the transmitted clipped signal $x^{clip}(t)$ convolved with the impulse response of the channel plus some noise n(t). In the discrete frequency domain the received signal is represented as:

$$y_k^{clip} = H_k(X_k - C_k(X,A)) + N_k$$

where $H_k$ is the frequency domain response of the channel.

The receiver receives the signal $y^{clip}(t)$ and attempts to accurately decode the information contained within $y^{clip}(t)$. In the frequency domain a maximum likelihood decoder may be utilized to attempt to find the best estimate of the transmitted information. The estimate of the signal is:

$$\hat{X} = \arg\min_{\forall \bar{X}} \sum_{k=0}^{N-1} \left(H_k(\bar{X}_k - C_k^{(\bar{X},A)}) - Y_k^{clip}\right)^2$$

In vector form the equation is:

$$\hat{X} = \arg\min_{\bar{X}} \|H \circ (\bar{X} - C^{(\bar{X},A)}) - Y^{clip}\|_2^2$$

where the operation v∘w is the element by element vector product $[v_1w_1, v_2w_2, v_3w_3 \ldots V_NW_N]^T$. Substituting the value of $y^{clip}$ from the above equation provides:

$$\hat{X} = \arg\min_{\bar{X}} \|H \circ (\bar{X} - C^{(\bar{X},A)}) - H \circ (X - C^{(X,A)}) - N\|_2^2$$

This estimate $\hat{X}$ can be solved to obtain an estimate of the transmitted information. However, the solution may be too complex to be solved in real time by today's systems. The solutions for the vector functions $C^{(\bar{X},A)}$ and $C^{(X,A)}$ can be complicated functions of $\bar{X}$ and X, respectively. Thus, finding $\hat{X}$ may require an exhaustive search over all the possible transmit symbol vectors $\bar{X}$ and all corresponding $C^{(\bar{X},A)}$. The solution is exponentially complicated, but estimating or knowing $C^{(X,A)}$ would greatly simply the equation and provide a good estimate $\hat{X}$. In the future processing advances may provide the necessary power to solve the exact solution in real time.

Currently, finding an estimation of $C^{(X,A)}$ may provide the necessary information to adequately reconstruct the original signal. Once an approximate solution is found for $C^{(X,A)}$ the $C^{(\bar{X},A)}$ term is not needed since the maximum likelihood receiver reduces as follows:

$$\hat{X} = \arg\min_{\bar{X}} \|H \circ \bar{X} - H \circ (X - C^{(X-A)} + \hat{C}^{(X,A)}) - N\|_2^2,$$

$$\hat{X} = \arg\min_{\bar{X}} \|H \circ \bar{X} - H \circ X - N\|_2^2$$

where $\hat{C}^{(X,A)}$ is an estimate of $C^{(X,A)}$. The vector maximum likelihood receiver may be decomposed into N scalar maximum likelihood receivers for each tone or frequency. Thus for each constellation of a particular frequency the maximum likelihood receiver obtains an estimate of the transmitted constellation point as follows:

$$X_k = \arg\min_{\bar{X}_k}(H_k\bar{X}_k - H_k X_k - N)^2$$

The maximum likelihood receiver for a single frequency breaks down to choosing the closest constellation value nearest the received signal of that frequency, or $$\hat{X} = ((Y_k^{clip}/H_k) + C_k^{(X,A)})$$

where the operation (f) denotes selecting the closest constellation point to the value f. While the maximum likelihood choice provides good estimates of the transmitted constellation point, it may be improved upon with error correction coding. Error correction coding may be used in another embodiment of the present inventions to increase the accuracy of the estimation process.

Knowing the values for $C^{(X,A)}$ would therefore greatly reduce the complexity of the reconstruction of the received signal. The values for $C^{(X,A)}$ may be transmitted along with the clipped signal in any number of the methods described above. Additionally, side channels may be utilized to transmit the clipping information.

In an embodiment of the present inventions the value for $C^{(X,A)}$ is estimated without any side information provided by the transmitter. Initially the receiver derives a first estimate $\hat{X}^{(1)}$. The receiver uses the first estimate to determine a first estimate, $\hat{C}^{(\hat{X}^{(1)},A)}$, and uses it to obtain a second estimate $\hat{X}^{(2)}$. The process is reiterated a number of times until a good estimate of $C^{(X,A)}$ is obtained. Correspondingly, a good estimate of $C^{(X,A)}$, $\hat{C}^{(\hat{X}^{(q-1)},A)}$, also provides a good estimate of X, $\hat{X}^{(q)}$.

In one embodiment, the first estimate of X may be obtained by using:

$$\hat{X}^{(1)} = \langle Y^{clip} \circ 1/H \rangle = \left[ \left\langle \frac{Y_0^{clip}}{H_0} \right\rangle, \left\langle \frac{Y_1^{clip}}{H_1} \right\rangle, \ldots \left\langle \frac{Y_{N-1}^{clip}}{H_{N-1}} \right\rangle \right]$$

Performing an IFFT on $\hat{X}^{(1)}$ provides $x^{(1)}$. From $x^{(1)}$ and information about the type of distortion, in the illustrated embodiment the clipping level A, $c^{(\hat{X}^{(1)},A)}$ and $C^{(\hat{X}^{(1)},A)}$ is computed.

FIG. 26 illustrates a reconstructed signal $\hat{x}^{(1)}(t)$ that is the first estimate of x(t). Signal $\hat{x}^{(1)}(t)$ includes estimated peaks 801–804. Estimated peaks 801–804 are derived from the estimate $C^{(\hat{X}^{(1)},A)}$. The first estimate, as illustrated, may not perfectly estimate the original peaks 791–793. However, the estimated peaks 801–804, or estimate $C^{(\hat{X}^{(1)},A)}$, may be used to obtain a better estimate of x(t), or X, i.e., $C(\hat{X}^{(2)},A)$. The following equation may be used to obtain a next estimate of X.

$$\hat{X}^{(2)} = ((Y^{clip} \circ 1/H) + C^{(\hat{X}^{(1)},A)})$$

or generally the iterative algorithm may be written $$\hat{C}(\hat{X}^{(0)},A) = 0;$$

$$\hat{C}^{(\hat{X}^{(q)},A)} = FFT(\hat{X}^{(q)} - \hat{X}_{clip}^{(q)}), q \geq 1;$$

$$\hat{X}^{(q+1)} = ((Y^{clip} \circ 1/H) + C^{(\hat{X}^{(q)},A)})$$

which may be written as:

$$\hat{X}^{(q+1)} = \underset{\overline{X}}{\operatorname{argmin}} \| H \circ \overline{X} - H \circ \left( X - C^{(X,A)} + C^{(\hat{X}^{(q)},A)} \right) - N \|_2^2,$$

where $\overline{X}$ and $\hat{X}^{(q)}$ are taken from the current estimate. The current iteration is indicated by the index q. The q+1 estimate of X is obtained using the values for $C^{(\hat{X}^{(q)},A)}$ obtained from the current, $q^{th}$, iteration.

The $q^{th}$ iteration $C^{(\hat{X}^{(q)},A)}$ is obtained by taking the IFFT of $\hat{X}^{(q)}$. The corresponding time domain signal $\hat{x}^{(q)}(t)$ obtained by the IFFT is clipped through a similar clipping procedure performed at the transmitter. An FFT is performed on the clipped portions of the peaks and the frequency domain representation of the clipped portions of the peaks are used as the new estimate $C^{(\hat{X}^{(q)},A)}$. The new estimates are used in the above equations to generate a new estimate, $\hat{X}^{(q++1)}$.

The IFFT of the previous estimate $\hat{X}^{(q)}$ need not be performed on the entire signal. Only the differential between the previous estimate $\hat{X}^{(q)}$ and the current estimate $\hat{X}^{(q+1)}$ need be computed. If $\hat{X}^{(q)}$ and $\hat{X}^{(q+1)}$ are very similar than the difference between the two is mostly zeroes, which is easier to compute. Thus, only a portion of $\hat{X}^{(q)}$ and $\hat{X}(q+1)$ need be transformed during each iteration of the estimation process. Additionally, $c^{(\hat{X}^{(q)},A)}$ only contains information in those portions where clipping, or more generally distortion, occurred. Thus, the FFT of $c^{(\hat{X}^{(q)},A)}$ need only be performed on those portions of $c^{(\hat{X}^{(q)},A)}$ where clipping occurred. Selective transformation during the iterative process helps to increase the speed of the estimation process.

The number of iterations of the estimation procedure may be performed a redetermined number of times. As few as two iterations of the estimation process has shown to provide satisfactory symbol error rates for multi-carrier systems. In one embodiment two to five iterations have been sufficient to provide error rates in a multi-carrier signal that approaches the ideal minimum error rates of conventional systems.

In another embodiment, when $\hat{X}^{(q)}$ and $\hat{X}^{(q+1)}$ are very similar, or exactly the same, then no further iterations are necessary. Typically successive iterations that are very similar means that the estimation process has achieved the best possible estimation.

Figure 27:
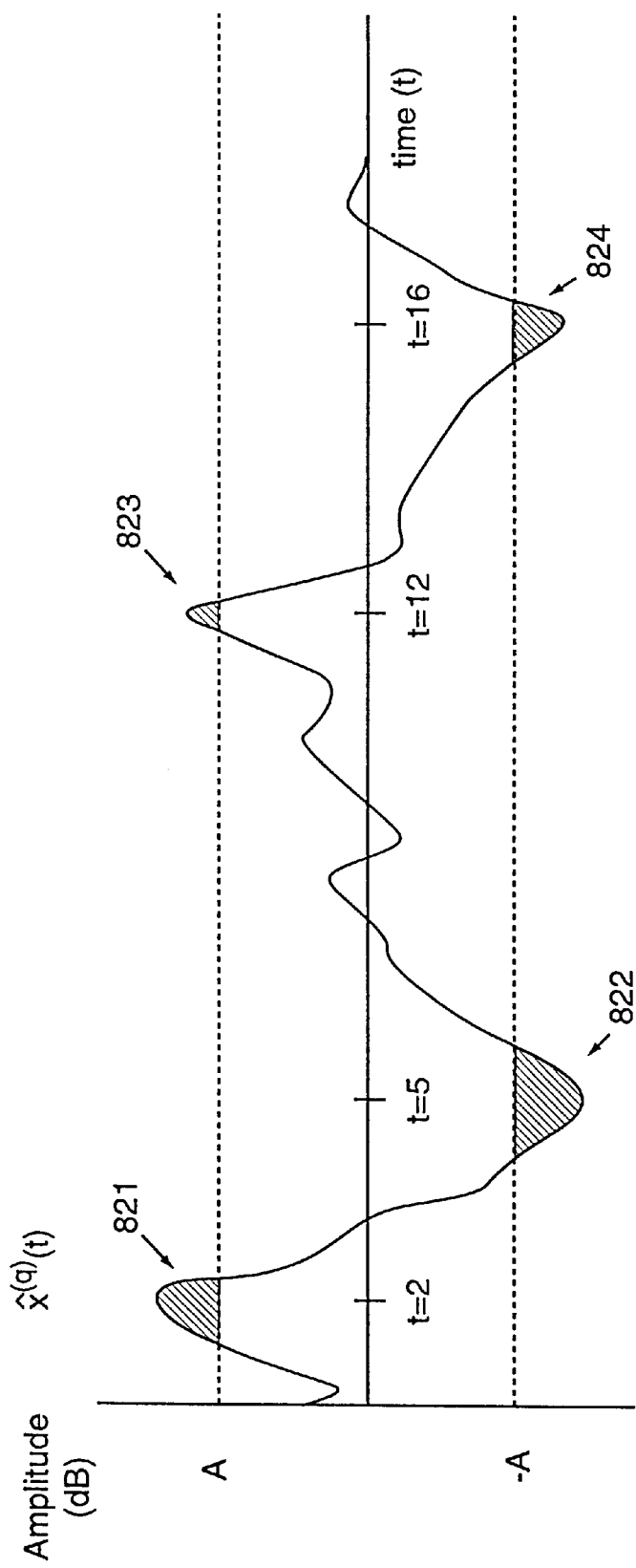
FIG. 27 illustrates a reconstructed signal $\hat{x}^{(q)}(t)$ after q iterations of clip estimation in accordance with an embodiment of the present inventions.

FIG. 27 illustrates a signal $\hat{x}^{(q)}(t)$ reconstructed after q iterations of clip estimation in accordance with an embodiment of the present inventions. Signal $\hat{x}^{(q)}(t)$ includes peaks 821–824 which more closely resemble the original peaks 791–794.

The described embodiment of the present inventions, however, may be applied to single carrier systems as well. Instead of employing the concept over a number of carriers comprising a single symbol, the described procedures may be applied to a number of time sequential symbols of a single carrier signal.

Figure 28:
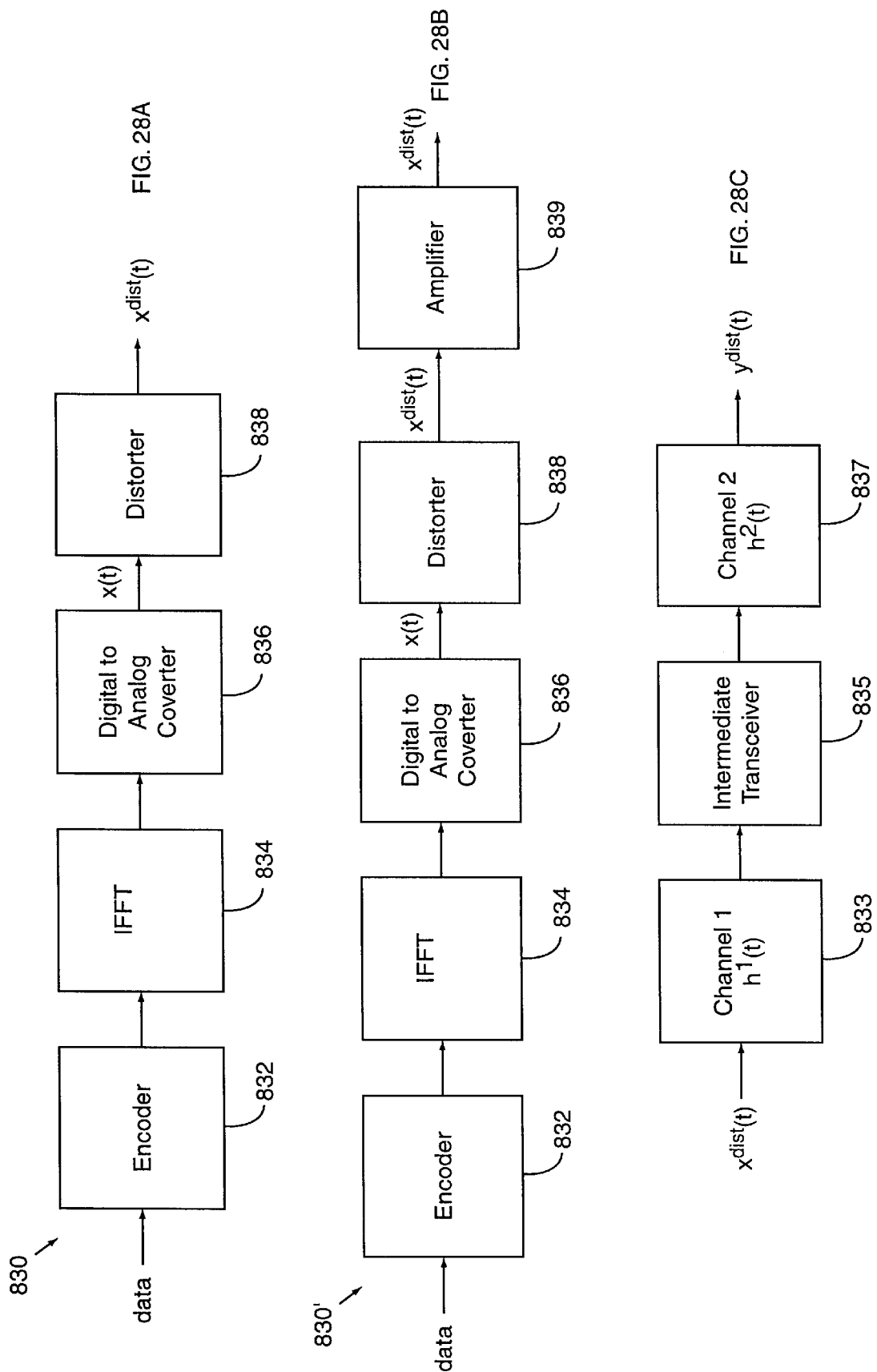
FIG. 28A illustrates a block diagram of a transmitter in accordance with an embodiment of the present inventions.
FIG. 28B illustrates a block diagram of a transmitter in accordance with an another embodiment of the present inventions.
FIG. 28C illustrates a block diagram of a channel in accordance with an embodiment of the present inventions.

FIG. 28A illustrates a block diagram of a transmitter 830 in accordance with an embodiment of the present inventions. Transmitter 830 includes an encoder 832, an inverse fourier transformer 834, a digital to analog converter 836 and a distorter 838.

Encoder 832 and IFFT 834 modifies a set of data for transmission, similar to the operations of the encoders and transformers/modulators discussed in reference to FIGS. 11–13. The IFFT 834 outputs a discrete time signal x(n). Digital to analog converter converts the signal x(n) to a continuous time signal x(t). Distorter 838 then distorts the continuous time signal x(t) and transmits $x^{dist}(t)$ to a receiver.

Generally the appropriate signals may be represented as:

$$X_n^{dist} = X_n - C_n^{(X,d)};$$

$$X_k^{dist} = X_k - C_k^{(X,d)}$$

where d represents the type of distortion performed on the signal. In an alternate embodiment the distortion function d is a non-memory-less function. That is, the distortion function may take into consideration the values of the previous symbols. The receiver simply needs to store the estimations of the distortions of previously received symbols to obtain estimations of the present symbols. Thus, the present inventions may be applied a broader range of distortion functions to the signals or symbols. Extra complexity is added in such a scheme, but better estimations may be achieved if previously estimated symbols were accurately reconstructed.

In another embodiment, distorter 838 may perform clipping on the discrete time sequence x(n) rather than on the continuous time signal x(t). Thus, distorter 838 may be embodied in a digital signal processor, a central processing unit or other type of computational device. Digital to analog converter 836 may then be used to convert the distorted discrete time sequence into a continuous time waveform.

Performing the clipping operation on the discrete time sequence x(n) has the advantage of providing the ability to store the clipped information. The clipped information may be sent to the receiver as side information through a variety of methods, as discussed and as may be well known in the art.

FIG. 28B illustrates a block diagram of a transmitter 830' in accordance with an embodiment of the present inventions. Transmitter 830' includes an amplifier 839 in addition to the previously described elements of transmitter 830. An amplifier is described, but amplifier 839 is exemplary of any device with non-linear characteristics. That is, an type of analog device that is not perfectly linear, which most analog devices are not, introduce distortion. Thus, $x^{dist}(t)$ includes the distortion added by distorter 838 and the distortion introduced by amplifier 839. Thus, the distortion function includes a term for each type of distortion. If the distortion added by amplifier 839 is known the receiver may be arranged to estimate that type of distortion as well.

FIG. 28C illustrates a block diagram of a channel in accordance with an embodiment of the present inventions. The channel includes a first channel 833, an intermediate transceiver 835 and a second channel 837. In many instances direct point to point communications is not feasible or even possible. Typically, a signal is passed from transmitter through a number of transceivers to a receiver, the final destination. Each transceiver between the source and the destination may add additional distortion. Also, components within the receiver may also add distortion to the signal.

Channel 833 has a channel response $h^1(t)$ and channel 837 has a channel response $h^2(t)$. Transceiver 835 introduces some distortion $d^1$. The distortion introduced by th transmitter is $d^t$ and the distortion introduced by the receiver is $d^r$. The general formula may be written as:

$$\hat{X} = \operatorname*{argmin}_{\bar{X}} \|(H \circ \bar{X} - C^{(\bar{X}, Hd^t, H_2 d^1, d^r)}) - (H \circ X - C^{(X, Hd^t, H_2 d^1, d^r)}) - N\|_2^2$$

where $H = H_1 H_2$, the frequency responses of channels 833 and 837. Note that the distortion is a function of all the sources of distortion. The distortions of the transmitter and transceiver 835 are affected by one or more of the channel responses of the channels 833 and 837. The distortion from the transmitter is affected by the channel response of all the channels since distortion $d^t$ traveled through both channels 833 and 837. The distortion of transceiver 835, however, is affected only by the frequency response of channel 837. And, the distortion of the receiver is not affected by any of the frequency responses of the channels since the distortion $d^r$ is introduced at the receiver. The general algorithm may be written as:

$$\hat{X}^{(1)} = \left\langle \frac{Y^{dist}}{H_1 H_2} \right\rangle;$$

$$\hat{D}_t^{(1)}(\hat{X}^{(1)}) = FFT(\hat{x}^{(1)} - x^{dist(1)});$$

$$\hat{D}_2^{(1)}[H_1 \hat{X}^{(1)} - H_1(\hat{D}_1^{(1)}(\hat{X}^{(1)}))] = \hat{D}_2^{(1)}(Z^{(1)}) = FFT(z^{(1)} - z^{dist(1)});$$

and $$\hat{D}_x^{(1)}[H_2(H_1 \hat{X}^{(1)} - H_1 \hat{D}_t^{(1)}) - H_2(\hat{D}_2^{(1)}(Z^{(1)}))] = \hat{D}_2^{(1)}(W^{(1)}) = FFT(w^{(1)} - w^{dist(1)});$$

The channels themselves may also add distortion. The above equations may be modified appropriately to account for the distortion introduced by the channels.

Figure 29:
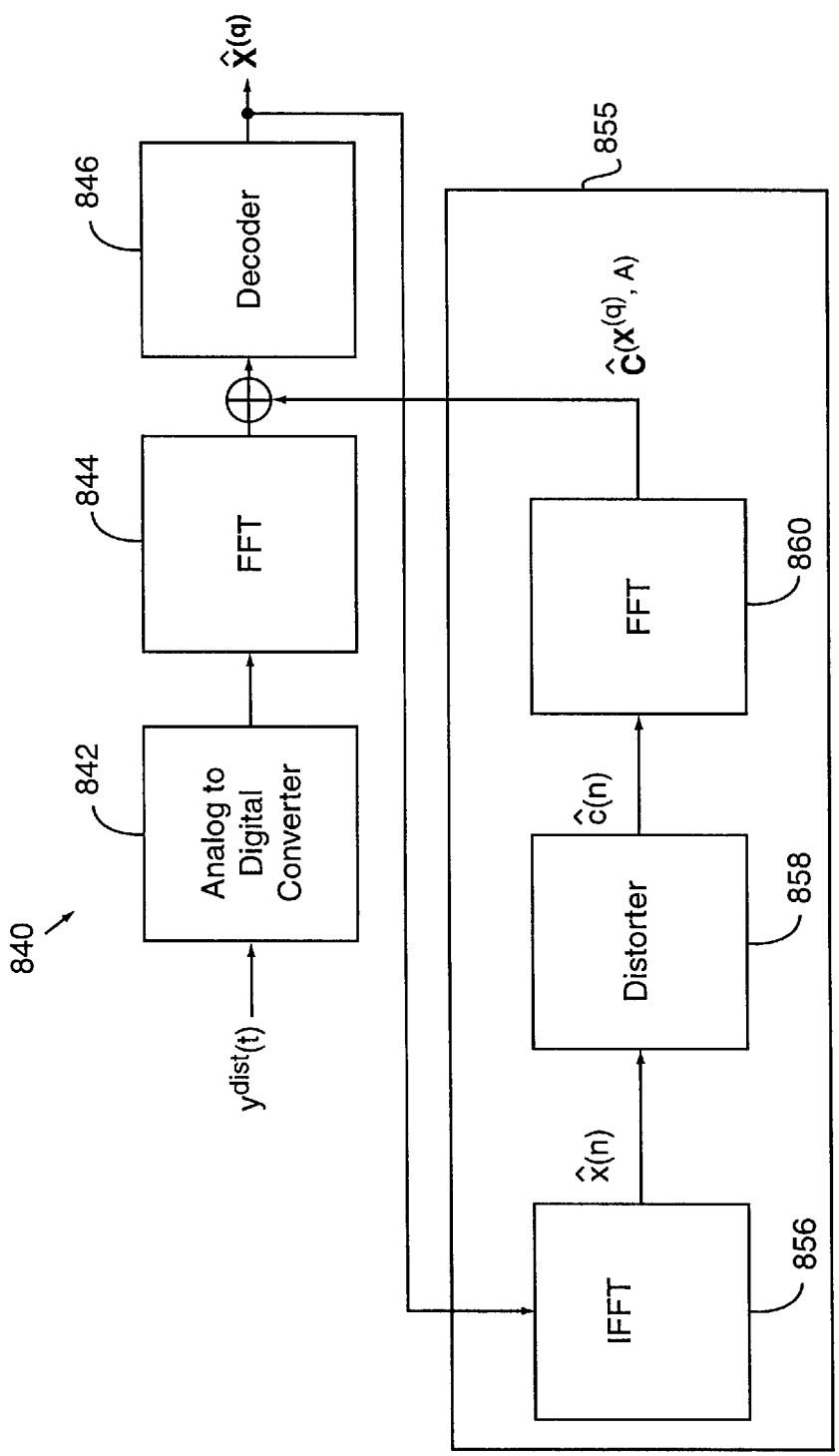
FIG. 29 illustrates a block diagram of a receiver in accordance with an embodiment of the present inventions.

FIG. 29 illustrates a receiver 840 in accordance with an embodiment of the present inventions. Receiver 840 includes an analog to digital converter 842, a fourier transformer 844, a decoder 846, and a distortion estimator 855. Estimator 855 includes an inverse fourier transformer 856, a distorter 858 and a fourier transformer 860.

Analog to digital converter 842 receives the transmitted signal $y^{dist}(t)$ and converts the signal into a discrete time sequence $y^{dist}(n)$. Fourier transformer 844 performs a fourier transform on the discrete time sequence to obtain the frequency domain representation of the received signal, $y^{dist}$. Decoder 846 decodes the frequency domain signal. Decoder includes the initial estimation of the clipped portions of the signal. Decoder 846 provides an estimate, $\hat{X}^{(q)}$, q=1. Frequency equalization is also performed on the received signal. Frequency equalization may be performed by decoder 846 during the first estimation process. Or, frequency equalization may be performed right after transformer 844 has transformed the received signal.

IFFT 856 performs an inverse fourier transform on $\hat{X}^{(q)}$ to provide an estimated discrete time sequence $\hat{x}^{(q)}(n)$. Distorter 858 distorts the time signal $\hat{x}(n)$ and estimates the distorted portions $\hat{c}^{(q)}(n)$. FFT 860 performs a fourier transform on $\hat{c}^{(q)}(n)$ to obtain the frequency domain estimation of the clipped portions, $C^{(\hat{X}^{(q)},A)}$. That information is fed back to decoder 846.

Decoder 846 uses $C^{(\hat{X}^{(q)},A)}$ to perform a new estimation of X based upon $C^{(\hat{X}^{(q)},A)}$. After a predetermined number of estimations have been performed decoder 854 decodes the last estimate $\hat{X}^{(q)}$, q=last iteration. Decoder 854 provides a set of data that should be equivalent to the original set of data provided to the transmitter.

The components of the illustrated transmitters and receivers may be embodied in hardware, software operating on general purpose processing device, or a combination of both. The operations described can be performed in any suitable domain. While the illustrated embodiment has described a signal based upon the fourier transform, other types of signals may be utilized in accordance with the present inventions. By way of example, DWMT variants of the present inventions apply wavelet transforms and vector coding applies transmit matrices. For example, discrete cosine transforms, Hartley transforms and suitable type of multiple-input multiple-output matrix operation may be utilized. Similarly, any suitable type of transmission methodology may be utilized in accordance with the present inventions.

Additionally, in alternate embodiments, the functions of decoder 846 may be incorporated into the estimator 855. Generally, an estimator includes any mechanism used to estimate the distorted portions of the received signal.

Any suitable clipping methodology may be used in accordance with the present inventions. In another embodiment, the peaks of a signal $x(t)$ may be clipped by a standard amount rather than clipping the peaks by variable amounts to a predetermined magnitude.

Figure 30:
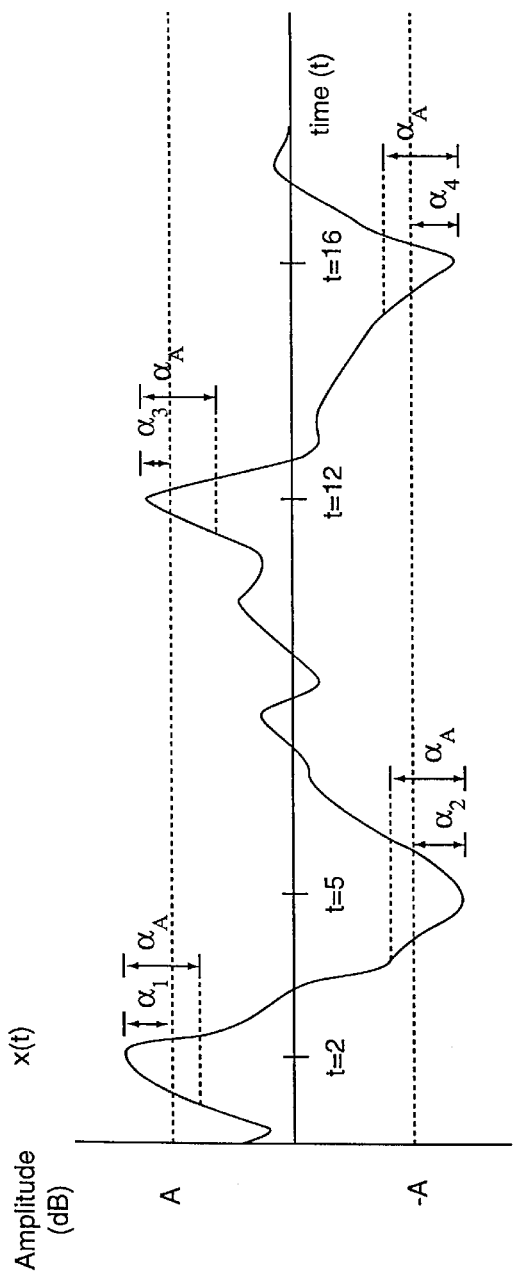
FIG. 30 illustrates a multi-carrier time domain signal x(t) with a number of peaks.

FIG. 30 illustrates a signal $x(t)$ with a number of peaks. Rather than clipping the peaks by a variable amount to reduce the peaks to the same amplitude, A, the peaks are reduced by a set value. In the illustrated example the peaks are reduced by $\alpha_A$. The value of $\alpha_A$ is set such that the highest peak is reduced to below a maximum value necessary for satisfactory PAR reduction.

Figure 31:
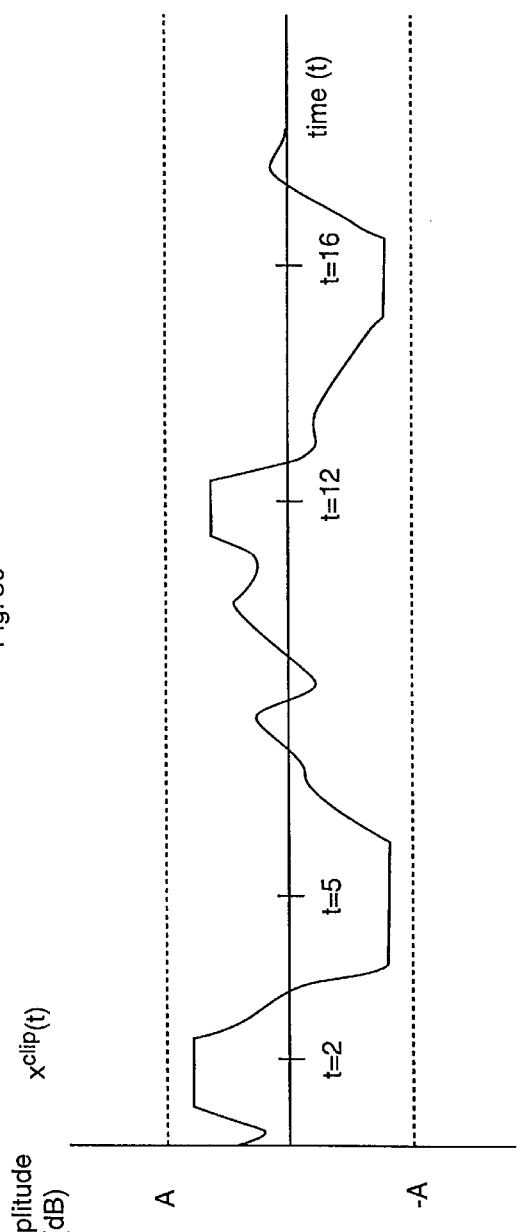
FIG. 31 illustrates a clipped signal $x^{clip}(t)$ in accordance with another embodiment of the present inventions.
Figure 32:
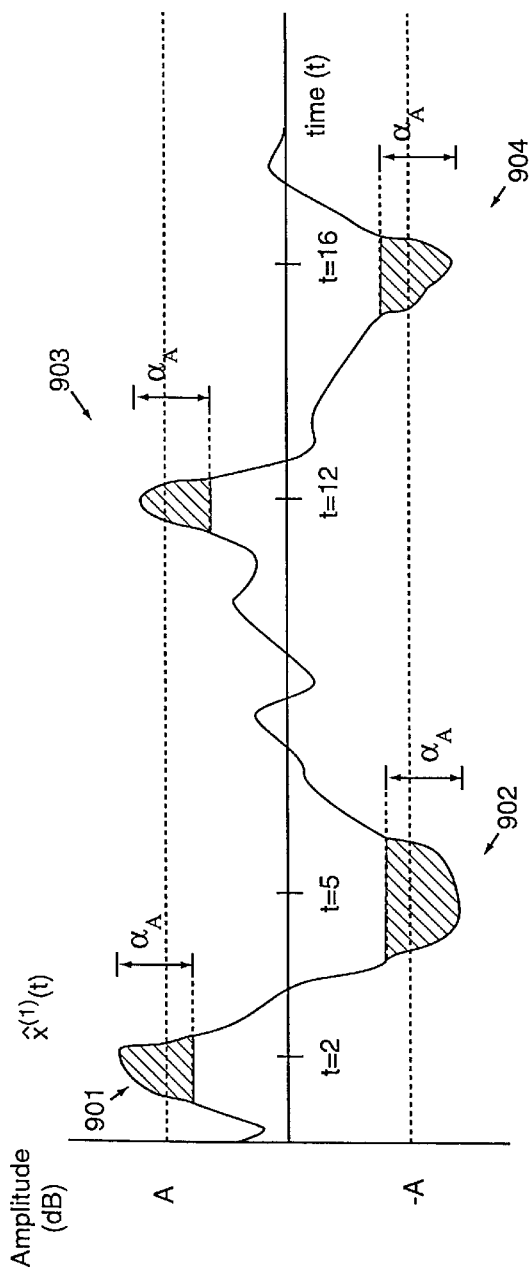
FIG. 32 illustrates the clipped signal of FIG. 31 with reconstructed peaks in accordance with an embodiment of the present inventions.
Figure 33:
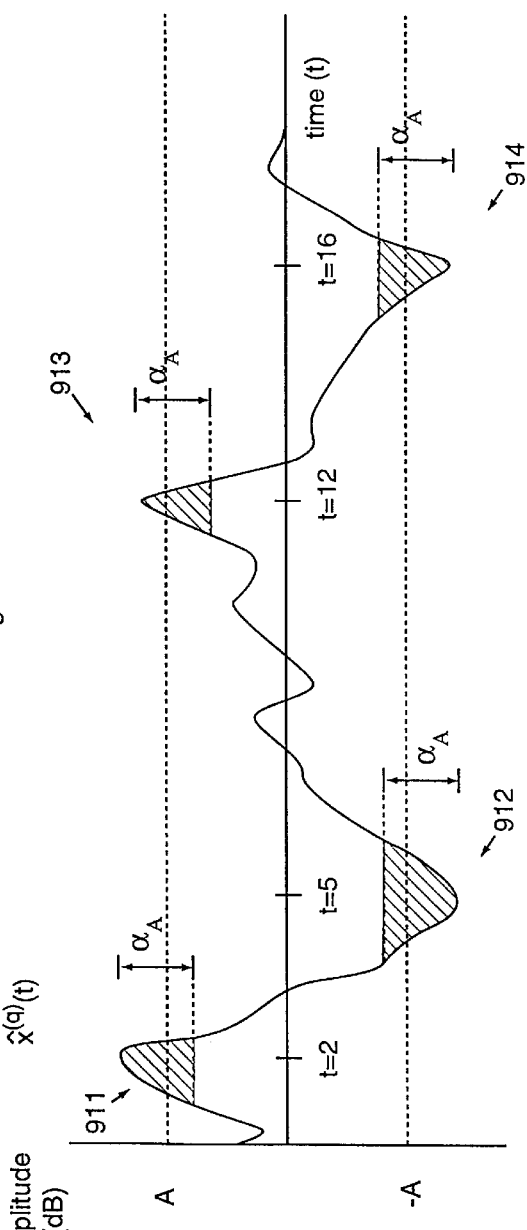
FIG. 33 illustrates a reconstructed signal $\hat{x}^{(q)}(t)$ after q iterations of clip estimation in accordance with an embodiment of the present inventions.

FIG. 31 illustrates a clipped signal $x^{clip}(t)$ in accordance with another embodiment of the present inventions. FIG. 32 illustrates the clipped signal of FIG. 31 with estimated peaks 901–904. In the illustrated embodiment the estimations of the clipped portions of the received signal is made easier since one constraint is known. It is known that the magnitudes of the clipped portions are all $\alpha_A$. Knowing the magnitudes of the clipped portions reduces the complexity of the estimation process. FIG. 33 illustrates a reconstructed signal $\hat{x}^{(q)}(t)$ after q iterations of estimation. Reconstructed signal $\hat{x}^{(q)}(t)$ includes estimated peaks 911–914 that more closely resemble the original peaks.

In another embodiment of the present inventions, an incremental value $\alpha_A$ may be utilized. Instead of the clipping the peaks by a standard value, such as $\alpha_A$, the peaks may be clipped by increments of $\alpha_A$. Depending upon the overshoot of the peak the peak is clipped by a multiple of $\alpha_A$. Using an incremental value minimizes the distortion of the signal. In still a further embodiment, a set of predetermined clipping increments may be utilized. The values of the clipping increments may be varied according to the size of the peaks, or other criteria. For example, the values of the clipping increments may range logarithmically from the smallest clipping increment to the largest clipping increment.

Again, sending information about the clipping, or any type of distortion, improves the receivers ability to estimate the distorted portions of the signal. The side information may include the number of distorted peaks, the magnitude of the distortion, the characteristics of the type of distortion (e.g., in clipping the clipping level), location of some or all of the peaks, values for the clipping increments and other suitable pieces of side information. Sending side information also decreases the complexity of the receiver. Additionally, oversampling the data at the transmitter may also allow the receiver to provide better estimates of the distorted signal.

Clipping the signal is just one type of distortion that is applied to the signal in order to reduce the peak to average ratio. Any suitable type of distortion other than clipping may be used to reduce the peak to average power ratio as long as the receiver is capable of estimating the distortion. The receiver determines the distortion of the signal in order to reconstruct the original signal. Determination of the distortion may be performed through direct computation, or through estimation and iteration. Generally, the present inventions provides methods and apparatuses for reducing the peak to average power ratio of a signal without losing a significant amount of bandwidth. Additionally, the complexity of some embodiments allow peak reduction to be performed in real time.

Also, predistortion techniques have been utilized to minimize the distortion introduced by devices. Predistortion techniques may also be used in conjunction with the present inventions. Smaller distortions are generally easier to estimate and predistortion techniques provide better speed and accuracy to the estimation process.

While these inventions have been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A receiver for use in a communication system, the receiver receiving a received signal, the received signal being a function of an original signal and an original distortion, the receiver comprising:

an estimator, the estimator estimating the distortion of the received signal to provide a final estimate of the original distortion, wherein the receiver uses the final estimate of the original distortion to remove the original distortion from the received signal to provide a final estimate of the original signal, whereby the final estimate of the original signal being an estimate of the received signal without the original distortion;

a decoder coupled to the estimator, the decoder decoding the received signal, wherein in the process of decoding the received signal the decoder makes a first estimate of the original signal, the decoder providing the first estimate of the original signal to the estimator;

wherein the estimator receives the first estimate of the original signal from the decoder and estimates a first estimate of the original distortion based upon the first estimate of the original signal, the estimator providing the first estimate of the original distortion to the decoder, the first estimate of the original distortion contributing to the determination of the final estimate of the original distortion and the final estimate of the original signal.

2. A receiver as recited in claim 1, wherein the decoder receives the first estimate of the original distortion from the estimator, the decoder decoding the received signal in conjunction with the first estimate of the distortion and providing a next estimate of the original signal.

3. A receiver as recited in claim 2, wherein the estimator receives the next estimate of the original signal and estimates a next estimate of the original distortion based upon the next estimate of the original signal, the estimator providing the next estimate of the original distortion to the decoder, whereby the next estimate of the original distortion contributes to the determination of the final estimate of the original distortion.

4. A receiver as recited in claim 1, further comprising a transformer coupled to the decoder, the transformer performing a transform on the received signal, the transformer providing the transformed received signal to the decoder;

wherein the transform is chosen from a group of transforms consisting of an inverse fourier transform, a discrete wavelet transform, a vector matrix, discrete cosine transform and Hartley transform.

5. A receiver for use in a communication system, the receiver receiving a received signal, the received signal being a function of an original signal and an original distortion, the receiver comprising:

an estimator, the estimator estimating the distortion of the received signal to provide a final estimate of the original distortion, wherein the receiver uses the final estimate of the original distortion to remove the original distortion from the received signal to provide a final estimate of the original signal, whereby the final estimate of the original signal being an estimate of the received signal without the original distortion wherein the received signal is a function of the original signal and the original distortion, the original signal including a peak and the distortion being a clip of the peak, wherein the clipping of the peak by the distortion reduces a peak to average power ratio of the received signal.

6. A receiver as recited in claim 5, wherein the original distortion is chosen from a group consisting of:

clipping the peak to a first predetermined magnitude;

clipping the peak by a second predetermined magnitude;

clipping the peak by a multiple of a third predetermined magnitude; and clipping the peak by one of a plurality of predetermined magnitudes.

7. A receiver for use in a communication system, the receiver receiving a received signal, the received signal being a function of an original signal and an original distortion, the receiver comprising:

an estimator, the estimator estimating the distortion of the received signal to provide a final estimate of the original distortion, wherein the receiver uses the final estimate of the original distortion to remove the original distortion from the received signal to provide a final estimate of the original signal, whereby the final estimate of the original signal being an estimate of the received signal without the original distortion;

a decoder coupled to the estimator, the decoder decoding the received signal, wherein in the process of decoding the received signal the decoder makes a first estimate of the original signal, the decoder providing the first estimate of the original signal to the estimator;

a transformer coupled to the decoder, the transformer performing a transform on the received signal, the transformer providing the transformed received signal to the decoder;

wherein the original distortion that is part of the received signal is applied to the original signal by an original distortion function, and the estimator including:

a distorter, wherein the distorter distorts the first estimate of the original signal according to a first distortion function, wherein the application of the first distortion function to the first estimate of the original signal introduces a first distortion, wherein the first distortion provides a first estimate of the distortion.

8. A receiver as recited in claim 7, wherein the first distortion function of the distorter is approximately identical to the original distortion function.

9. A receiver as recited in claim 8, wherein the estimator extracts the first estimate of the distortion from the first distortion of the first estimate of the original signal.

10. A receiver as recited in claim 7, wherein the estimator further includes:

an inverse transformer coupled to the decoder and the distorter, the inverse transformer performing an inverse transform on the first estimate of the original signal, the inverse transform being the inverse of the transform performed by the transformer and providing the transformed first estimate of the original signal to the distorter; and another transformer coupled to the distorter and the decoder, the another transformer receiving the first estimate of the original signal including the first estimate of the original distortion and performing the transform on the first estimate of the original signal including the first estimate of the original distortion, and extracting the first estimate of the original distortion and providing the first estimate of the distortion to the decoder.

11. A receiver for use in a communication system, the receiver receiving a received signal, the received signal being a function of an original signal and an original distortion, the receiver comprising:

an estimator, the estimator estimating the distortion of the received signal to provide a final estimate of the original distortion, wherein the receiver uses the final estimate of the original distortion to remove the original distortion from the received signal to provide a final estimate of the original signal, whereby the final estimate of the original signal being an estimate of the received signal without the original distortion;

a decoder coupled to the estimator, the decoder decoding the received signal, wherein in the process of decoding the received signal the decoder makes a first estimate of the original signal, the decoder providing the first estimate of the original signal to the estimator;

wherein the original signal is a multi-carrier symbol comprised of a plurality of original signals, each of the plurality of original signals centered at a frequency and the received signal is a multi-carrier symbol comprised of a plurality of received signals, each of the plurality of received signals centered at a frequency;

further wherein the decoder decodes the received signal by applying a maximum likelihood operation on each of the plurality of received signals producing a plurality of first estimates of the plurality of original signals that comprises the first estimate of the original signal;

further wherein the estimator receives the first estimate of the original signal and applies a first distortion function on the first estimate of the original signal such that one or more of the first estimates of the plurality of original signals are distorted, wherein the distortion of the one or more distorted signals of the first estimates of the plurality of original signals is the first estimate of the original distortion, the estimator providing the first estimate of the original distortion to the decoder.

12. A receiver as recited in claim 11, wherein the decoder decodes the received signal in conjunction with the first estimate of the original distortion, wherein the decoding of the received signal in conjunction with the first estimate of the original distortion combines the one or more distorted signals of the first estimates of the plurality original signals with the plurality of received signals, the decoder applying a maximum likelihood operation on each of the combination of the one or more distorted signals of the first estimates of the plurality of original signals and the plurality of received signals, producing a plurality of next estimates of the plurality of signals that comprises the next estimate of the original signal.

13. A method of correcting an original distortion in a received signal in a communication system, wherein an original distortion function is applied to an original signal to introduce the original distortion into the received signal, the method comprising:

(A) estimating the original distortion of the received signal, thereby providing a final estimate of the original distortion, the step of estimating the original distortion of the received signal comprising:

(1) performing a transform on the received signal prior to decoding the received signal;

(2) decoding the received signal, the process of decoding providing a first estimate of the original signal;

(3) estimating a first estimate of the original distortion based upon the first estimate of the original signal by distorting the first estimate of the original signal by applying a first distortion function to the first estimate of the original signal, wherein the first estimate of the original distortion is introduced into the first estimate of the original signal;

(4) decoding the received signal in conjunction with the first estimate of the original distortion, providing a next estimate of the original signal;

(5) estimating a next estimate of the original distortion based upon the next estimate of the original signal;

(6) decoding the received signal in conjunction with the next estimate of the original distortion and repeating the step of estimating the next estimate of the original distortion and the step of decoding the received signal in conjunction with the next estimate of the original distortion a predetermined number of iterations, whereby the final estimate of the original distortion is determined; and (B) applying the final estimate of the original distortion to approximately remove the original distortion from the received signal to obtain a final estimate of the original signal.

14. A method as recited in claim 13, wherein the step of estimating a next estimate of the original distortion based upon the next estimate of the original signal comprises distorting the next estimate of the original signal by applying the first distortion function to the next estimate of the original signal, wherein the next estimate of the original distortion is introduced into the first estimate of the original signal.

15. A method as recited in claim 13, further including:
performing an inverse transform on the first estimate of the original signal prior to distorting the first estimate of the original signal.

16. A method as recited in claim 14, further including:
performing the transform on the next estimate of the original signal prior to providing the next estimate of the original signal to the decoder.

17. A method as recited in claim 13, wherein the original signal is a multi-carrier symbol comprised of a plurality of original signals, each of the plurality of original signals centered at a frequency and the received signal is a multi-carrier symbol comprised of a plurality of received signals, each of the plurality of received signals centered at a frequency, the first step of decoding including:
applying a maximum likelihood operation on each of the plurality of received signals, thereby producing a plurality of first estimates of the plurality of original signals that comprises the first estimate of the original signal.

18. A method as recited in claim 17, the step of estimating a first estimate of the original distortion comprises:
applying a first distortion function on the first estimate of the original signal such that one or more of the first estimates of the plurality of original signals are distorted, wherein the distortion of the one or more distorted signals of the first estimates of the plurality of original signals is the first estimate of the original distortion.

19. A method as recited in claim 18, the step of decoding the received signal in conjunction with the first estimate of the original distortion including:
decoding the received signal in conjunction with the first estimate of the original distortion, wherein the decoding of the received signal in conjunction with the first estimate of the original distortion is a combination the one or more distorted signals of the first estimates of the plurality original signals with the plurality of received signals, the decoder applying a maximum likelihood operation on each of the combination of the one or more distorted signals of the first estimates of the plurality of original signals and the plurality of received signals, producing a plurality of next estimates of the plurality of signals that comprises the next estimate of the original signal.

* * * * *

UNITED STATES PATENT AND TRADEMARK OFFICE
CERTIFICATE OF CORRECTION

PATENT NO.       : 6,314,146 B1
APPLICATION NO. : 09/092327
DATED            : November 6, 2001
INVENTOR(S)      : Tellado et al.

It is certified that error appears in the above-identified patent and that said Letters Patent is hereby corrected as shown below:

In the Specification

Col. 3, line 5: "he received signal" should read -- the received signal --.
Col. 4, line 4: "of the resent inventions" should read -- of the present inventions --.
Col. 7, line 27 (bottom half of the expression):
"$\{0, k \neq \{i_1,...,i_L\}\}$" should read -- $\{0, k \notin \{i_1,...,i_L\}\}$ --.
Col. 7, line 48: "and XN-$_2$ are" should read -- $X_{N-2}$ --.
Col. 8, line 67: "subject to $Ax \leq_N b$" should read -- subject to $A X \leq_N b$ --.
Col. 11, line 42: "(j)+c(j)." should read -- (j-1)+c(j) --.
Col. 17, line 20: "carries 2 b bits" should read -- carries 2b bits --.
Col. 17, line 32: "$X_k = Rk-jI_k$." should read -- $X_k = R_k+jI_k$. --.
Col. 19, line 27: "If further ring,s" should read -- If further rings --.
Col. 20, line 9: "$x_{n-1}(t)$" should read -- $x_{N-1}(t)$ --.
Col. 20, line 58: "$0 \leq l \leq 1$." should read -- $0 \leq l \leq 1$. --.
Col. 20, line 63: "$D \geq dM$." should read -- $D \leq dM$. --.
Col. 25, line 8: "c(j)=c((j)+c(j-1)." should read -- c(j)=c(j)+c(j-1). --.
Col. 29, line 34: "$=X_k C_k^{(XA)}$" should read -- $X_k-C_k^{(XA)}$ --.
Col. 29, line 43: "$=H_k(X_k-C_k\,(XA)+N_k$" should read -- $=H_k(X_k-C_k^{(XA)})+N_k$ --.
Col. 40, line 3: "applying a first" should read -- applying the first --.
Col. 40, line 16: "combination the" should read -- combination of the --.

Signed and Sealed this

Tenth Day of October, 2006

JON W. DUDAS
*Director of the United States Patent and Trademark Office*